US011288825B2

(12) United States Patent
Sakamoto

(10) Patent No.: US 11,288,825 B2
(45) Date of Patent: Mar. 29, 2022

(54) METHOD OF OPERATING MEASUREMENT DEVICE, MEASUREMENT DEVICE, MEASUREMENT SYSTEM, THREE-DIMENSIONAL SHAPE RESTORATION DEVICE, AND RECORDING MEDIUM

(71) Applicant: OLYMPUS CORPORATION, Tokyo (JP)

(72) Inventor: Yohei Sakamoto, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 495 days.

(21) Appl. No.: 15/983,638

(22) Filed: May 18, 2018

(65) Prior Publication Data
US 2018/0342074 A1 Nov. 29, 2018

(30) Foreign Application Priority Data
May 23, 2017 (JP) .............................. JP2017-101824

(51) Int. Cl.
*G06T 7/55* (2017.01)
*G06T 7/579* (2017.01)
(Continued)

(52) U.S. Cl.
CPC .............. *G06T 7/55* (2017.01); *G06T 5/002* (2013.01); *G06T 5/20* (2013.01); *G06T 7/579* (2017.01);
(Continued)

(58) Field of Classification Search
None
See application file for complete search history.

(56) References Cited

U.S. PATENT DOCUMENTS

2018/0103246 A1* 4/2018 Yamamoto ........... H04N 13/239
2018/0295289 A1* 10/2018 Taya .................... G06T 15/205

FOREIGN PATENT DOCUMENTS

| JP | H09-026547 A | 1/1997 |
| JP | 2002-109518 A | 4/2002 |

(Continued)

OTHER PUBLICATIONS

Japanese Office Action dated Dec. 22, 2020 received in 2017-101824.

(Continued)

*Primary Examiner* — Bernard Krasnic
(74) *Attorney, Agent, or Firm* — Scully, Scott, Murphy & Presser, P.C.

(57) ABSTRACT

In a measurement device, an image acquisition unit acquires a first image generated by imaging an object to be measured in a first imaging state and acquires one or more second images generated by imaging the object in one or more second imaging states. A specified point setting unit sets a specified point on the first image. A three-dimensional (3D) shape restoration unit restores a 3D shape of the object by using a plurality of images including the second image determined to include a point corresponding to the specified point. A reference dimension setting unit sets a reference dimension on the first image or the 3D shape. A measurement unit measures the object on the basis of the 3D shape, the specified point, and the reference dimension.

21 Claims, 36 Drawing Sheets

(51) Int. Cl.
*G06T 5/00* (2006.01)
*G06T 5/20* (2006.01)
(52) U.S. Cl.
CPC .............. *G06T 2207/10016* (2013.01); *G06T 2207/10028* (2013.01); *G06T 2207/10068* (2013.01); *G06T 2207/20101* (2013.01); *G06T 2207/20104* (2013.01); *G06T 2207/30164* (2013.01)

(56) References Cited

FOREIGN PATENT DOCUMENTS

| JP | 2004-110459 | A | 4/2004 | |
|---|---|---|---|---|
| WO | 2005/077253 | A1 | 8/2005 | |
| WO | 2015/159791 | A1 | 10/2015 | |
| WO | WO-2016208664 | A1 * | 12/2016 | .............. A61B 1/00 |
| WO | 2017/043258 | A1 | 3/2017 | |

OTHER PUBLICATIONS

Japanese Office Action dated Aug. 31, 2021 received in 2017-101824.

* cited by examiner

METHOD OF OPERATING MEASUREMENT DEVICE, MEASUREMENT DEVICE, MEASUREMENT SYSTEM, THREE-DIMENSIONAL SHAPE RESTORATION DEVICE, AND RECORDING MEDIUM

BACKGROUND OF THE INVENTION

Field of the Invention

The present invention relates to a method of operating a measurement device, a measurement device, a measurement system, a three-dimensional (3D) shape restoration device, and a recording medium.

Priority is claimed on Japanese Patent Application No. 2017-101824, filed on May 23, 2017, the content of which is incorporated herein by reference.

Description of Related Art

Industrial endoscope devices are used for observation and inspection for internal scratches and corrosion on a boiler, a turbine, an engine, a pipe, and the like. In these endoscope devices, a plurality of types of optical adapters for observing and inspecting various observation objects are provided. An optical adapter is attached to a tip of the endoscope and is exchangeable. In inspection using such an endoscope device, there is a demand for quantitatively measuring defects of a subject and sizes of scratches. To meet this demand, an endoscope device equipped with a 3D measurement function has been provided.

Hereinafter, in inspection using an endoscope device, a measurement procedure performed by a user will be briefly described. First, the user uses a monocular optical adapter with an excellent observation performance to check whether or not there are defects or scratches inside a subject. If defects or scratches are found during inspection and it is determined that a defect or a scratch is an object to be measured, the user changes the optical adapter from the monocular optical adapter to an optical adapter for measurement. The optical adapter for measurement is equipped with a stereo optical system. To replace the optical adapter, the user pulls back the tip of the endoscope inserted into the subject toward the user. After the optical adapter is changed from the monocular optical adapter to the optical adapter for measurement, the user re-inserts the tip of the endoscope into the subject. After the tip of the endoscope reaches a defect or scratch location found in observation using the monocular optical adapter, the user performs measurement.

Such a procedure is necessary to perform the measurement. Thus, an inspection time from finding defects or scratches to performing measurement is long. That is, inspection efficiency is low. In order to solve this problem, there is a demand for a monocular optical adapter used in general endoscopic inspection to be equipped with a 3D measurement function. A technology for performing 3D measurement with a monocular optical adapter is disclosed in, for example, Japanese Unexamined Patent Application, First Publication No. H9-26547. In the technology disclosed in Japanese Unexamined Patent Application, First Publication No. H9-26547, measurement is performed by combining Structure from Motion (hereinafter abbreviated as SfM) and a distance measurement means. Also, Japanese Unexamined Patent Application, First Publication No. 2002-109518 also discloses a technology similar to the technology disclosed in Japanese Unexamined Patent Application, First Publication No. H9-26547.

SUMMARY OF THE INVENTION

According to a first aspect of the present invention, a method of operating a measurement device includes a first image acquisition process, a specified point setting process, a second image acquisition process, an image determination process, a three-dimensional (3D) shape restoration process, a reference dimension setting process, and a measurement process. In the first image acquisition process, a first image generated by imaging an object to be measured in a first imaging state is acquired. In the specified point setting process, a specified point is set on the first image. In the second image acquisition process, one or more second images generated by imaging the object are acquired in one or more second imaging states. At least one of an imaging position and an imaging posture is different between the first imaging state and the second imaging state. At least one of the imaging position and the imaging posture is different between two or more second imaging states. In the image determination process, it is determined whether or not a point corresponding to the specified point is included in the one or more second images. In the 3D shape restoration process, a 3D shape of the object is restored by using a plurality of images including the second image determined to include the point corresponding to the specified point in the image determination process. In the reference dimension setting process, a reference dimension is set on the first image acquired or the 3D shape. In the measurement process, the object is measured on the basis of the 3D shape, the specified point, and the reference dimension.

According to a second aspect of the present invention, in the first aspect, the specified point setting process may be executed before the second image acquisition process is executed.

According to a third aspect of the present invention, in the first aspect, the specified point setting process may be executed after the second image acquisition process is executed.

According to a fourth aspect of the present invention, in the first aspect, the second image acquisition process and the specified point setting process may be executed in parallel.

According to a fifth aspect of the present invention, in the first aspect, the method of operating the measurement device may further include a partial region setting process. In the partial region setting process, a partial region is set on the first image on the basis of a position of the specified point. In the image determination process, it may be determined whether or not a region corresponding to the partial region is included in the one or more second images.

According to a sixth aspect of the present invention, in the fifth aspect, the method of operating the measurement device may further include a smoothing process. In the smoothing process, a part corresponding to the partial region within the 3D shape is smoothed. In the measurement process, the object may be measured on the basis of the 3D shape smoothed in the smoothing process, the specified point, and the reference dimension.

According to a seventh aspect of the present invention, in the first aspect, the method of operating the measurement device may further include an index calculation process and a measurement reliability determination process. In the index calculation process, an index of measurement reliability at the specified point is calculated. In the measurement reliability determination process, the measurement reliability is determined by comparing the index with a predetermined threshold value. In the measurement process, the object may be measured if it is determined that the measurement reliability is high in the measurement reliability determination process.

According to an eighth aspect of the present invention, in the seventh aspect, in the index calculation process, the index of the measurement reliability at the point corresponding to the specified point may be calculated in the 3D shape.

According to a ninth aspect of the present invention, in the seventh aspect, in the index calculation process, the index of the measurement reliability at the point corresponding to the specified point may be calculated in the second image.

According to a tenth aspect of the present invention, in the first aspect, the specified point may be a specified measurement point indicating a measurement position. A specified reference point indicating a position of the reference dimension may be input from a device which has measured the reference dimension. In the measurement process, the object may be measured on the basis of the 3D shape, the specified measurement point, the specified reference point, and the reference dimension.

According to an eleventh aspect of the present invention, in the first aspect, the specified point may be input by a user.

According to a twelfth aspect of the present invention, a measurement device includes a processing unit. Measurement process information is input to the processing unit. The measurement process information includes information of a specified point set on a first image generated by imaging an object to be measured in a first imaging state, a plurality of second images generated by imaging the object in a plurality of second imaging states, and information of a reference dimension set on the first image. The plurality of second images are different from the first imaging state. The second images included in the plurality of second images are different from each other. The processing unit determines whether or not a point corresponding to the specified point is included in each of the plurality of second images on the basis of the input information of the specified point. The processing unit extracts the two or more second images determined to include the point corresponding to the specified point from among the plurality of second images. The processing unit restores a three-dimensional (3D) shape of the object by using the extracted second images. The processing unit measures the object on the basis of the restored 3D shape, the information of the specified point, and the information of the reference dimension.

According to a thirteenth aspect of the present invention, a measurement device includes a processing unit. Measurement process information is input to the processing unit. The measurement process information includes a first image generated by imaging an object to be measured in a first imaging state, information of a specified point set on the first image, one or more second images generated by imaging the object, and information of a reference dimension set on the first image. The one or more second images are different from the first imaging state. When the two or more second images are generated, the two or more second images are different from each other. The processing unit determines whether or not a point corresponding to the specified point is included in the one or more second images on the basis of the input information of the specified point. The processing unit extracts at least one second image determined to include the point corresponding to the specified point. The processing unit restores a three-dimensional (3D) shape of the object by using the first image and the at least one second image extracted. The processing unit is configured to measure the object on the basis of the restored 3D shape, the information of the specified point, and the information of the reference dimension.

According to a fourteenth aspect of the present invention, in the twelfth aspect, the measurement device further includes a communication unit that externally receives the measurement process information.

According to a fifteenth aspect of the present invention, a measurement system includes an image acquisition device and a three-dimensional (3D) shape restoration device. The image acquisition device includes an image acquisition unit, a specified point setting unit, a reference dimension setting unit, and a communication control unit. The image acquisition unit acquires a first image generated by imaging an object to be measured in a first imaging state and acquires one or more second images generated by imaging the object in one or more second imaging states. At least one of an imaging position and an imaging posture is different between the first imaging state and the second imaging state. At least one of the imaging position and the imaging posture is different between two or more second imaging states. The specified point setting unit sets a specified point on the first image. The reference dimension setting unit sets a reference dimension on the first image. The communication control unit transmits measurement process information to the 3D shape restoration device. The measurement process information includes a plurality of images including the second image, information of the specified point, and information of the reference dimension. The 3D shape restoration device includes a communication unit, an image determination unit, an image extraction unit, a 3D shape restoration unit, and a measurement unit. The communication unit receives the measurement process information. The image determination unit determines whether or not a point corresponding to the specified point is included in the received second image on the basis of the received information of the specified point. The image extraction unit extracts the second image determined to include a point corresponding to the specified point by the image determination unit. The 3D shape restoration unit restores a 3D shape of the object by using a plurality of images including the extracted second image. The measurement unit measures the object on the basis of the restored 3D shape, the received information of the specified point, and the received information of the reference dimension.

According to a sixteenth aspect of the present invention, a three-dimensional (3D) shape restoration device includes a communication unit, an image determination unit, an image extraction unit, a 3D shape restoration unit, and a measurement unit. The communication unit externally receives measurement process information. The measurement process information includes a second image generated by imaging an object to be measured in a second imaging state, information of a specified point set on a first image generated by imaging the object in a first imaging state, and information of a reference dimension set on the first image. At least one of an imaging position and an imaging posture is different between the first imaging state and the second imaging state. The image determination unit determines whether or not a point corresponding to the specified point is included in the received second image on the basis of the received information of the specified point. The image extraction unit extracts the second image determined to include the point corresponding to the specified point by the image determination unit. The 3D shape restoration unit restores a 3D shape of the object by using a plurality of images including the extracted second image. The measurement unit measures the object on the basis of the restored 3D shape, the received information of the specified point, and the received information of the reference dimension.

According to a seventeenth aspect of the present invention, there is provided a non-transitory computer-readable recording medium recording a program for causing a computer to execute a first image acquisition step, a specified point setting step, a second image acquisition step, an image determination step, a three-dimensional (3D) shape restoration step, a reference dimension setting step, and a measurement step. The computer acquires a first image generated by imaging an object to be measured in a first imaging state in the first image acquisition step. The computer sets a specified point on the acquired first image in the specified point setting step. The computer acquires one or more second images generated by imaging the object in one or more second imaging states in the second image acquisition step. At least one of an imaging position and an imaging posture is different between the first imaging state and the second imaging state. At least one of the imaging position and the imaging posture is different between two or more second imaging states. The computer determines whether or not a point corresponding to the specified point is included in the one or more second images in the image determination step. The computer restores a 3D shape of the object by using a plurality of images including the second image determined to include the point corresponding to the specified point in the 3D shape restoration step. The computer sets a reference dimension on the first image or the 3D shape in the reference dimension setting step. The computer measures the object on the basis of the 3D shape, the specified point, and the reference dimension in the measurement step.

According to a eighteenth aspect of the present invention, there is provided a non-transitory computer-readable recording medium recording a program for causing a computer to execute a reception step, an image determination step, an image extraction step, a three-dimensional (3D) shape restoration step, and a measurement step. The computer externally receives measurement process information in the reception step. The measurement process information includes a second image generated by imaging an object to be measured in a second imaging state, information of a specified point set on a first image generated by imaging the object in a first imaging state, and information of a reference dimension set on the first image. At least one of an imaging position and an imaging posture is different between the first imaging state and the second imaging state. The computer determines whether or not a point corresponding to the specified point is included in the received second image on the basis of the received information of the specified point in the image determination step. The computer extracts the second image determined to include the point corresponding to the specified point in the image extraction step. The computer restores a 3D shape of the object by using a plurality of images including the extracted second image in the 3D shape restoration step. The computer measures the object on the basis of the restored 3D shape, the received information of the specified point, and the received information of the reference dimension in the measurement step.

DETAILED DESCRIPTION OF THE INVENTION

Hereinafter, embodiments of the present invention will be described with reference to the drawings.

First Embodiment

Figure 1:
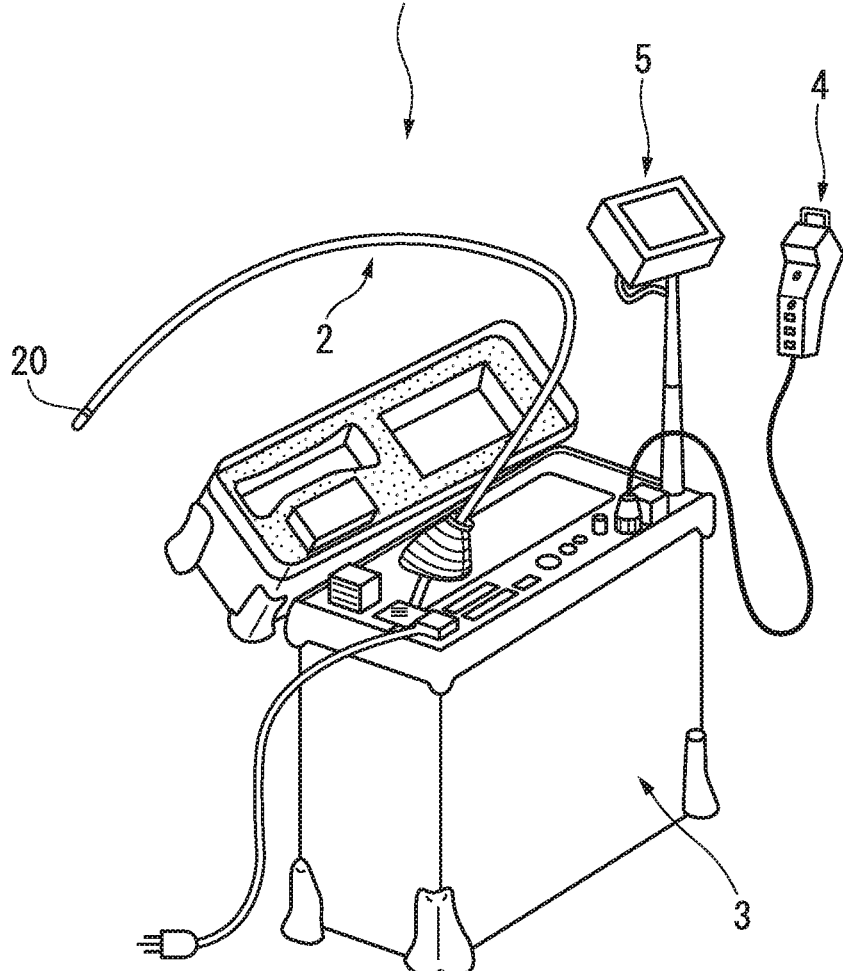
FIG. 1 is a perspective view showing the overall configuration of an endoscope device according to a first embodiment of the present invention.

FIG. 1 shows the exterior of an endoscope device 1 (a measurement device) according to a first embodiment of the present invention. The endoscope device 1 captures an image of a subject and measures geometric characteristics of the subject on the basis of the image. To observe and measure various subjects, an inspector can replace an optical adapter attached to a tip of an insertion unit 2, select a built-in measurement process program, and add a measurement process program. In the following description, as an example of measurement, a case in which measurement is performed by combining SfM-based 3D shape restoration and a reference distance input by a user will be described.

As shown in FIG. 1, the endoscope device 1 includes the insertion unit 2, a main body unit 3, an operation unit 4, and a display unit 5.

The insertion unit 2 is inserted into the subject. The insertion unit 2 has an elongated tubular shape capable of being bent from the tip 20 to a base end part. The insertion unit 2 images a measurement portion and outputs an imaging signal to the main body unit 3. An optical adapter is to be attached to the tip 20 of the insertion unit 2. For example, a monocular optical adapter is to be attached to the tip 20 of the insertion unit 2. The main body unit 3 is a control device having a housing unit for housing the insertion unit 2. The operation unit 4 receives an operation of the user on the endoscope device 1. The display unit 5 includes a display screen and displays an image of a subject imaged by the insertion unit 2, an operation menu, and the like on the display screen.

The operation unit 4 is a user interface. For example, the user interface is at least one of a button, a switch, a key, a mouse, a joystick, a touch pad, a trackball, and a touch panel. The display unit 5 is a monitor (a display) such as a liquid crystal display (LCD).

Figure 2:
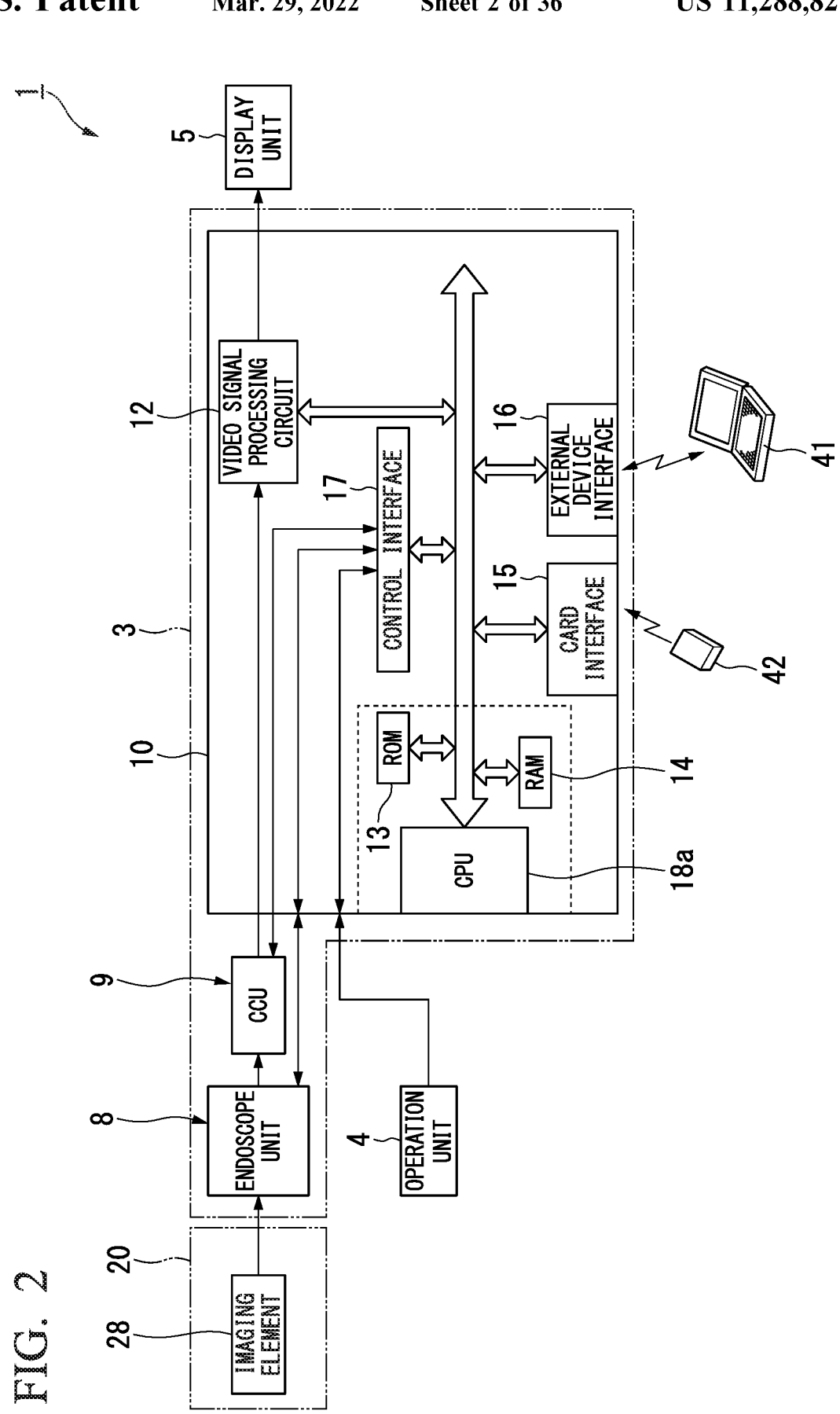
FIG. 2 is a block diagram showing an internal configuration of the endoscope device according to the first embodiment of the present invention.

As shown in FIG. 2, the main body unit 3 includes an endoscope unit 8, a camera control unit (CCU) 9, and a control device 10. The endoscope unit 8 has a light source device and a bending device (not shown). The light source device supplies illumination light necessary for observation. The bending device bends a bending mechanism (not shown). An imaging element 28 is built into the tip 20 of the insertion unit 2. The imaging element 28 is an image sensor. The imaging element 28 photoelectrically converts a subject image formed via the optical adapter and generates an imaging signal. The CCU 9 drives the imaging element 28. The imaging signal output from the imaging element 28 is input to the CCU 9. The CCU 9 performs preprocessing including amplification, noise removal, and the like on the imaging signal acquired by the imaging element 28. The CCU 9 converts the imaging signal on which the preprocessing has been performed into a video signal such as a National Television System Committee (NTSC) signal.

The control device 10 includes a video signal processing circuit 12, a read only memory (ROM) 13, a random access memory (RAM) 14, a card interface 15, an external device interface 16, a control interface 17, and a CPU 18a.

The video signal processing circuit 12 performs predetermined video processing on the video signal output from the CCU 9. For example, the video signal processing circuit 12 performs video processing related to improvement of visibility. For example, the video processing includes color reproduction, gradation correction, noise suppression, edge enhancement, and the like. The video signal processing circuit 12 also performs processing for improving measurement performance during measurement execution. Also, the video signal processing circuit 12 combines the video signal output from the CCU 9 and a graphic image signal generated by the CPU 18a. The graphic image signal includes an image of an operation screen, measurement information, and the like. The measurement information includes an image of a cursor, an image of a specified point, measurement results, and the like. The video signal processing circuit 12 outputs a combined video signal to the display unit 5.

The ROM 13 is a nonvolatile recording medium in which a program with which the CPU 18a controls the operation of the endoscope device 1 is recorded. The RAM 14 is a volatile recording medium for temporarily storing information used by the CPU 18a to control the endoscope device 1. The CPU 18a controls the operation of the endoscope device 1 on the basis of the program recorded in the ROM 13.

A memory card 42 which is a removable recording medium is connected to the card interface 15. The card interface 15 inputs control processing information, image information, and the like stored in the memory card 42 to the control device 10. Also, the card interface 15 records the control processing information, the image information, and the like generated by the endoscope device 1 in the memory card 42.

An external device such as a universal serial bus (USB) device is connected to the external device interface 16. For example, a personal computer 41 is connected to the external device interface 16. The external device interface 16 transmits information to the personal computer 41 and receives information from the personal computer 41. Thereby, a monitor of the personal computer 41 can display information. Also, the user can perform an operation related to control of the endoscope device 1 via the personal computer 41.

The control interface 17 communicates with the operation unit 4, the endoscope unit 8, and the CCU 9 for operation control. The control interface 17 notifies the CPU 18a of an instruction input by the user via the operation unit 4. The control interface 17 outputs control signals for controlling the light source device and the bending device to the endoscope unit 8. The control interface 17 outputs a control signal for controlling the imaging element 28 to the CCU 9.

The program to be executed by the CPU 18a may be recorded in a computer-readable recording medium. A computer other than the endoscope device 1 may read and execute the program recorded in this recording medium. For example, the personal computer 41 may read and execute the program. The personal computer 41 may control the endoscope device 1 by transmitting control information for controlling the endoscope device 1 to the endoscope device 1 in accordance with the program. Alternatively, the personal computer 41 may acquire a video signal from the endoscope device 1 and perform measurement using the acquired video signal.

The above-described program may be transmitted from a computer having a storage device or the like in which the program is stored to the endoscope device 1 via a transmission medium or through transmission waves in the transmission medium. The "transmission medium" for transmitting the program refers to a medium having an information transmission function, for example, a network (a communication network) such as the Internet or a communication circuit (a communication line) such as a telephone circuit. Also, the above-described program may be a program for implementing some of the above-described functions. Further, the above-described program may be a program capable of implementing the above-described functions in combination with a program already recorded on the computer, i.e., a so-called differential file (differential program).

As described above, the endoscope device 1 includes the imaging element 28 (an imaging unit), the CCU 9 (an image acquisition unit, an image acquisition circuit), and the CPU 18a. The imaging element 28 images a subject and generates an imaging signal. Thereby, the imaging element 28 generates an image of an object to be measured. The CCU 9 generates a video signal on the basis of the imaging signal. The video signal includes the image of the subject. Therefore, the CCU 9 acquires an image of the object generated by imaging the object to be measured. The image acquired by the CCU 9 is input to the CPU 18a.

The CCU 9 executes a first image acquisition process. In the first image acquisition process, the CCU 9 acquires a first image of the object to be measured. The first image is generated by imaging the object to be measured in a first imaging state. Also, the CCU 9 executes a second image acquisition process. In the second image acquisition process, the CCU 9 acquires one or more second images. The second image is generated by imaging the object to be measured in one or more second imaging states. At least one of the imaging position and the imaging posture is different between the first imaging state and the second imaging state. At least one of the imaging position and the imaging posture is different between two or more second imaging states. At least one of the imaging position and the imaging posture is different between two second imaging states for each combination of any two second imaging states. Imaging in the first imaging state is executed one or more times. Imaging in the second imaging state is executed one or more times.

Figure 3:
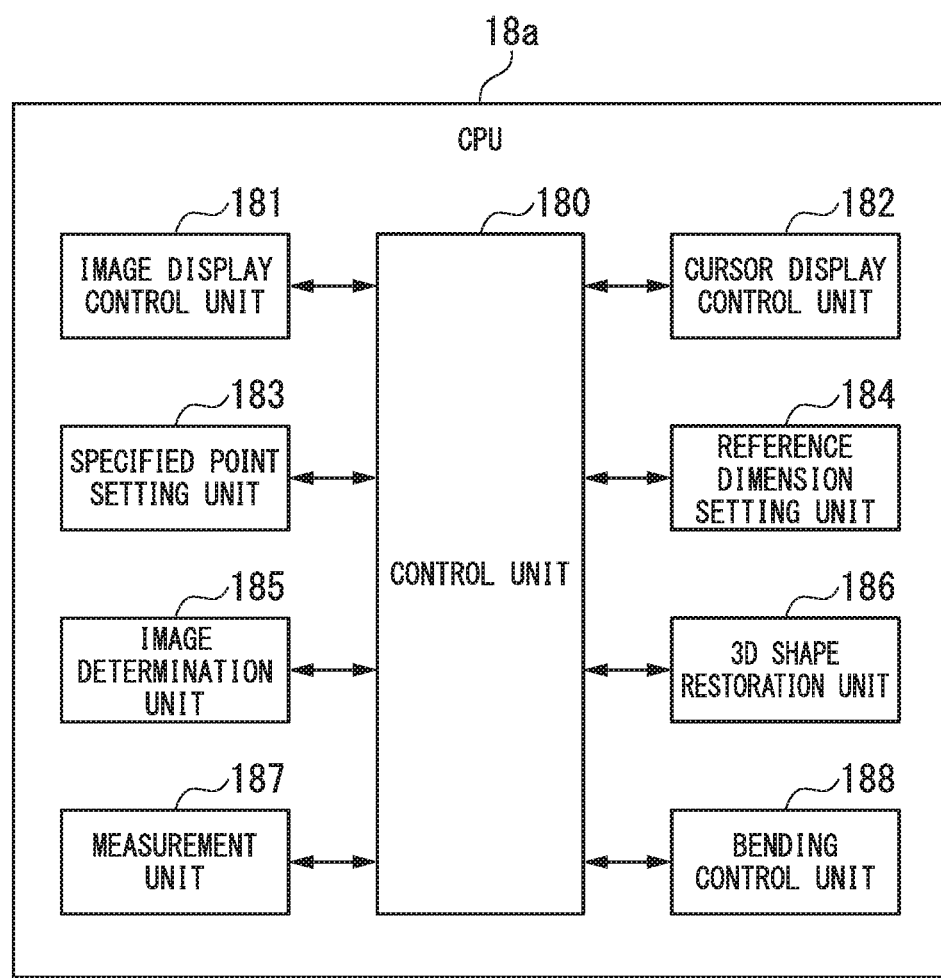
FIG. 3 is a block diagram showing a functional configuration of a central processing unit (CPU) according to the first embodiment of the present invention.

FIG. 3 shows a functional configuration of the CPU 18a. A control unit 180, an image display control unit 181, a cursor display control unit 182, a specified point setting unit 183, a reference dimension setting unit 184, an image determination unit 185, a 3D shape restoration unit 186, a measurement unit 187, and a bending control unit 188 constitute functions of the CPU 18a. At least one of the blocks shown in FIG. 3 may include a circuit separate from the CPU 18a.

Each part shown in FIG. 3 may include at least one of a processor and a logic circuit. For example, the processor is at least one of a CPU, a digital signal processor (DSP), and a graphics processing unit (GPU). For example, the logic circuit is at least one of an application specific integrated circuit (ASIC) and a field programmable gate array (FPGA). Each part shown in FIG. 3 can include one or more processors. Each part shown in FIG. 3 can include one or more logic circuits.

The control unit 180 controls a process to be performed by each part. The image display control unit 181 displays the first image acquired in the first image acquisition process on the display unit 5 by executing an image display process. For example, the image display control unit 181 controls processing of the first image performed by the video signal processing circuit 12. The image display control unit 181 causes the video signal processing circuit 12 to output the first image processed by the video signal processing circuit 12 to the display unit 5. The display unit 5 displays the first image.

The cursor display control unit 182 executes a cursor display process. In the cursor display process, the cursor display control unit 182 causes a cursor to be displayed on the first image for allowing the user to specify a specified point. For example, the cursor display control unit 182 generates a graphic image signal of the cursor. The cursor display control unit 182 outputs the generated graphic image signal to the video signal processing circuit 12. The video signal processing circuit 12 combines the video signal output from the CCU 9 and the graphic image signal output from the CPU 18a. Thereby, the cursor is superimposed on the first image. The video signal processing circuit 12 outputs a combined video signal to the display unit 5. The display unit 5 displays the first image on which the cursor is superimposed. The cursor display control unit 182 detects a cursor movement instruction input by the user operating the operation unit 4 and sequentially updates a position of the cursor on the basis of the cursor movement instructions.

A mark displayed on the first image is not limited to a cursor. For example, an icon or a pointer may be displayed. A shape and a size of the mark such as a cursor are not limited as long as it is possible to inform the user of the specified point. Also, although the term "point" is used for convenience in the present specification, the specified point does not need to be one point corresponding to one pixel on a screen. The specified point may include a region of any size. Also, the specified point may be specified in units of sub-pixels.

The specified point setting unit 183 executes a specified point setting process. The specified point setting unit 183 sets a specified point on the first image acquired by the CCU 9 in the specified point setting process. The specified point is at least one of a specified measurement point indicating a measurement position and a specified reference point indicating a position of a reference dimension. For example, the specified point is input by the user. The specified point setting unit 183 sets one or more specified measurement points and one or more specified reference points. However, the specified point setting unit 183 may set only one of a specified measurement point and a specified reference point on the first image.

For example, if only a specified measurement point is set on the first image, the specified point setting unit 183 executes a second specified point setting process. In the second specified point setting process, the specified point setting unit 183 may set a specified reference point on a 3D shape restored by the 3D shape restoration unit 186. Also, if only a specified reference point is set on the first image, the specified point setting unit 183 executes a third specified point setting process. In the third specified point setting process, the specified point setting unit 183 may set a specified measurement point on a 3D shape restored by the 3D shape restoration unit 186.

The operation unit 4 receives the specified measurement point and the specified reference point input by the user operating the operation unit 4. The operation unit 4 outputs information indicating positions of the specified measurement point and the specified reference point. The information output from the operation unit 4 is input to the control interface 17 which is an input unit. The information input to the control interface 17 is input to the CPU 18a. The specified point setting unit 183 sets a specified measurement point and a specified reference point on the basis of the information input to the CPU 18a. Information of the specified measurement point and the specified reference point set by the specified point setting unit 183 is stored in the RAM 14. The specified measurement point and the specified reference point are set by associating the specified measurement point and the specified reference point with a specific first image.

A specified point is coordinate information of a position of interest on an image determined by the user's instruction. As described above, a specified point includes a specified measurement point and a specified reference point. A specified point is assumed to be a point for specifying a measurement position and a position of a reference dimension. However, a specified point is not limited to points for these purposes. Also, a means for determining a specified point is not limited to an input by the user. For example, the specified point setting unit 183 may automatically determine a specified point on the basis of information pre-registered in the endoscope device 1. For example, a reference image in which the specified point is preset is input from the personal computer 41 or the memory card 42 to the endoscope device 1. The specified point setting unit 183 may detect a point similar to a specified point set on the reference image in the first image through pattern matching and set the detected point as a specified point.

The reference dimension setting unit 184 executes a reference dimension setting process. In the reference dimension setting process, the reference dimension setting unit 184 sets a reference dimension on the first image acquired by the CCU 9 or the 3D shape restored by the 3D shape restoration unit 186. For example, the operation unit 4 receives the reference dimension input by the user operating the operation unit 4. The operation unit 4 outputs information indicating the reference dimension. The information output from the operation unit 4 is input to the control interface 17 which is the input unit. The information input to the control interface 17 is input to the CPU 18a. The reference dimension setting unit 184 sets the reference dimension on the basis of the information input to the CPU 18a. The reference dimension set by the reference dimension setting unit 184 is stored in the RAM 14. The reference dimension is set by associating the reference dimension with a specific specified reference point in a specific first image. Alternatively, the reference dimension is set by associating the reference dimension with a point corresponding to a specific specified reference point in a specific 3D shape.

In the following example, the reference dimension is a reference distance between two points. As described above, the reference distance is given by the user. For example, the user specifies two specified reference points and specifies a distance therebetween as the reference distance. The reference distance specified by the user is known. For example, the reference distance in a known structure in the subject is specified by the user.

The reference distance may be input from a distance acquisition unit (not shown) to the endoscope device 1. For example, the distance acquisition unit has an active projection system and a 3D measurement unit. The active projection system projects light having a shape such as a point, a line, and a stripe onto the subject. The 3D measurement unit calculates the reference distance on the basis of the image of the subject onto which the light is projected. The 3D measurement unit may acquire the specified reference point on the basis of a position where the reference distance is calculated. The specified reference point indicating a position of the reference dimension may be input from a device which has measured the reference dimension. For example, the specified reference point may be input from the 3D measurement unit or the distance acquisition unit to the endoscope device 1. The distance acquisition unit may calculate the reference distance by using a time-of-flight measurement method (a time of flight). The distance acquisition unit may be a sensing means using sensors such as a 3D acceleration sensor, a gyro sensor, and a radio wave sensor.

For example, the external device interface 16 may acquire the specified reference point and the reference distance from the distance acquisition unit. As described above, in an example, the distance acquisition unit includes the active projection system and the 3D measurement unit. The specified reference point and the reference distance output from the distance acquisition unit are input to the external device interface 16. The specified reference point and the reference distance input to the external device interface 16 are input to the CPU 18a. The specified point setting unit 183 sets the specified reference point output from the distance acquisition unit on the first image or the 3D shape. The reference dimension setting unit 184 sets the reference distance output from the distance acquisition unit on the first image or the 3D shape. In this case, because the specified reference point and the reference distance are automatically determined, this is not troublesome for the user.

The endoscope device 1 may include a memory configured to store a reference dimension calculated in advance. The reference dimension setting unit 184 may read a reference dimension corresponding to a specified reference point set by the specified point setting unit 183 from the memory and set the read reference dimension on the first image or the 3D shape.

The image determination unit 185 executes an image determination process. In the image determination process, the image determination unit 185 determines whether or not a point corresponding to the specified point is included in one or more second images. The image determination unit 185 according to the first embodiment determines whether or not a point corresponding to each of the specified measurement point and the specified reference point is included in one or more second images by executing the image determination process. The image determination unit 185 extracts or selects a second image including a point corresponding to each of the specified measurement point and the specified reference point from among the second images acquired by the CCU 9.

The 3D shape restoration unit 186 executes a 3D shape restoration process. In the 3D shape restoration process, the 3D shape restoration unit 186 restores a 3D shape of an object to be measured by using a plurality of images including the second image determined to include a point corresponding to the specified point by the image determination unit 185. For example, the 3D shape restoration unit 186 uses one first image and one or more second images. Alternatively, the 3D shape restoration unit 186 uses a plurality of second images. If the plurality of second images are used, the 3D shape restoration unit 186 need not use the first image. However, at least one of an imaging position and an imaging posture needs to be different between two or more second images. The 3D shape restoration method will be described below.

The measurement unit 187 executes a measurement process. In the measurement process, the measurement unit 187 measures the object to be measured on the basis of the 3D shape, the specified point, and the reference dimension. The 3D shape is restored by the 3D shape restoration unit 186. The specified point includes a specified measurement point and a specified reference point. The specified point is set by the specified point setting unit 183. The reference dimension is set by the reference dimension setting unit 184. The measurement unit 187 calculates 3D coordinates corresponding to the specified measurement point by using two-dimensional (2D) coordinates of the specified measurement point and the specified reference point and the reference distance. The measurement unit 187 measures a 3D dimension of the subject on the basis of 3D coordinates corresponding to the specified measurement point.

The bending control unit 188 executes a bending control process. The bending control unit 188 controls the bending mechanism for bending the tip 20 of the insertion unit 2 in the bending control process. For example, on the basis of an instruction from the control unit 180, the bending control unit 188 generates a command for bending the tip 20 of the insertion unit 2 in one of up, down, left, and right directions. The command generated by the bending control unit 188 is output to the endoscope unit 8 via the control interface 17. The endoscope unit 8 drives the bending mechanism on the basis of the command to bend the tip 20 of the insertion unit 2.

A procedure of a specific process to be executed by the 3D shape restoration unit 186 and the measurement unit 187 will be described. The 3D shape restoration unit 186 receives a plurality of images output from the video signal processing circuit 12 and coordinate information of specified points stored in the RAM 14. An example in which the 3D shape restoration unit 186 receives two images from the video signal processing circuit 12 will be described below. Even when three or more images are used, the basic principle is the same as when two images are used. The method described below can also be applied to the case in which three or more images are used.

Figure 4:
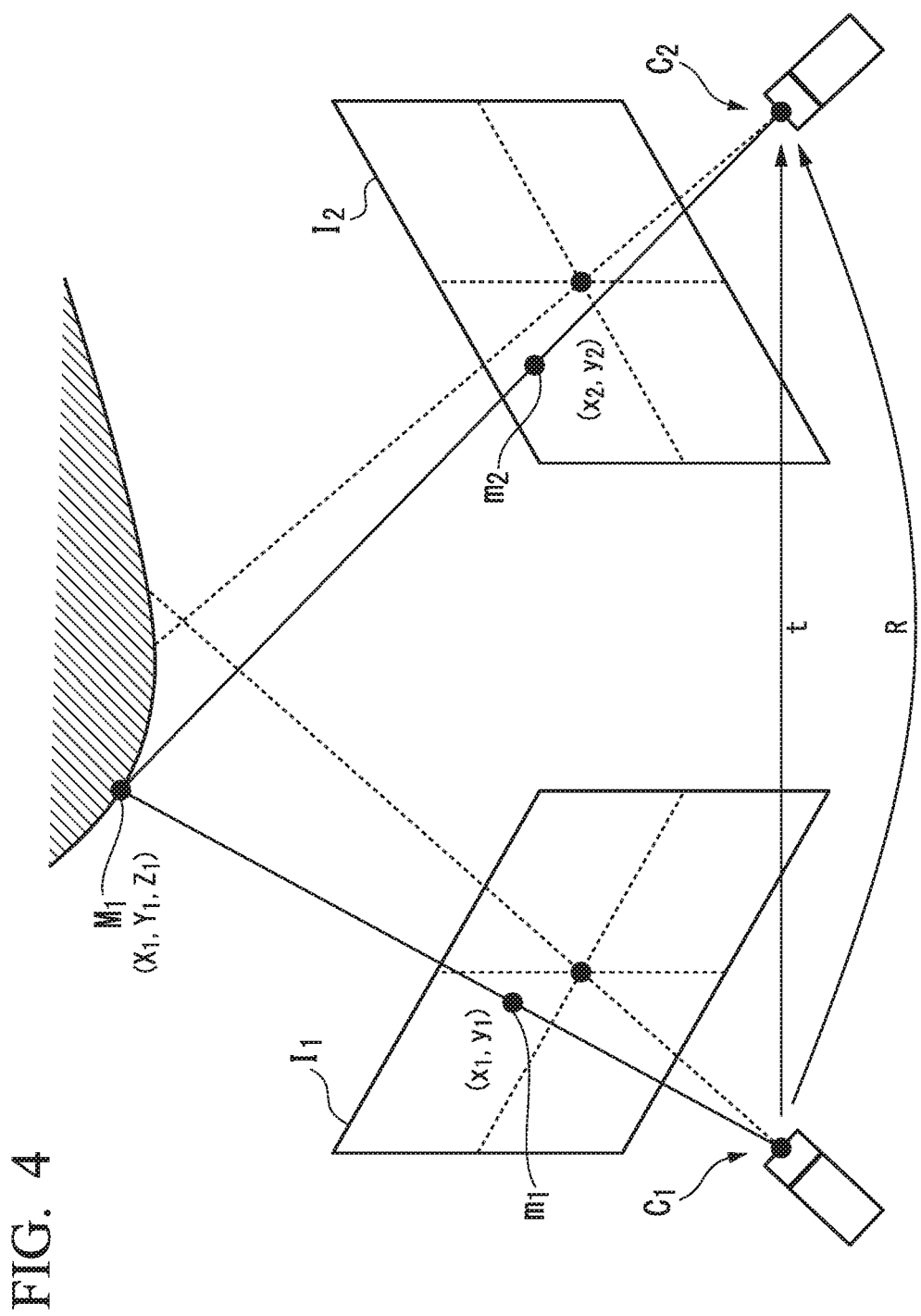
FIG. 4 is a schematic diagram showing a situation of image acquisition according to the first embodiment of the present invention.

FIG. 4 schematically shows a situation of image acquisition when two images of a subject to be measured are acquired. In the following description, the expression of a camera in a broad sense is used. Specifically, the camera in the following description refers to an observation optical system of the tip of the endoscope (the tip 20 of the insertion unit 2).

As shown in FIG. 4, an image $I_1$ is first acquired in an imaging state $c_1$ of the camera. Next, an image $I_2$ is acquired in an imaging state $c_2$ of the camera. At least one of an imaging position and an imaging posture is different between the imaging state $c_1$ and the imaging state $c_2$. In FIG. 4, both the imaging position and the imaging posture are different between the imaging state $c_1$ and the imaging state $c_2$.

In each embodiment of the present invention, images $I_1$ and $I_2$ are assumed to be acquired by the same endoscope. Also, in each embodiment of the present invention, it is assumed that parameters of the objective optical system of the endoscope do not change. The parameters of the objective optical system are a focal length, distortion aberration, a pixel size of the image sensor, and the like. In the following, the parameters of the objective optical system are abbreviated as internal parameters for convenience. When such conditions are assumed, the internal parameters describing characteristics of the optical system of the endoscope can be used in common regardless of the position and the posture of the camera at the tip of the endoscope. In each embodiment of the present invention, it is assumed that the internal parameters are acquired at the time of factory shipment and the internal parameters are known at the time of measurement.

When the image $I_1$ and the image $I_2$ are acquired using different endoscope devices, common internal parameters cannot be used. Also, if the internal parameters differ according to each image when the image $I_1$ and the image $I_2$ are acquired using the same endoscope device, common internal parameters cannot be used. However, because it is possible to calculate internal parameters as unknowns, the subsequent procedure does not significantly change according to whether or not the internal parameters are known. In the former case, each endoscope device may store individual internal parameters in advance.

Figure 5:
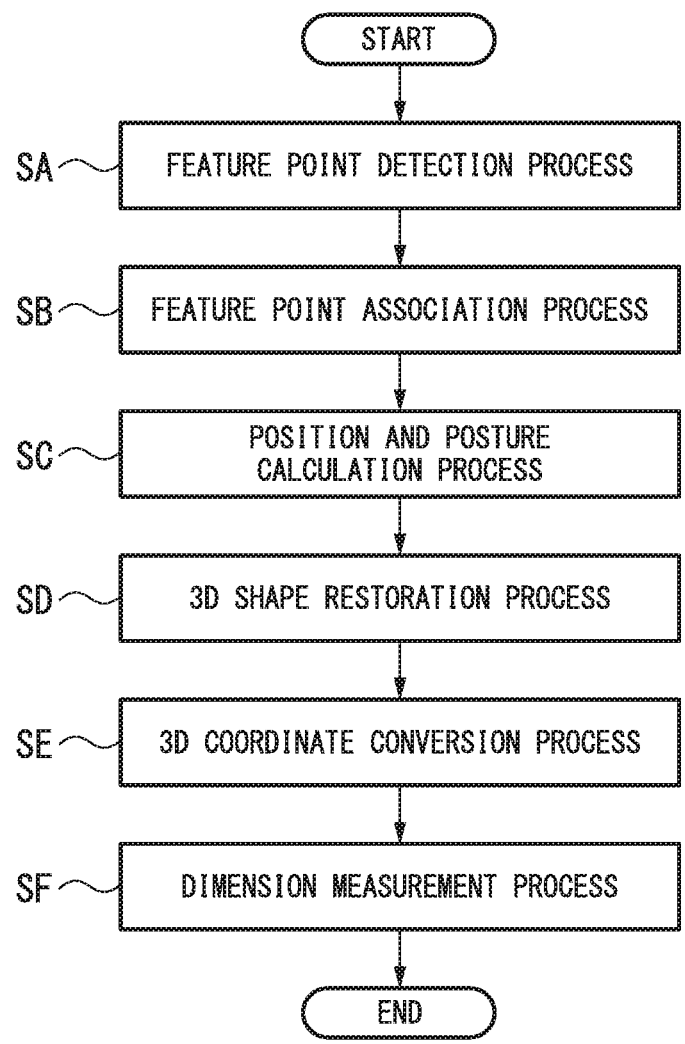
FIG. 5 is a flowchart showing a procedure of a process for 3D shape restoration and measurement according to the first embodiment of the present invention.

A procedure of calculating 3D coordinates of a subject on the basis of an acquired subject image will be described with reference to FIG. 5. FIG. 5 shows a processing procedure for 3D shape restoration and measurement.

First, the 3D shape restoration unit 186 executes a feature point detection process (step SA). In the feature point detection process, the 3D shape restoration unit 186 detects feature points from the two acquired images. The feature points refer to a corner, an edge, and the like having a large image luminance gradient in subject information shown in the image. A scale-invariant feature transform (SIFT), features from accelerated segment test (FAST), and the like are used as a method of detecting feature points. By using such a method, it is possible to detect feature points in an image.

FIG. 4 shows an example in which a feature point $m_1$ is detected in the image $I_1$ and a feature point $m_2$ is detected in the image $I_2$. Although only one feature point of each image is displayed in FIG. 4, a plurality of feature points are detected in each image in reality. It is possible for the number of feature points detected in each image to be different. Each feature point detected in each image is converted into data called a feature quantity. The feature quantity is data representing a feature of the feature point.

After step SA, the 3D shape restoration unit 186 executes a feature point association process (step SB). In the feature point association process, the 3D shape restoration unit 186 compares correlations of feature quantities between images with respect to each feature point detected in the feature point detection processing of step SA. If the result of comparing the correlations of the feature quantities shows that a feature point having a similar feature quantity is found in each image, the 3D shape restoration unit 186 stores information thereof in the RAM 14. On the other hand, if a feature point having a similar feature quantity is not found, the 3D shape restoration unit 186 deletes information of the feature point.

After step SB, the 3D shape restoration unit 186 reads coordinates of feature points (a feature point pair) of two images associated with each other from the RAM 14. The 3D shape restoration unit 186 executes a process of calculating a position and posture on the basis of the read coordinates (step SC). In the position and posture calculation process, the 3D shape restoration unit 186 calculates a relative position and posture between the imaging state $c_1$ of the camera in which the image $I_1$ has been acquired and the imaging state $c_2$ of the camera in which the image $I_2$ has been acquired. More specifically, the 3D shape restoration unit 186 calculates a matrix E by solving the following Equations (1) using an epipolar constraint.

$$p_1^T E p_2 = 0 \quad E = [t]_X R \quad \because [t]_X = \begin{pmatrix} 0 & -t_z & t_y \\ t_z & 0 & -t_x \\ -t_y & t_x & 0 \end{pmatrix} \quad (1)$$

E denotes a base matrix. The basic matrix E is a matrix storing a relative position and posture between the imaging state $c_1$ of the camera in which the image $I_1$ has been acquired and the imaging state $c_2$ of the camera in which the image $I_2$ has been acquired. In Equations (1), $p_1$ is a matrix including coordinates of the feature points detected in the image $I_1$. $p_2$ is a matrix including coordinates of the feature points detected in the image $I_2$. Because the basic matrix E contains information related to the relative position and posture of the camera, it corresponds to external parameters of the camera. The base matrix E can be solved using well-known algorithms As shown in FIG. 4, when an amount of position change of the camera is denoted by t and an amount of posture change of the camera is denoted by R, Equations (2) and (3) are established.

$$t = (t_x, t_y, t_z) \quad (2)$$

$$R = R_x(\alpha) R_y(\beta) R_z(\gamma) \quad (3)$$
$$= \begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix}$$

In Equation (2), $t_x$ denotes an amount of movement in an x-axis direction, $t_y$ denotes an amount of movement in a y-axis direction, and $t_z$ denotes an amount of movement in a z-axis direction. In Equation (3), $R_x(\alpha)$ denotes an amount of rotation a around the x axis, $R_y(\beta)$ denotes an amount of rotation β around the y axis, and $R_z(\gamma)$ denotes an amount of rotation y around the z axis. After the basic matrix E is calculated, an optimization process such as bundle adjustment may be executed to improve the accuracy of 3D coordinate restoration.

After step SC, the 3D shape restoration unit 186 performs a process of restoring the 3D shape of the subject on the basis of the relative position and posture (the amount of position change t and the amount of posture change R) of the camera calculated in step SC (step SD). Examples of a method for restoring the 3D shape of the subject include patch-based multi-view stereo (PMVS), a matching process based on parallel stereo, and the like. However, the means is not limited in particular.

After step SD, the measurement unit 187 executes a 3D coordinate conversion process on the basis of 3D shape data of the subject calculated in the 3D shape restoration processing of step SD and information of the reference distance read from the RAM 14. In the 3D coordinate conversion process, the measurement unit 187 converts the 3D shape data of the object into 3D coordinate data having a length dimension (step SE).

After step SE, the measurement unit 187 executes a dimension measurement process on the basis of the 3D coordinate data of the subject (step SF). Because the dimension measurement process is the same as the measurement process with which a conventional industrial endoscope is equipped, detailed description thereof will be omitted. For example, the measurement unit 187 performs dimension measurement such as distance measurement between two points and surface reference measurement in accordance with a measurement mode selected by the user.

The above is a general processing procedure for obtaining 3D coordinates. In the above description, information about the specified point is not used. The greatest feature of each embodiment of the present invention is to use the information of the specified point in addition to the above processing procedure. Details thereof will be described below.

Figure 6:
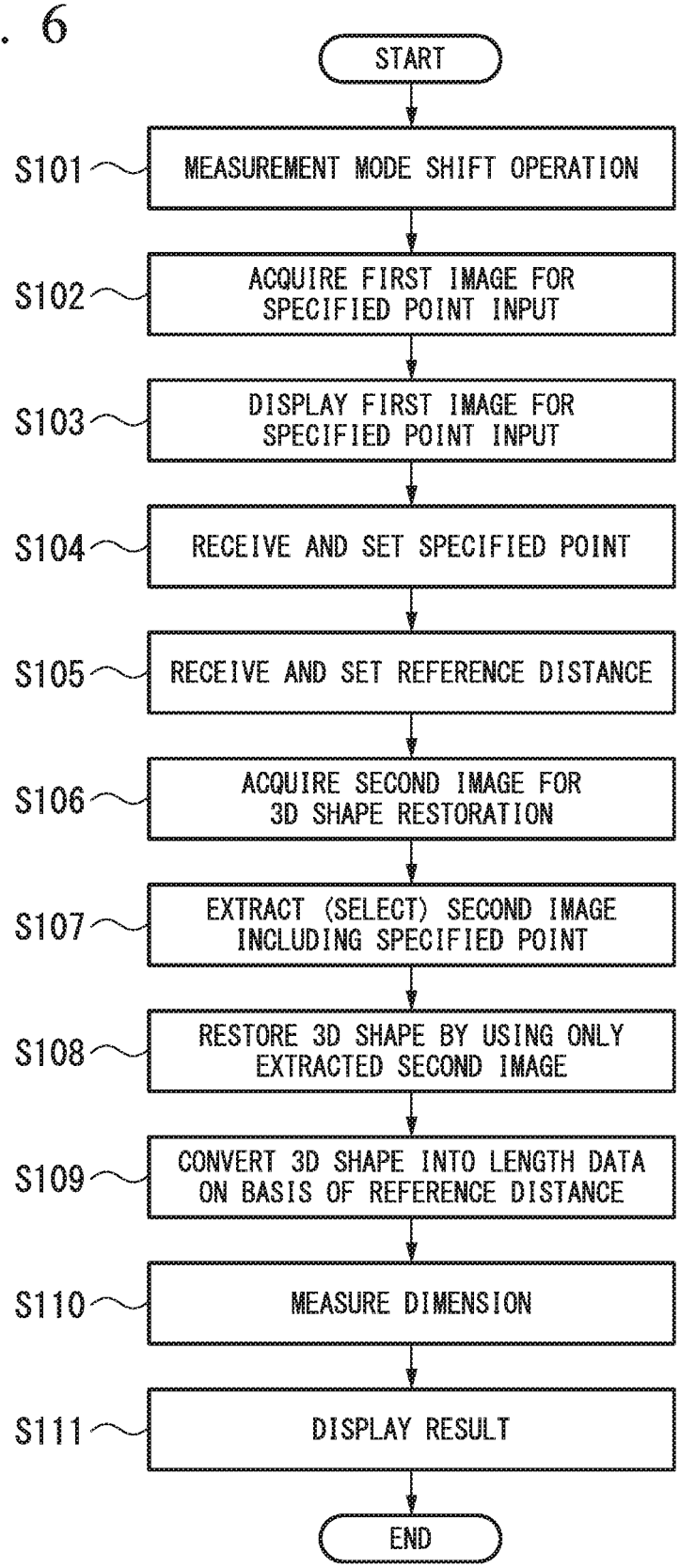
FIG. 6 is a flowchart showing a procedure of a 3D measurement process according to the first embodiment of the present invention.

The 3D measurement process in the first embodiment will be described with reference to FIG. 6. FIG. 6 shows a procedure of the 3D measurement process. An example in which the measurement unit 187 measures a distance between two points will be described below.

In inspection based on an endoscope, the user checks the situation of the subject in a live image, thereby checking whether or not there are defects and scratches. At this time, a mode of the endoscope device 1 is referred to as an inspection mode. During inspection, when a defect or a scratch to be measured is found on a subject, the user desires to perform measurement. At that time, the user operates the operation unit 4 to shift the mode of the endoscope device 1 to a measurement mode (step S101). For example, when the user taps an icon displayed on the display unit 5, the mode of the endoscope device 1 is shifted from the inspection mode to the measurement mode. Alternatively, the user may press a measurement mode shift button by using an input device such as a remote controller. The operation of shifting the mode of the endoscope device 1 from the inspection mode to the measurement mode is not limited to the above example.

After the mode of the endoscope device 1 is switched from the inspection mode to the measurement mode in step S101, one image for a specified point input is acquired. That is, the imaging element 28 generates one first image by imaging the subject once in the first imaging state. The CCU 9 acquires one generated first image (step S102).

After the first image is acquired in step S102, the image display control unit 181 causes the display unit 5 to display the acquired first image (step S103). A plurality of first images may be acquired in a plurality of first imaging states. At least one of the imaging position and the imaging posture is different between two or more first imaging states. When a plurality of first images are acquired, each first image may be displayed as a thumbnail on the display unit 5, and one optimum first image may be selected by the user. Alternatively, the image display control unit 181 may automatically extract one optimum image for allowing the user to input the specified point, and display the image on the display unit 5.

After the first image is displayed on the display unit 5 in step S103, the user operates the operation unit 4 to specify the specified point on the displayed first image. The operation unit 4 receives a specified measurement point and a specified reference point specified by the user. The specified point setting unit 183 sets the specified reference point and the specified measurement point specified by the user on the displayed first image (step S104).

Figure 7:
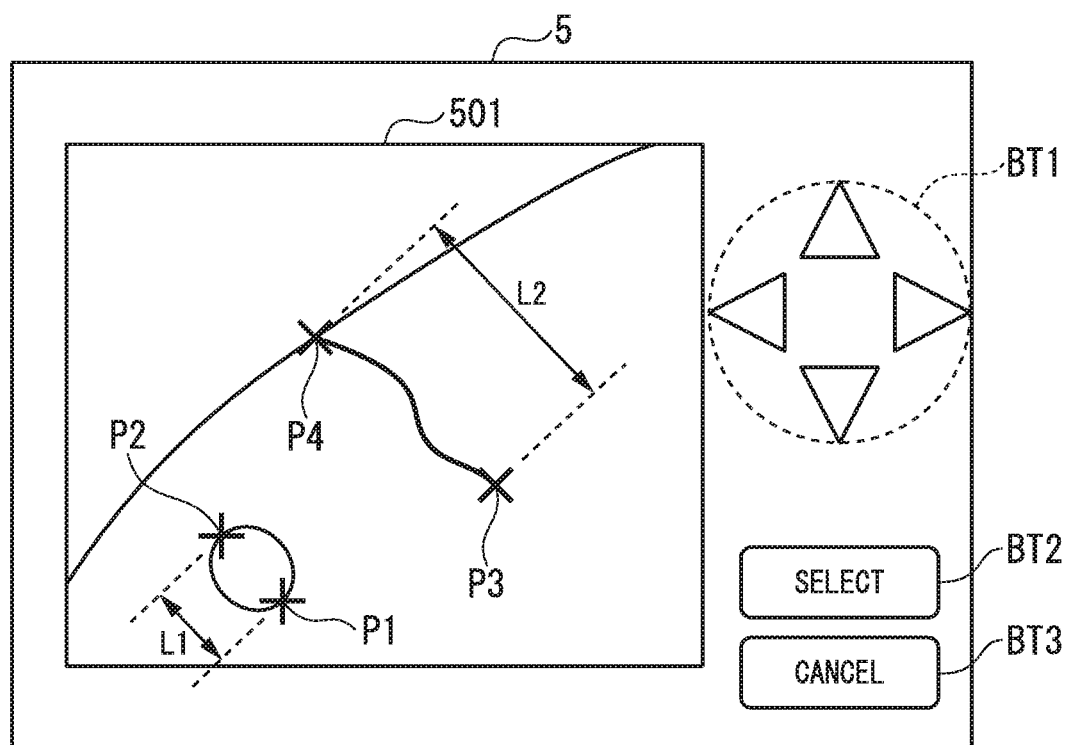
FIG. 7 is a reference diagram showing a screen of a display unit according to the first embodiment of the present invention.

FIG. 7 shows a screen of the display unit 5. As shown in FIG. 7, the first image 501 is displayed. In this example, two specified reference points P1 and P2 and two specified measurement points P3 and P4 are set on the first image 501 displayed on the display unit 5.

To define the reference distance on the first image displayed on the display unit 5, the user specifies two specified reference points P1 and P2 constituting a known reference distance. A distance L1 between the specified reference point P1 and the specified reference point P2 is the reference distance. Further, the user specifies the specified measurement point P3 and the specified measurement point P4 to define the distance between the two points desired to be measured by the user. A distance L2 between the specified measurement point P3 and the specified measurement point P4 is the distance between two points to be measured.

In an example shown in FIG. 7, the display unit 5 is configured as a touch panel. Buttons BT1, BT2, and BT3 constitute the operation unit 4 as a touch panel. The user operates the button BT1 to move a cursor (not shown). When the user presses the button BT2, the specified point is specified at a position of the cursor. When the user presses the button BT3, the specified point which is specified is canceled. When each specified point is specified by the user's operation, the specified point setting unit 183 calculates a position (coordinates) of each specified point which is specified. Position information (coordinate information) of four specified points is stored in the RAM 14.

The two specified reference points P1 and P2 and the two specified measurement points P3 and P4 which are specified are displayed on the display unit 5. The image display control unit 181 causes the display unit 5 to display the specified measurement points and the specified reference points. Specifically, the image display control unit 181 generates a graphic image signal of each specified point. The image display control unit 181 outputs the generated graphic image signal to the video signal processing circuit 12. The video signal processing circuit 12 combines the video signal output from the CCU 9 and the graphic image signal output from the CPU 18a. Thereby, each specified point is superimposed on the first image. The video signal processing circuit 12 outputs a combined video signal to the display unit 5. The display unit 5 displays the first image on which each specified point is superimposed. Thereby, the user can recognize a position of each specified point.

After the specified point is set in step S104, the user specifies a reference distance by operating the operation unit 4. The user specifies a length of the reference distance already known by the user as a numerical value. The operation unit 4 receives the reference distance specified by the user. The reference dimension setting unit 184 sets the reference distance on the acquired first image (step S105).

In this example, the reference distance is a distance between two specified reference points set on a subject plane, and is defined by two points. However, the reference distance is not limited to a distance defined by two points. For example, only one specified reference point may be set on the subject, and the distance (an object distance) from the specified reference point to the tip of the endoscope may be set as the reference distance. In this case, the reference distance is defined by only one point.

After the reference distance is set in step S105, an image for 3D shape restoration is acquired. That is, the imaging element 28 generates one or more second images by imaging the subject one or more times in the second imaging state. The CCU 9 acquires one or more generated second images (step S106). When the number of second images is one, the second image is generated by imaging in the second imaging state different from the first imaging state of the camera when the subject is imaged in step S102. When the number of second images is two or more, the second images are generated by imaging in two or more second imaging states between which the imaging position and the imaging posture are different.

The endoscope device 1 includes an insertion unit 2 which is inserted into an object to be measured and is bendable. The imaging element 28 configured to generate a first image and a second image is arranged in the insertion unit 2. The imaging state is changed by bending the insertion unit 2 between the imaging in the first imaging state and the imaging in the second imaging state or between a plurality of times of imaging in the second imaging state. To change the imaging state of the tip of the camera, the bending control unit 188 drives the bending mechanism to cause the tip of the endoscope to be bent between the imaging in the first imaging state and the imaging in the second imaging state. Also, the bending control unit 188 bends the tip of the endoscope by driving the bending mechanism between a plurality of times of imaging in the second imaging state.

The imaging state of the camera may be changed using a method other than bending control based on driving of the bending mechanism. For example, at least one of a first operation, a second operation, and a third operation may be performed by the user between the imaging in the first imaging state and the imaging in the second imaging state. The first operation is an operation in which the user pushes the insertion unit 2 toward the inside of the subject. The second operation is an operation in which the user pulls the insertion unit 2 toward the user. The third operation is an operation in which the user twists the insertion unit 2. At least one of the first operation, the second operation, and the third operation may be performed by the user between a plurality of times of imaging in the second imaging state. As described above, between the imaging in the first imaging state and the imaging in the second imaging state, or between a plurality of times of imaging in the second imaging state, the imaging state may be changed by the user.

After one or more second images are acquired, the image determination unit 185 determines whether or not a point corresponding to each of the four specified points set on the first image are included in one or more acquired second images. The image determination unit 185 extracts only a second image including the point corresponding to each of the four specified points from among the second images acquired by the CCU 9 (step S107).

In this process, the image determination unit 185 reads coordinate information of each of the four specified points from the RAM 14. In each of a plurality of second images, the image determination unit 185 searches for four correspondence points corresponding to four pieces of coordinate information. Each correspondence point has a feature corresponding to a feature of each specified point. The image determination unit 185 extracts only a second image in which all four correspondence points exist and stores the extracted second image in the RAM 14. A second image in which none of the four correspondence points exists is deleted and is not used for the 3D shape restoration process.

If the acquired first image is not used for the 3D shape restoration process, the image determination unit 185 extracts a plurality of second images in step S107. If the acquired first image is used for the 3D shape restoration process, the image determination unit 185 may extract only one second image in step S107.

If the correspondence point is included in the second image and the correspondence point is at an edge of the second image, there is a possibility that the accuracy of the 3D shape restoration will be decreased. Thus, the image determination unit 185 may determine whether or not the correspondence point is inside a predetermined region in the second image including a center of the second image. The image determination unit 185 may extract only a second image in which the correspondence point is inside the predetermined region in the second image including the center of the second image. If the correspondence point is located outside the predetermined region in the second image including the center of the second image, the image determination unit 185 may determine that the correspondence point is not shown within an imaging field of view of the second image and exclude the second image from being an object of the 3D shape restoration process. If the acquired first image is used for the 3D shape restoration process, the image determination unit 185 may make the same determination as the above determination on the first image.

After the second image including the correspondence point is extracted in step S107, the 3D shape restoration unit 186 restores the 3D shape of the subject by using only the extracted second image (step S108). A technical processing procedure related to the 3D shape restoration process is as described above.

After the 3D shape of the subject is restored in step S108, the measurement unit 187 converts the 3D shape data of the subject into 3D coordinate data having a length dimension (step S109). At this time, the measurement unit 187 uses the two specified reference points set in step S104 and the reference distance set in step S105.

After step S109, the measurement unit 187 measures a distance between two points defined by the two specified measurement points P3 and P4 in a well-known measurement method on the basis of the 3D coordinate data obtained in step S109 (Step S110).

After the length of the distance between the two points is measured, the image display control unit 181 displays a measurement result on the first image. For example, the image display control unit 181 generates a graphic image signal of the measurement result. The image display control unit 181 outputs the generated graphic image signal to the video signal processing circuit 12. The video signal processing circuit 12 combines the video signal output from the CCU 9 and the graphic image signal output from the CPU 18*a*. Thereby, the measurement result is superimposed on the first image. The video signal processing circuit 12 outputs a combined video signal to the display unit 5. The display unit 5 displays the first image on which the measurement result is superimposed (step S111). The measurement result may be recorded in an external medium such as the memory card 42. By executing the processing of step S111, the 3D measurement process is completed.

In the above description, only a second image including all the four correspondence points corresponding to the four specified points is extracted from among a plurality of second images for 3D shape restoration and the 3D shape is restored on the basis of the extracted second image. However, extracting the second image including all the four correspondence points corresponding to the four specified points is not necessary. For example, a second image including a correspondence point corresponding to at least one of the four specified points may be extracted. In this case, the correspondence point may be a point corresponding to any of the four specified points. If there are a plurality of second images, the second image may be extracted such that a correspondence point corresponding to a common specified point is included in all of a plurality of extracted second images. In this case, at least one of the four specified points is specified in advance as a common specified point and a second image including a correspondence point corresponding to the common specified point is extracted.

Extracting all the second images including four correspondence points corresponding to the four specified points is not necessary. Only some of a plurality of second images including the four correspondence points may be extracted. That is, the second images to be extracted may be thinned out. By reducing the number of images to be used for the 3D shape restoration process in an allowable range of the accuracy of the 3D shape restoration process, a processing time can be further shortened.

In the first embodiment, after the reference distance setting (step S105) is executed, restoration of the 3D shape (step S108) is executed. That is, the reference dimension setting process is executed before the 3D shape restoration process is executed. In other words, before the 3D shape restoration unit 186 restores the 3D shape, the reference dimension setting unit 184 sets the reference dimension on the first image acquired by the CCU 9. A timing at which the reference distance setting (step S105) is executed may be any timing as long as it is before a timing at which a process for conversion into the 3D coordinate data having a length dimension (step S109) is executed. For example, after the restoration of the 3D shape (step S108) is executed, the reference distance setting (step S105) may be executed. That is, the reference dimension setting process may be executed after the 3D shape restoration process is executed. In other words, after the 3D shape restoration unit 186 restores the 3D shape, the reference dimension setting unit 184 may set the reference dimension on the 3D shape restored by the 3D shape restoration unit 186.

The specified point and the reference distance are not always determined by the user's instruction. The endoscope device 1 may have a support function for determining at least one of the specified point and the reference distance and the user may make a final determination of at least one of the specified point and the reference distance. Alternatively, the endoscope device 1 may make a final determination of at least one of the specified point and the reference distance. In each embodiment of the present invention, for ease of understanding, it is assumed that the user specifies the specified point and the reference distance.

In each embodiment of the present invention, because distance measurement between two points is assumed to be executed, the two points are specified as specified measurement points. However, if measurement other than distance measurement between two points, for example, surface reference measurement, is performed, five specified reference points and one specified measurement point are specified. In this manner, there is a possibility that the number of points specified by the user will change.

In the first embodiment, after the specified point setting (step S104) is executed, the second image acquisition (step S106) is executed. That is, the specified point setting process is executed before the second image acquisition process is executed. In other words, before the CCU 9 acquires the second image, the specified point setting unit 183 sets a specified point on the first image acquired by the CCU 9. However, a timing at which the specified point is set is not limited thereto. Specified point setting may be performed at least before extraction of an image used for restoring the 3D shape (step S107) is executed.

For example, after the second image acquisition (step S106) is executed, the specified point setting (step S104) may be executed. That is, the specified point setting process may be executed after the second image acquisition process is executed. In other words, after the CCU 9 acquires the second image, the specified point setting unit 183 may set the specified point.

The CPU 18a need not have at least one of the image display control unit 181, the cursor display control unit 182, and the bending control unit 188. These are not essential components of the present invention.

In the processing shown in FIG. 6, processing in at least one of steps S101, S103, and S111 need not be executed. These are not essential processes of the present invention.

As described above, restoration of the 3D shape is executed on the basis of only a second image including a correspondence point corresponding to the specified point set on the first image. For a second image in which the correspondence point is not included, restoration of the 3D shape is not executed. Thereby, a period required for the 3D shape restoration process is shortened as compared with a conventional configuration. Thus, by displaying a measurement result on the display unit 5, the endoscope device 1 can significantly shorten a measurement process time until the user obtains the measurement result. Therefore, inspection efficiency is improved.

Modified Example of First Embodiment

In a modified example of the first embodiment of the present invention, a process of setting the specified point is divided into a process of setting a specified measurement point and a process of setting a specified reference point. Before a 3D shape restoration process is executed, the process of setting the specified measurement point is executed. That is, before a 3D shape restoration unit 186 restores the 3D shape, a specified point setting unit 183 sets the specified measurement point on the first image acquired by a CCU 9. Also, after the 3D shape restoration process is executed, the process of setting the specified reference point is executed. That is, a specified point setting unit 183 sets the specified reference point on a 3D shape restored by the 3D shape restoration unit 186.

Figure 8:
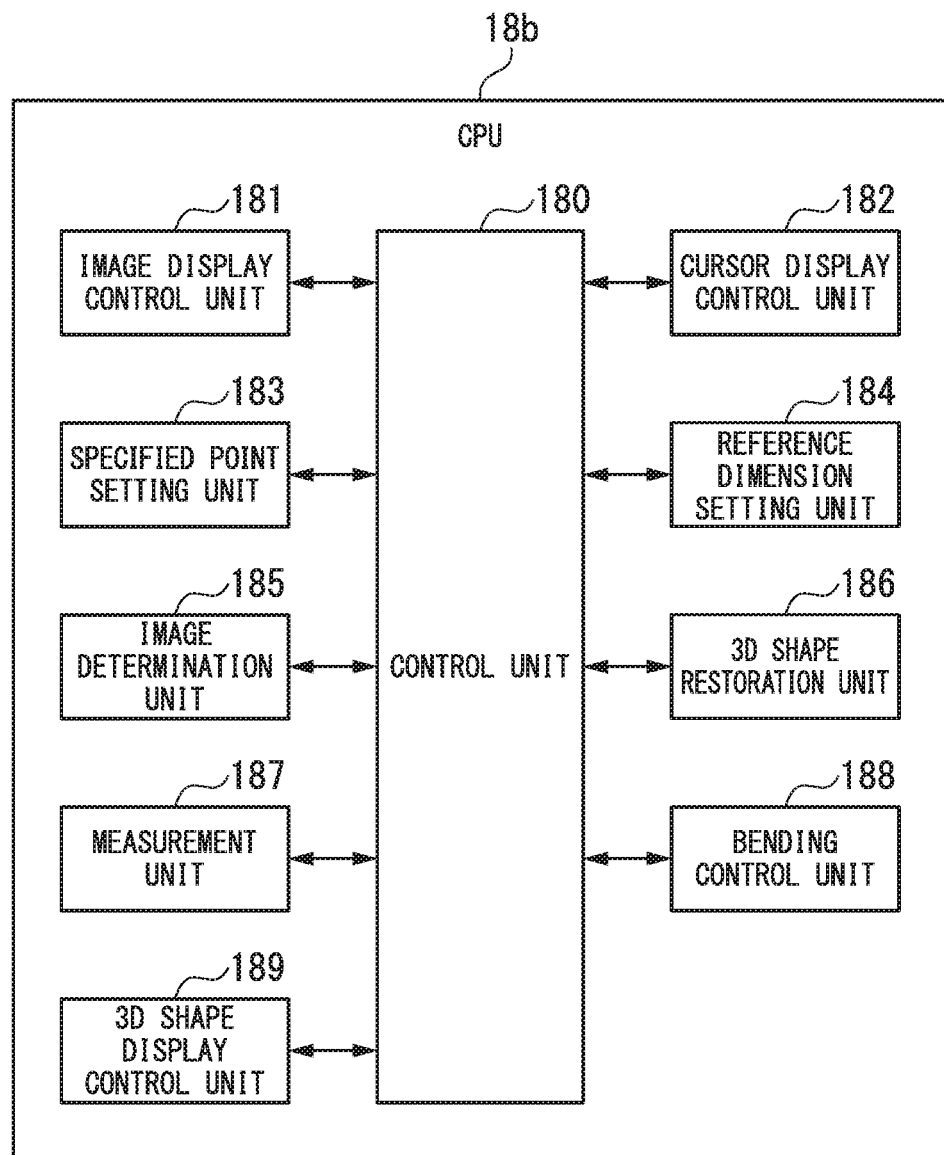
FIG. 8 is a block diagram showing a functional configuration of a CPU according to a modified example of the first embodiment of the present invention.

In the modified example of the first embodiment, the CPU 18a in the first embodiment is changed to a CPU 18b shown in FIG. 8. FIG. 8 shows a functional configuration of the CPU 18b. Differences from the configuration shown in FIG. 3 will be described with respect to the configuration shown in FIG. 8.

In addition to the configuration shown in FIG. 3, the CPU 18b includes a 3D shape display control unit 189. The 3D shape display control unit 189 executes a 3D shape display process. In the 3D shape display process, the 3D shape display control unit 189 causes a display unit 5 to display a 3D shape for allowing the user to specify the specified point. For example, the 3D shape display control unit 189 generates a graphic image signal of the 3D shape restored by the 3D shape restoration unit 186. The 3D shape display control unit 189 outputs the generated graphic image signal to a video signal processing circuit 12. The video signal processing circuit 12 outputs a video signal output from the CCU 9 to the display unit 5. The display unit 5 displays the 3D shape.

The specified point setting unit 183 sets a specified measurement point on the first image acquired by the CCU 9. After the specified measurement point is set by the specified point setting unit 183, an image determination unit 185 determines whether or not a point corresponding to the specified measurement point is included in one or more second images. The 3D shape restoration unit 186 restores a 3D shape of an object to be measured by using a plurality of images including the second image determined to include a point corresponding to the specified measurement point in the image determination process. The specified point setting unit 183 sets a specified reference point on the 3D shape restored by the 3D shape restoration unit 186.

Regarding points other than the above, a configuration shown in FIG. 8 is similar to the configuration shown in FIG. 3.

Figure 9:
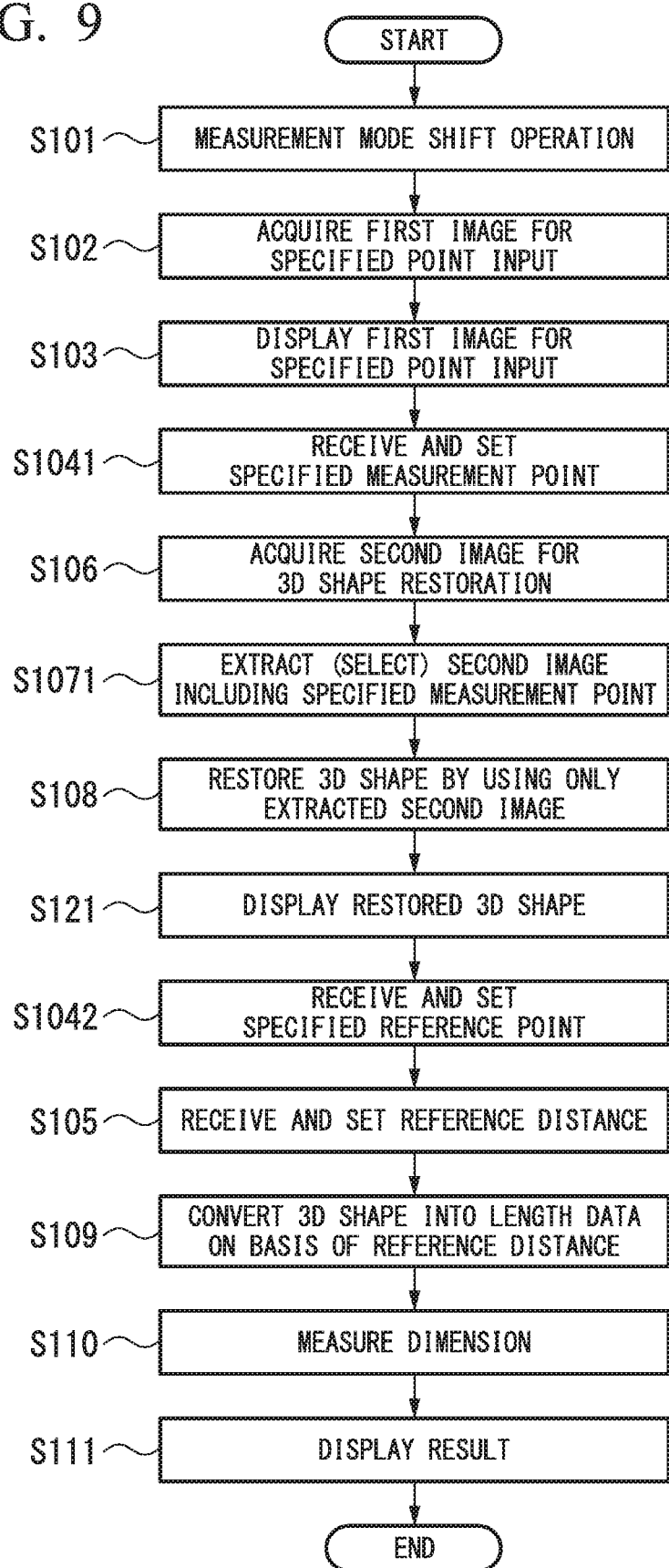
FIG. 9 is a flowchart showing a procedure of a 3D measurement process according to a modified example of the first embodiment of the present invention.

A 3D measurement process according to the modified example of the first embodiment will be described with reference to FIG. 9. FIG. 9 shows a procedure of the 3D measurement process. Differences from the process shown in FIG. 6 will be described with respect to the process shown in FIG. 9.

After the first image is displayed on the display unit 5 in step S103, the user operates the operation unit 4 to specify two specified measurement points on the displayed first image. The operation unit 4 receives the two specified measurement points specified by the user. The specified point setting unit 183 sets the two specified measurement points on the acquired first image (step S1041). After the two specified measurement points are set in step S1041, the processing of step S106 is executed.

After the second image is acquired in step S106, the image determination unit 185 determines whether or not a point corresponding to each of the two set specified measurement points are included in one or more acquired second images. The image determination unit 185 extracts only a second image including the point corresponding to each of the two specified measurement points from among the second images acquired by the CCU 9. At this time, the image determination unit 185 extracts only a second image in which both two points corresponding to the two specified measurement points exist (step S1071). After the second image is extracted in step S1071, the processing of step S108 is executed.

After the 3D shape is restored in step S108, the 3D shape display control unit 189 causes the display unit 5 to display the 3D shape restored by the 3D shape restoration unit 186 (step S121). After the 3D shape is displayed in step S121, the user operates the operation unit 4 to specify two specified reference points on the displayed 3D shape. The operation unit 4 receives the two specified reference points specified by the user. The specified point setting unit 183 sets the two specified reference points on the restored 3D shape (step S1042).

After the two specified reference points are set in step S1042, the processing of step S105 is executed. In step S105, the reference dimension setting unit 184 sets a reference distance on the restored 3D shape. After the reference distance is set, the processing of step S109 is executed. Also, reference distance setting may be performed before the 3D shape restoration process.

Also, the specified reference point setting process may be performed before the 3D shape restoration process is executed, and the specified measurement point setting process may be executed after the 3D shape restoration process is executed. That is, the specified point setting unit 183 may set two specified reference points on the first image acquired by the CCU 9 and may set two specified measurement points on the restored 3D shape.

Regarding points other than the above, a process shown in FIG. 9 is similar to the process shown in FIG. 6.

As described above, setting of only one type of specified point (a specified measurement point or a specified reference point) is performed before the second image for the 3D shape restoration is acquired, so that a period required for the user to input a specified point is shortened. Thus, the endoscope device 1 can be quickly shifted to the second image acquisition.

Second Embodiment

A second embodiment of the present invention will be described using the CPU 18a shown in FIG. 3.

In the second embodiment, after a CCU 9 acquires the second image, a specified point setting unit 183 sets a specified point on the first image acquired by the CCU 9. That is, after a second image acquisition process is executed, a specified point setting process is executed.

Figure 10:
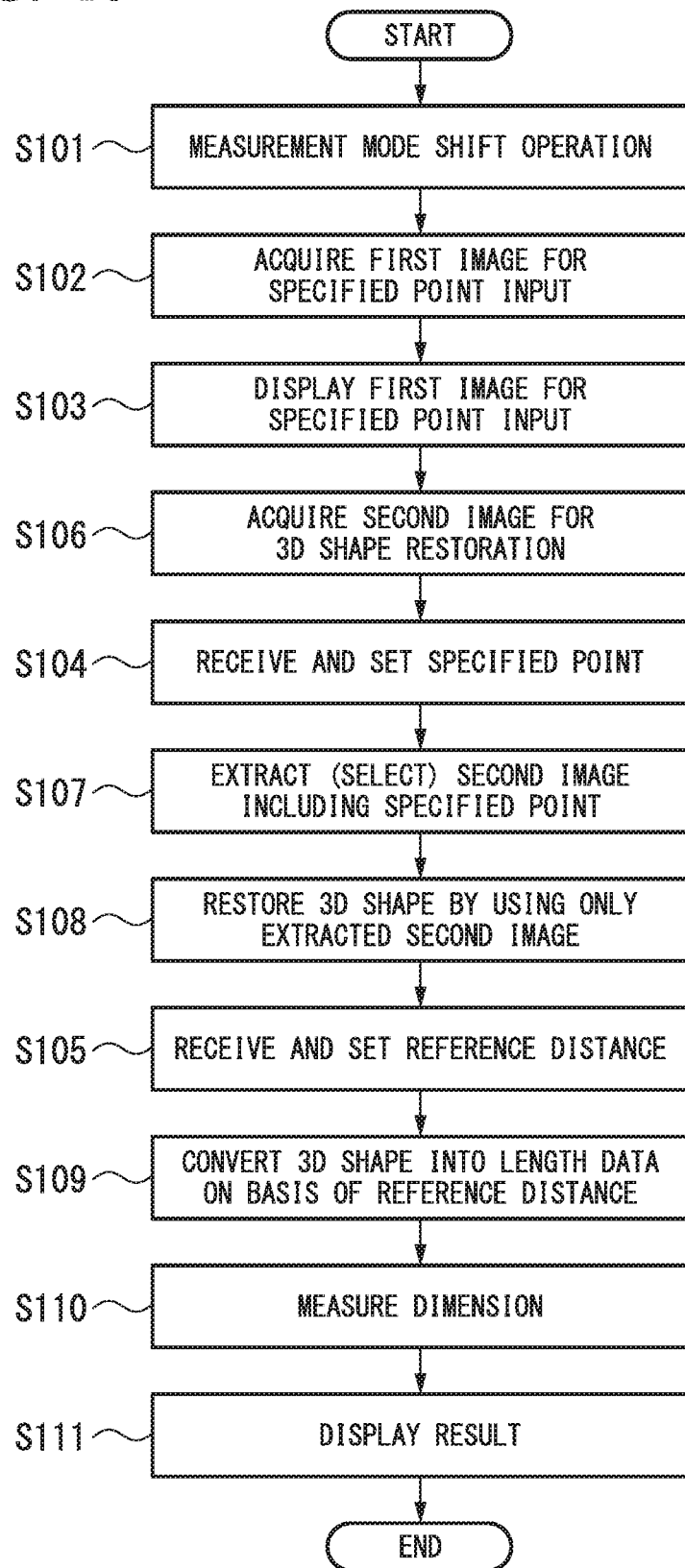
FIG. 10 is a flowchart showing a procedure of a 3D measurement process according to a second embodiment of the present invention.

A 3D measurement process according to the second embodiment will be described with reference to FIG. 10. FIG. 10 shows a procedure of the 3D measurement process. Differences from the process shown in FIG. 6 will be described with respect to the process shown in FIG. 10.

After a first image is displayed on a display unit 5 in step S103, a second image acquisition process of step S106 is executed. After a second image is acquired, a specified point setting process of step S104 is executed. A specified point is set on the first image displayed on the display unit 5. After the specified point is set, the processing of step S107 is executed.

After a 3D shape is restored in step S108, a reference distance setting process of step S105 is executed. A reference dimension setting unit 184 sets a reference distance on the restored 3D shape. After the reference distance is set, the processing of step S109 is executed. Also, reference distance setting may be performed before the 3D shape is restored.

Regarding points other than the above, a process shown in FIG. 10 is similar to the process shown in FIG. 6.

In the first embodiment, after four specified points including two specified measurement points and two specified reference points are set, a second image for 3D shape restoration is acquired. A long period for a user to determine four specified points may be required. Thus, when the second image is acquired, there is a possibility that a subject will have moved out of a composition determined by the user when the mode was shifted to the measurement mode. When the subject has moved out of the composition, a region of interest can be out of frame. In this case, the user needs to determine the composition again. In order for the user to determine the composition again, the user needs to return the mode of the endoscope device 1 from the measurement mode to the inspection mode. Thus, usability may become poor.

In the second embodiment, the second image for the 3D shape restoration is acquired immediately after the acquisition of the first image for the specified point input. After the second image is acquired, the specified point is set. Thus, the second image acquisition is completed before the user specifies the specified point. Thereby, a period until the second image for the 3D shape restoration is acquired after the acquisition of the first image for the specified point input or after the display of the first image is shortened. Thus, even though a period for the user to input the specified point is required, it is possible to prevent the composition of the second image from moving out of a composition desired by the user. The composition desired by the user is a composition when the first image for the specified point input is acquired.

Third Embodiment

A third embodiment of the present invention will be described using the CPU 18a shown in FIG. 3.

In the third embodiment, a second image acquisition process and a specified point setting process are executed in parallel. In other words, second image acquisition by a CCU 9 and specified point setting by a specified point setting unit 183 are executed in parallel. Also, the second image acquisition process and the reference dimension setting process are executed in parallel. In other words, the second image acquisition by the CCU 9 and reference dimension setting by a reference dimension setting unit 184 are executed in parallel.

Figure 11:
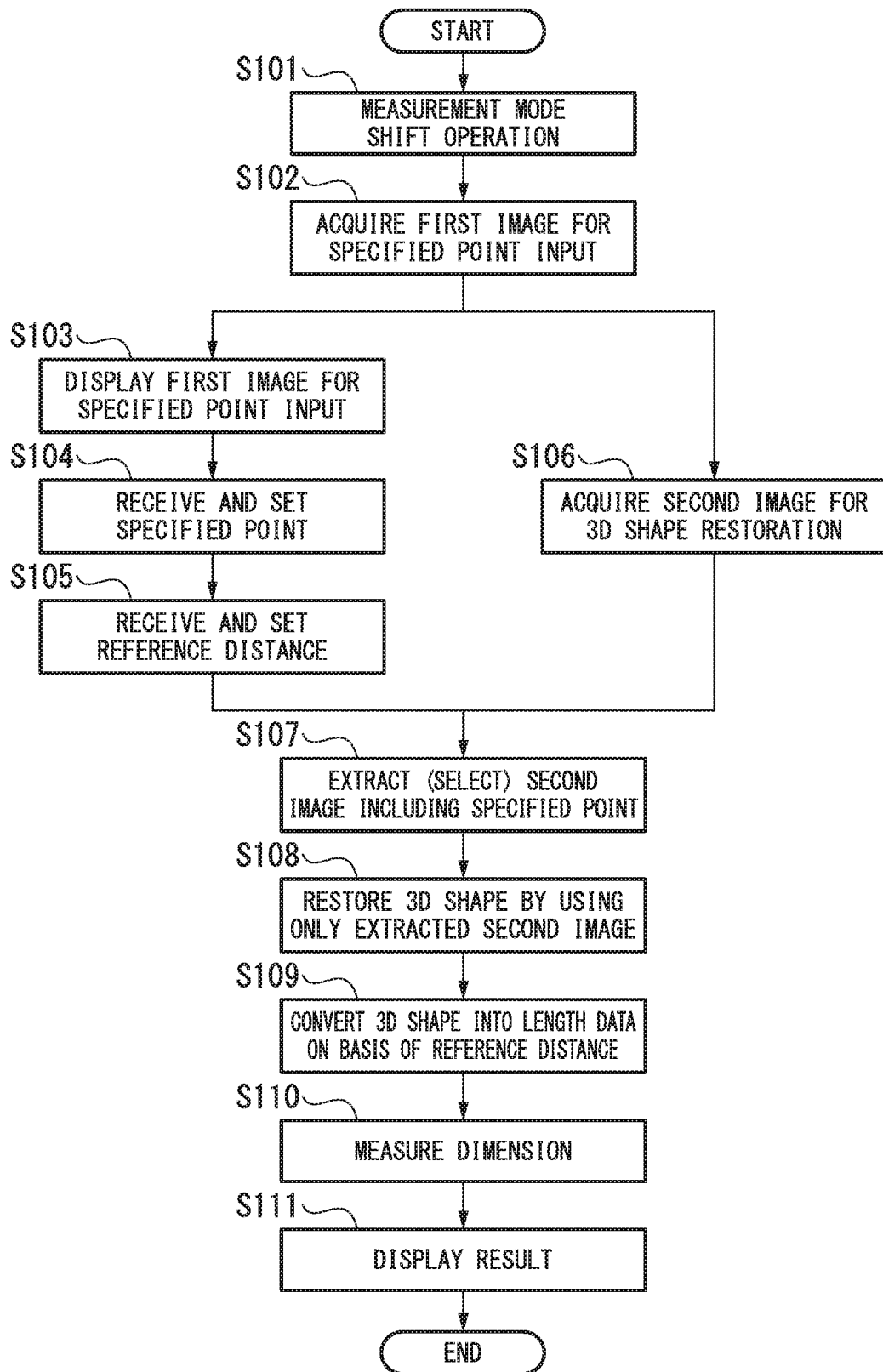
FIG. 11 is a flowchart showing a procedure of a 3D measurement process according to a third embodiment of the present invention.

A 3D measurement process according to the third embodiment will be described with reference to FIG. 11. FIG. 11 shows a procedure of the 3D measurement process. Differences from the processing shown in FIG. 6 will be described with respect to the process shown in FIG. 11.

After a first image is acquired in step S102, the processing of steps S103 and S106 is executed. That is, acquisition of a second image for 3D shape restoration and display of the first image for inputting a specified point are executed in parallel. The processing of step S106 is executed as a background process.

After the first image is displayed on a display unit 5 in step S103, the processing of steps S104 and S105 is executed. That is, second image acquisition and specified point setting are executed in parallel. Also, the second image acquisition and reference distance setting are executed in parallel. After a reference distance is set in step S105 and the second image is acquired in step S106, the processing of step S107 is executed.

The specified point setting unit 183 sets the specified point during a period from a second image acquisition start timing to a second image acquisition end timing At the second image acquisition start timing, imaging in a second imaging state by an imaging element 28 and the second image acquisition by the CCU 9 are started. At the second image acquisition end timing, the imaging in the second imaging state by the imaging element 28 and the second image acquisition by the CCU 9 are ended. A reference dimension setting unit 184 sets the reference dimension during the period from the second image acquisition start timing to the second image acquisition end timing.

Regarding points other than the above, a process shown in FIG. 11 is similar to the process shown in FIG. 6.

In the processing of steps S104 and S105, an operation by the user is performed. It is assumed in advance that the operation by the user requires a certain amount of time. This time is used for acquiring the second image for the 3D shape restoration. When the reference distance is set in step S105, there is a possibility that the second image acquisition will already have been completed. As a result, there is a possibility that the process of extracting the second image in step S107 will be able to be quickly started. At least, compared with the first embodiment in which second image acquisition is started after reference distance setting is completed, the user can have a clear feeling that the image acquisition time is short.

As described above, a process in which an operation by the user is necessary and the second image acquisition for the 3D shape restoration are executed in parallel. Thereby, a period required for the user to receive a measurement result is shortened and the inspection efficiency is improved.

Fourth Embodiment

Figure 12:
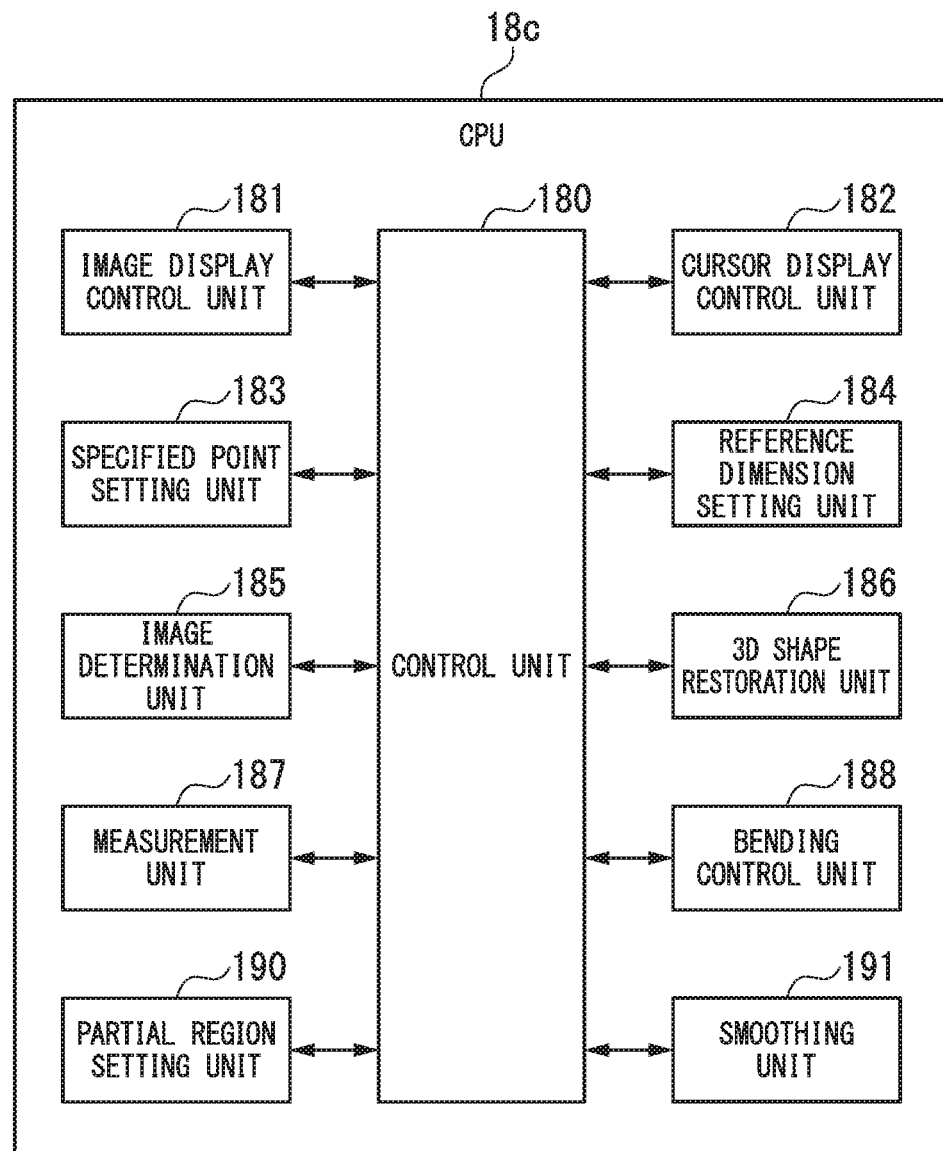
FIG. 12 is a block diagram showing a functional configuration of a CPU according to a fourth embodiment of the present invention.

In a fourth embodiment of the present invention, the CPU 18a in the first embodiment is changed to a CPU 18c shown in FIG. 12. FIG. 12 shows a functional configuration of the CPU 18c. Differences from the configuration shown in FIG. 3 will be described with respect to the configuration shown in FIG. 12.

In addition to the configuration shown in FIG. 3, the CPU 18c has a partial region setting unit 190 and a smoothing unit 191. The partial region setting unit 190 executes a partial region setting process. In the partial region setting process, the partial region setting unit 190 sets a partial region on a first image acquired by a CCU 9 on the basis of a position of a specified point set by a specified point setting unit 183. An image determination unit 185 determines whether or not a region corresponding to the partial region is included in one or more second images. The image determination unit 185 extracts or selects a second image including a region corresponding to the partial region from among second images acquired by the CCU 9. At this time, the image determination unit 185 extracts or selects a second image including the entire region corresponding to the partial region.

The smoothing unit 191 executes a smoothing process. In the smoothing process, the smoothing unit 191 smooths a part corresponding to the partial region within the 3D shape restored by a 3D shape restoration unit 186. A measurement unit 187 measures an object to be measured on the basis of the 3D shape smoothed by the smoothing unit 191, the specified point, and the reference dimension.

Regarding points other than the above, a configuration shown in FIG. 12 is similar to the configuration shown in FIG. 3.

Figure 13:
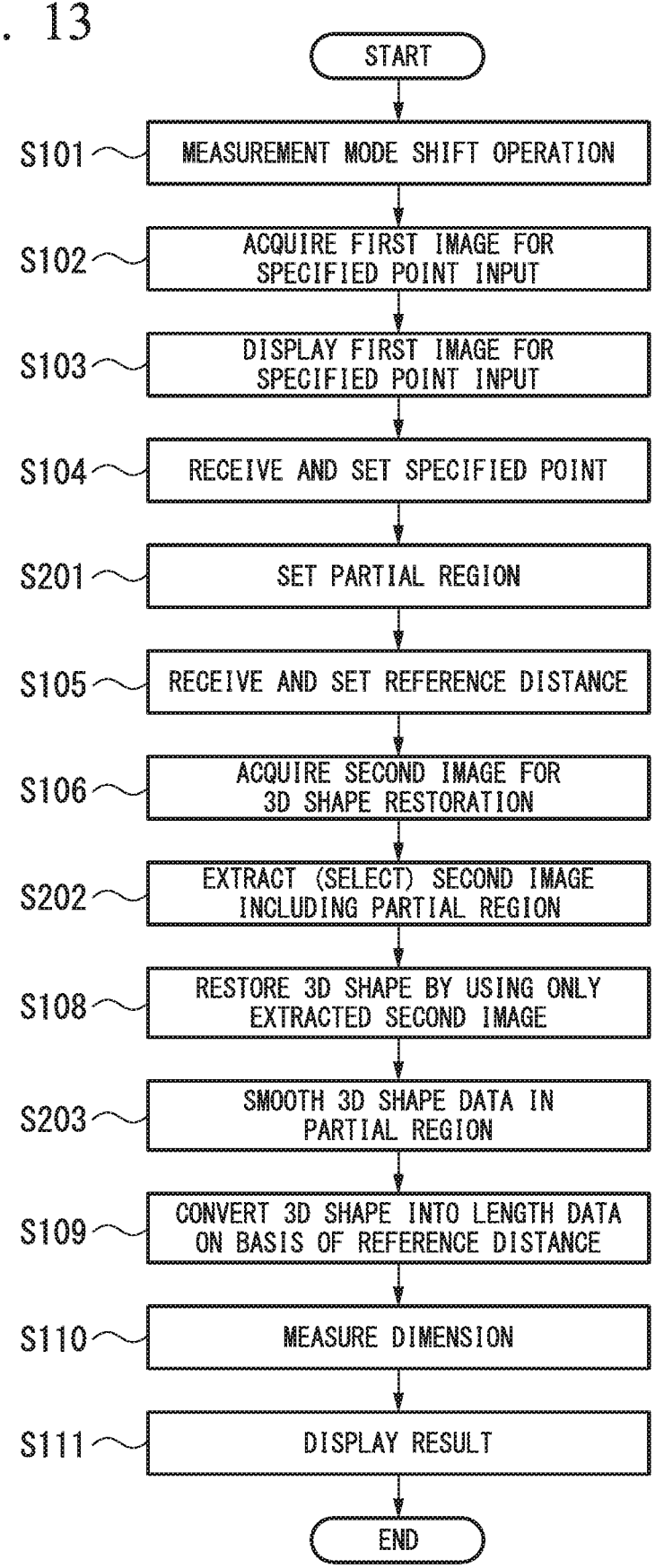
FIG. 13 is a flowchart showing a procedure of a 3D measurement process according to the fourth embodiment of the present invention.

A 3D measurement process according to the fourth embodiment will be described with reference to FIG. 13. FIG. 13 shows a procedure of the 3D measurement process. Differences from the process shown in FIG. 6 will be described with respect to the process shown in FIG. 13.

After a specified point is set in step S104, the partial region setting unit 190 sets a partial region on a first image acquired by the CCU 9 on the basis of a position of the set specified point (step S201).

Figure 14:
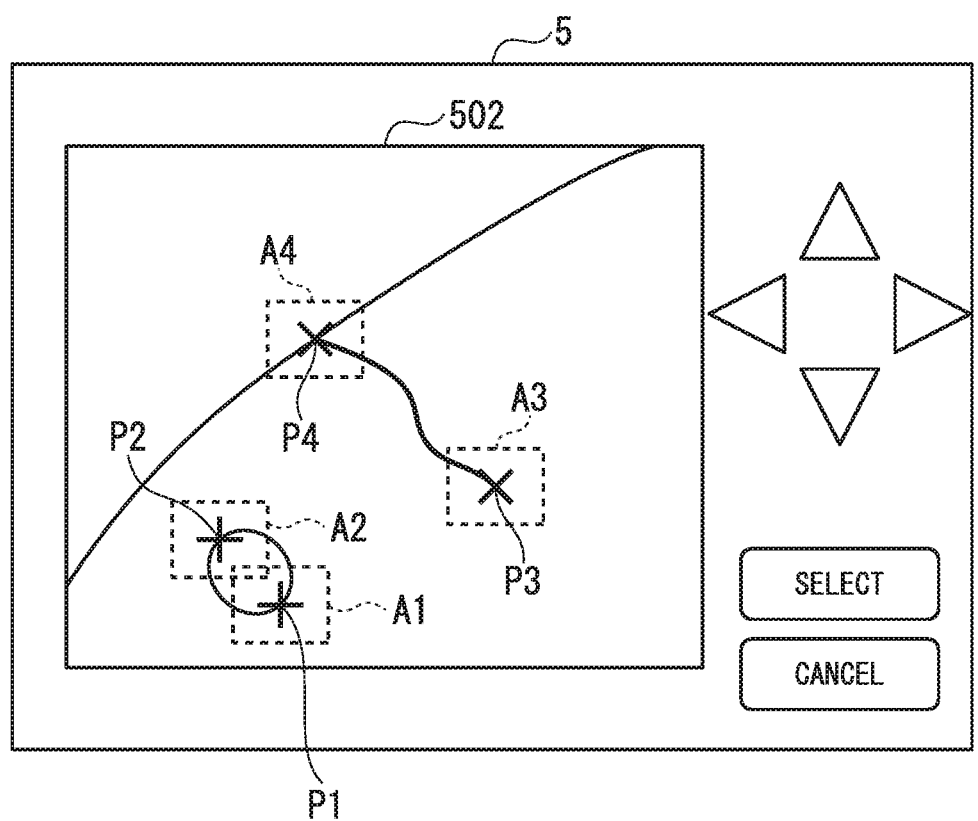
FIG. 14 is a reference diagram showing a screen of a display unit according to the fourth embodiment of the present invention.

Details of the processing of step S201 will be described. The partial region setting unit 190 sets a partial region including each of the two specified reference points and two specified measurement points specified by the user. FIG. 14 shows a screen of a display unit 5. As shown in FIG. 14, a first image 502 is displayed. In this example, two specified reference points P1 and P2 and two specified measurement points P3 and P4 are set on the first image 502 displayed on the display unit 5.

Further, a partial region A1 is set for the specified reference point P1, a partial region A2 is set for the specified reference point P2, a partial region A3 is set for the specified measurement point P3, and a partial region A4 is set for the specified measurement point P4. Each of the partial regions A1 to A4 is a rectangular region having a specified point at a center thereof. All the partial regions A1 to A4 are set to have the same shape and the same size. The partial region setting unit 190 calculates a position (coordinates) of each of the partial regions A1 to A4. Position information (coordinate information) of the four partial regions is stored in a RAM 14. For example, the position information of a partial region includes position information (coordinate information) of a representative point of the partial region and size information of the partial region. The partial region is set by associating the partial region with a specific first image.

The four partial regions A1 to A4 are displayed on the display unit 5. An image display control unit 181 displays the partial regions A1 to A4 on the display unit 5. Specifically, the image display control unit 181 generates a graphic image signal of each partial region. The image display control unit 181 outputs the generated graphic image signal to a video signal processing circuit 12. The video signal processing circuit 12 combines a video signal output from the CCU 9 and the graphic image signal output from the CPU 18c. Thereby, each partial region is superimposed on the first image. The video signal processing circuit 12 outputs a combined video signal to the display unit 5. The display unit 5 displays the first image on which each partial region is superimposed. For example, each partial region is indicated by a line. Thereby, the user can recognize a position of the partial region.

After partial regions are set in step S201, the processing of step S105 is executed. After a second image is acquired in step S106, the image determination unit 185 determines whether or not a region corresponding to each of four partial regions is included in one or more acquired second images. The image determination unit 185 extracts only a second image including a region corresponding to each of the four partial regions from among the second images acquired by the CCU 9 (step S202).

In this process, the image determination unit 185 reads coordinate information of each of the four partial regions from a RAM 14. In each of a plurality of second images, the image determination unit 185 searches for four correspondence regions corresponding to four pieces of coordinate information. The image determination unit 185 extracts only a second image in which all the four correspondence regions exist and stores the extracted second image in the RAM 14. A second image in which at least one of the four correspondence regions does not exist is deleted and is not used for the 3D shape restoration process.

After the second image including the partial region is extracted in step S202, the processing of step S108 is executed. After the 3D shape of the subject is restored in step S108, the smoothing unit 191 smooths a part corresponding to the partial region within the restored 3D shape (step S203). Specific examples of the smoothing process include well-known technologies such as Gaussian filtering and median filtering.

After the smoothing process is executed in step S203, the processing of step S109 is executed. In step S109, a measurement unit 187 converts a smoothed 3D shape data into 3D coordinate data having a length dimension. After the processing of step S109 is executed, the processing of step S110 is executed. In step S110, the measurement unit 187 measures a length between two points defined by two specified measurement points P3 and P4 in a well-known measurement method on the basis of 3D coordinate data obtained from the smoothed 3D shape data.

Regarding points other than the above, a process shown in FIG. 13 is similar to the process shown in FIG. 6.

In the above example, a rectangular partial region is set. A shape of the partial region is not limited to a rectangle. The shape of the partial region may be a shape such as a circle, an ellipse, and a polygon. Also, a size of a partial region is not limited.

In the above example, a partial region is set so that the specified point specified by the user is located at a center of the partial region. However, a position of a partial region set for a position of the specified point is not limited thereto. The partial region may be set at a position away from the position of the specified point by a specific distance in a specific direction.

The smoothing process need not be executed in step S203. Therefore, the CPU 18c need not have the smoothing unit 191.

As described above, 3D shape restoration is executed on the basis of only a second image including a partial region set on the first image. For the second image in which a partial region is not included, the 3D shape restoration is not executed. Thereby, a period required for the 3D shape restoration process is shortened as compared with a conventional configuration. Thus, by displaying a measurement result on the display unit 5, an endoscope device 1 can significantly shorten the measurement process time until the user obtains the measurement result. Therefore, inspection efficiency is improved.

Also, by using the second image including only a partial region for the 3D shape restoration process, the smoothing process can be executed on a region of interest including the partial region in a range that does not affect a processing time. Thereby, variations in the 3D shape of the partial region are minimized As a result, measurement accuracy is improved.

Fifth Embodiment

Figure 15:
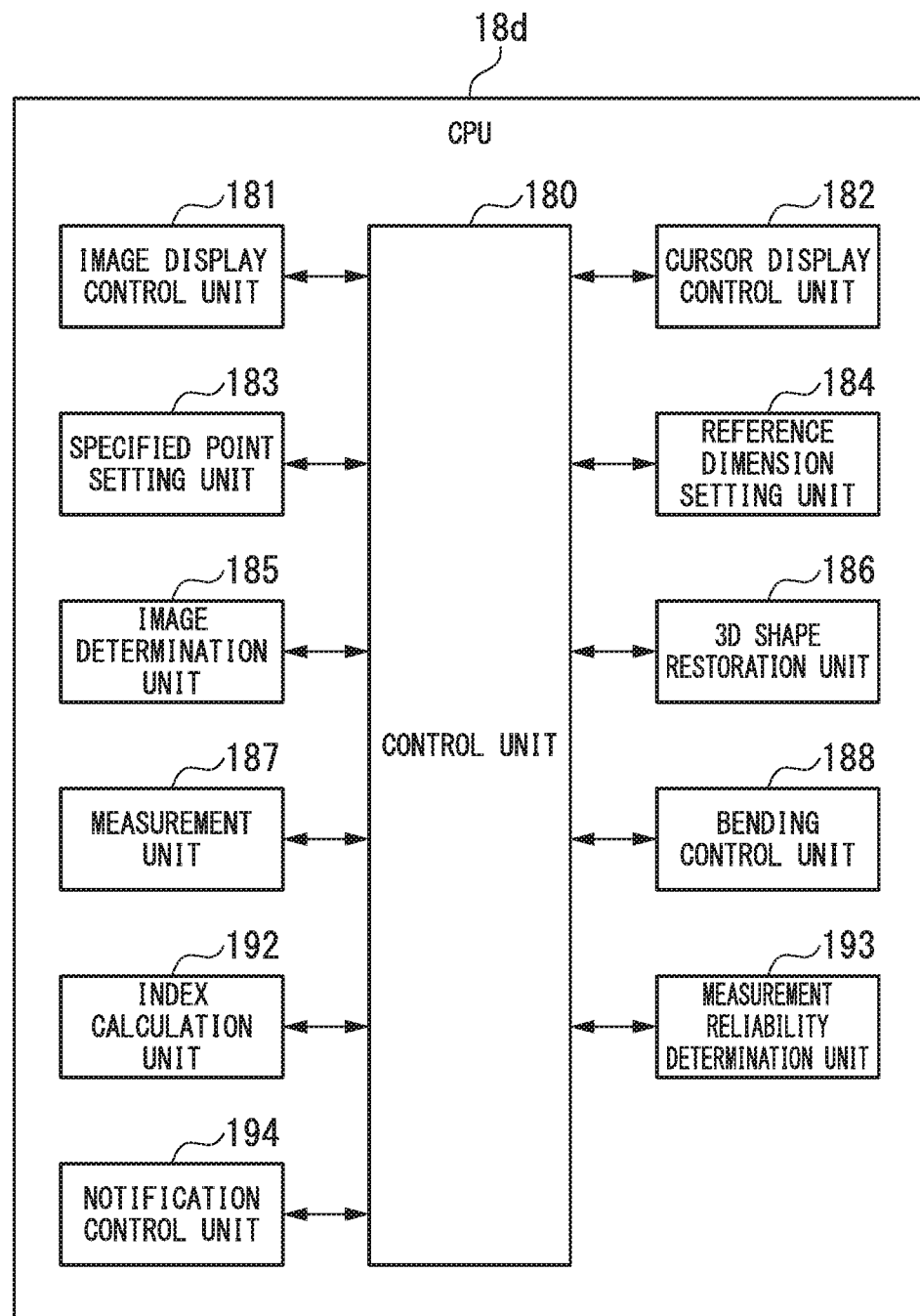
FIG. 15 is a block diagram showing a functional configuration of a CPU according to a fifth embodiment of the present invention.

In a fifth embodiment of the present invention, the CPU 18a in the first embodiment is changed to a CPU 18d shown in FIG. 15. FIG. 15 shows a functional configuration of the CPU 18d. Differences from the configuration shown in FIG. 3 will be described with respect to the configuration shown in FIG. 15.

In addition to the configuration shown in FIG. 3, the CPU 18d includes an index calculation unit 192 (a measurement reliability calculation unit), a measurement reliability determination unit 193, and a notification control unit 194. The index calculation unit 192 executes an index calculation process. In the index calculation process, the index calculation unit 192 calculates an index of measurement reliability of a point corresponding to a set specified point on the basis of a restored 3D shape. The measurement reliability determination unit 193 executes a measurement reliability determination process. In the measurement reliability determination process, the measurement reliability determination unit 193 determines measurement reliability by comparing the index calculated by the index calculation unit 192 with a predetermined threshold value. A measurement unit 187 measures an object to be measured when it is determined that the measurement reliability is high by the measurement reliability determination unit 193. That is, the measurement unit 187 performs measurement using a second image determined to have high measurement reliability by the measurement reliability determination unit 193 among second images acquired by a CCU 9.

The notification control unit 194 executes a measurement reliability notification process. In the measurement reliability notification process, the notification control unit 194 notifies a user of the measurement reliability determined by the measurement reliability determination unit 193. Specifically, the notification control unit 194 causes a message indicating the measurement reliability determined by the measurement reliability determination unit 193 to be displayed on a first image. For example, the notification control unit 194 generates a graphic image signal of the message. The notification control unit 194 outputs the generated graphic image signal to a video signal processing circuit 12. The video signal processing circuit 12 combines the video signal output from the CCU 9 and the graphic image signal output from the CPU 18d. Thereby, the message is superimposed on the first image. The video signal processing circuit 12 outputs a combined video signal to a display unit 5. The display unit 5 displays the first image on which the message is superimposed. The message indicates a result of determination by the measurement reliability determination unit 193.

Regarding points other than the above, a configuration shown in FIG. 15 is similar to the configuration shown in FIG. 3.

Figure 16:
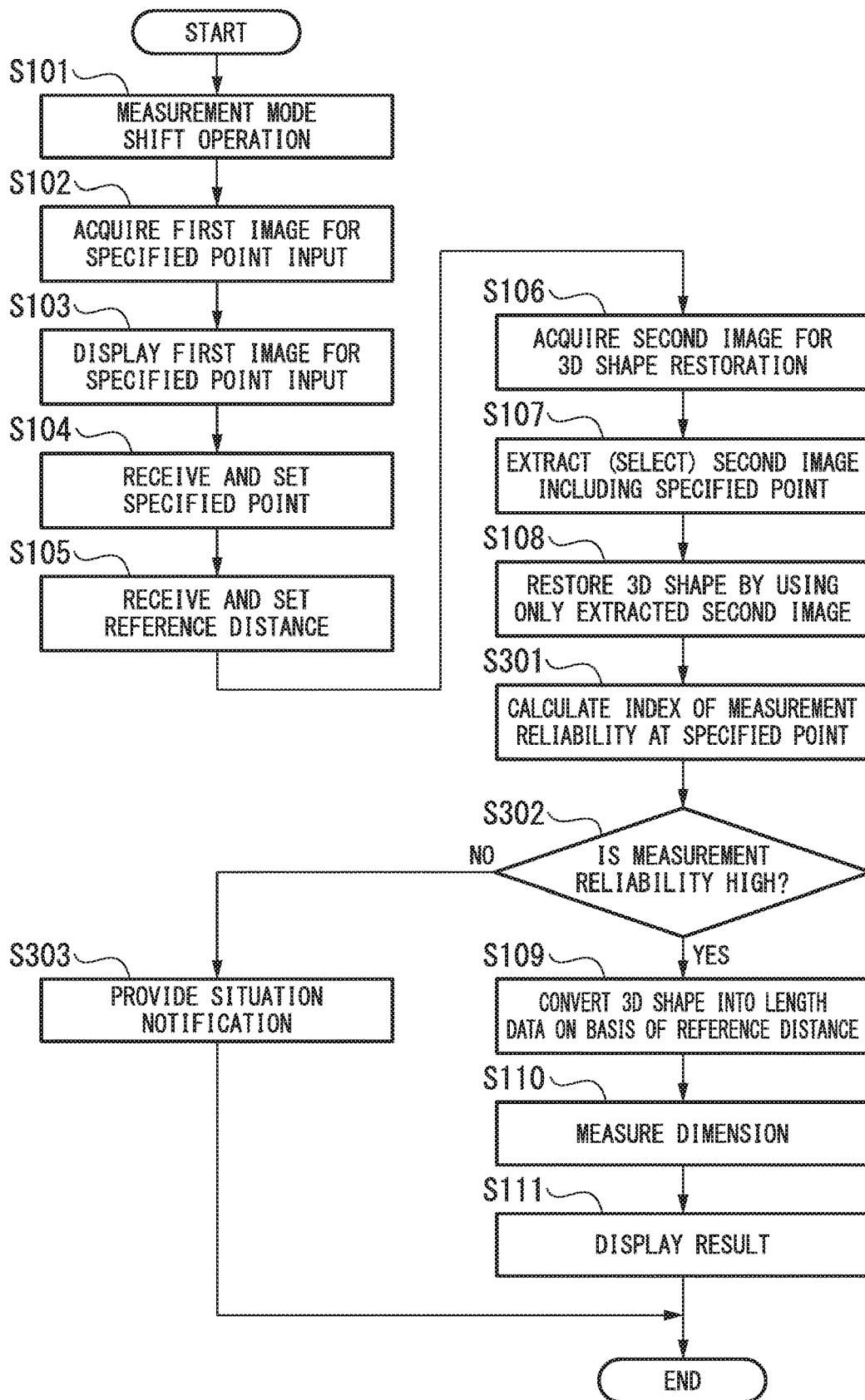
FIG. 16 is a flowchart showing a procedure of a 3D measurement process according to the fifth embodiment of the present invention.

A 3D measurement process according to the fifth embodiment will be described with reference to FIG. 16. FIG. 16 shows a procedure of the 3D measurement process. Differences from the process shown in FIG. 6 will be described with respect to the process shown in FIG. 16.

After a 3D shape of a subject is restored in step S108, an index calculation unit 192 calculates an index of measurement reliability at a set specified point. Specifically, the index calculation unit 192 calculates the index of the measurement reliability at the point corresponding to the specified point in the restored 3D shape (step S301).

Details of the processing of step S301 will be described. The index calculation unit 192 calculates an index of measurement reliability at each specified point on the basis of four specified points set on a first image and a restored 3D shape of a subject. The measurement reliability in the fifth embodiment indicates whether or not the restored 3D shape is suitable for measurement (or reference). The index calculation unit 192 calculates indices based on various factors generated in the 3D shape restoration process with respect to each of the four specified points. For example, the index of the measurement reliability includes values such as a correlation value and an object distance calculated during a matching process in the 3D shape restoration process. The index calculation unit 192 calculates the index of the measurement reliability at each specified point by appropriately combining calculated values of indices. In the fifth embodiment, four indices related to the measurement reliability corresponding to the four specified points are calculated.

After the index of the measurement reliability is calculated in step S301, the measurement reliability determination unit 193 determines the measurement reliability by comparing each of the four indices calculated in step S301 with a predetermined threshold value (step S302). If all the four indices corresponding to the four specified points are greater than or equal to the predetermined threshold value, the measurement reliability determination unit 193 determines that the measurement reliability is high, i.e., the 3D shape is suitable for measurement. If at least one of the four indices corresponding to the four specified points is less than the predetermined threshold value, the measurement reliability determination unit 193 determines that the measurement reliability is low, i.e., the 3D shape is not suitable for measurement.

If the measurement reliability determination unit 193 determines that the measurement reliability is high in step S302, the processing of step S109 is executed. If the measurement reliability determination unit 193 determines that the measurement reliability is low in step S302, the notification control unit 194 causes a message indicating the measurement reliability determined by the measurement reliability determination unit 193 to be displayed on the first image. Thereby, the notification control unit 194 notifies the user that the 3D shape is not suitable for measurement (step S303). In addition to a result of determining the measurement reliability, the notification control unit 194 may cause a reason why the determination result has been reached and a solution to be displayed on the first image.

By executing the processing of step S303, the 3D measurement process is completed. If the measurement reliability determination unit 193 determines that the measurement reliability is low in step S302, the second image may be acquired in step S106. Alternatively, the mode of the endoscope device 1 may be shifted from a measurement mode to an inspection mode.

Regarding points other than the above, a process shown in FIG. 16 is similar to the process shown in FIG. 6.

Also, if the partial regions A1 to A4 are set as in the fourth embodiment, the index calculation unit 192 calculates an index for each of the four partial regions A1 to A4 on the basis of the restored 3D shape of the subject and the set four partial regions A1 to A4 in step S301. For example, the index calculation unit 192 calculates a final index E according to a weighted linear sum as shown in Equation (4) with respect to indices calculated from various types of factors.

$$E_{A1} = \sum_{i=0}^{N} w_i e_i \qquad (4)$$

Expression (4) indicates the index E in the partial region A1. In Equation (4), $e_i$ denotes an index of each factor. In Equation (4), $w_i$ denotes a weight of each factor. In Equation (4), N indicates the assumed number of factors. The index E in the partial regions A2 to A4 is also calculated through calculation similar to Equation (4). The index calculation unit 192 may calculate the final index by summing all indices of the partial regions A1 to A4.

The method of calculating the index of the measurement reliability is not limited to the above method. For example, there may be a plurality of types of indices of measurement reliability. The index calculation method may be a logic operation on an index of each factor.

The notification control unit 194 may cause a mark or the like indicating the measurement reliability to be displayed on the first image. Even when the measurement reliability determination unit 193 determines that the measurement reliability is high in step S302, the notification control unit 194 may notify the user of the measurement reliability. The method of notifying the user of the measurement reliability is not limited to the display of information by the display unit 5. For example, speech indicating measurement reliability may be output.

In step S303, a notification need not be provided to the user. Therefore, the CPU 18d need not include the notification control unit 194.

As described above, the index of the measurement reliability is calculated on the basis of a restored 3D shape, and the measurement reliability is determined on the basis of the index. Thereby, it is possible to avoid a situation in which the dimension measurement process is executed despite the fact that it has been determined that the accuracy of the measurement result is likely to be low. Thus, inspection efficiency is improved.

Sixth Embodiment

A sixth embodiment of the present invention will be described using a CPU 18d shown in FIG. 15.

In the sixth embodiment, an index calculation unit 192 calculates an index of measurement reliability at a specified point set by a specified point setting unit 183. In a second image acquired by a CCU 9, the index calculation unit 192 calculates the index of the measurement reliability at a point corresponding to the specified point.

Figure 17:
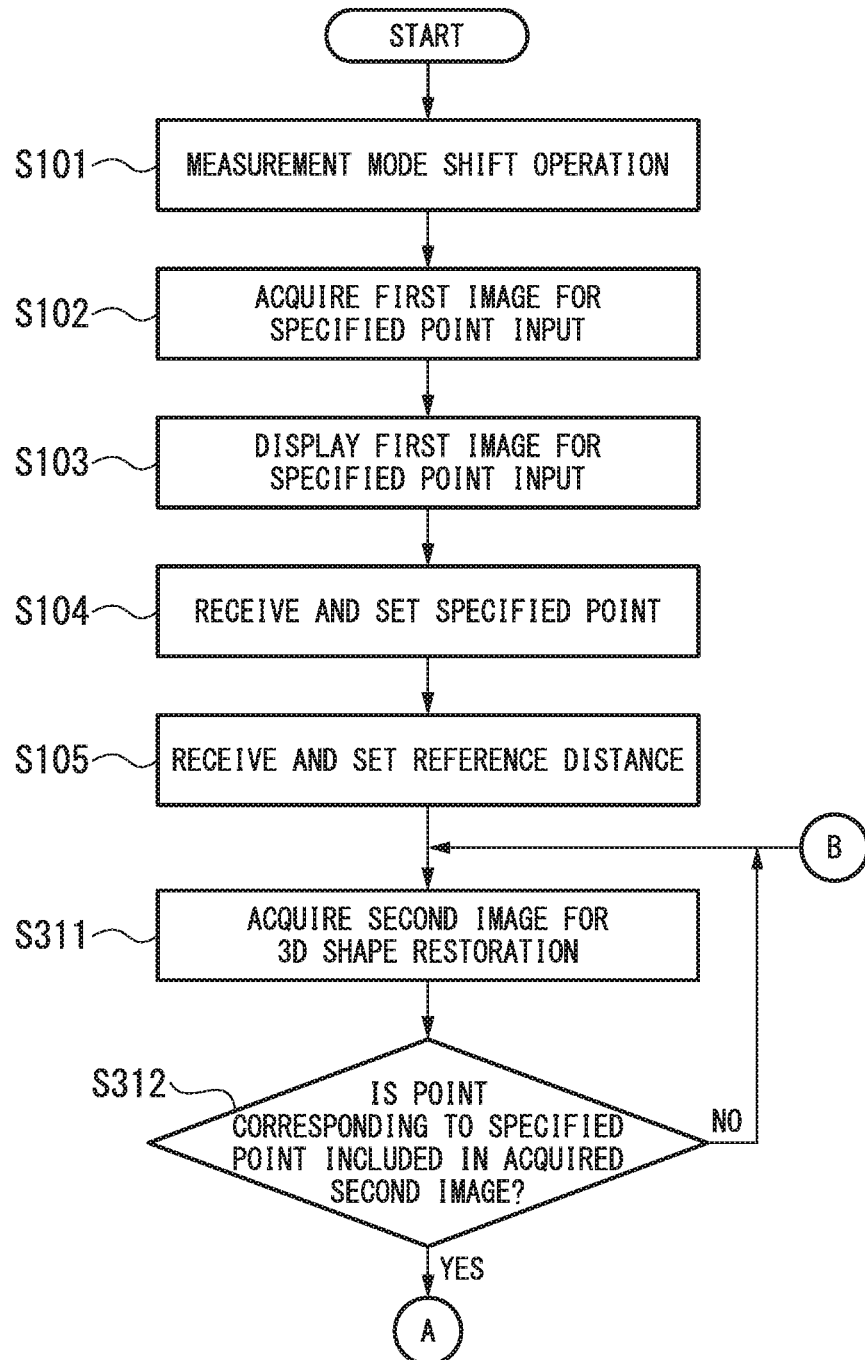
FIG. 17 is a flowchart showing a procedure of a 3D measurement process according to a sixth embodiment of the present invention.
Figure 18:
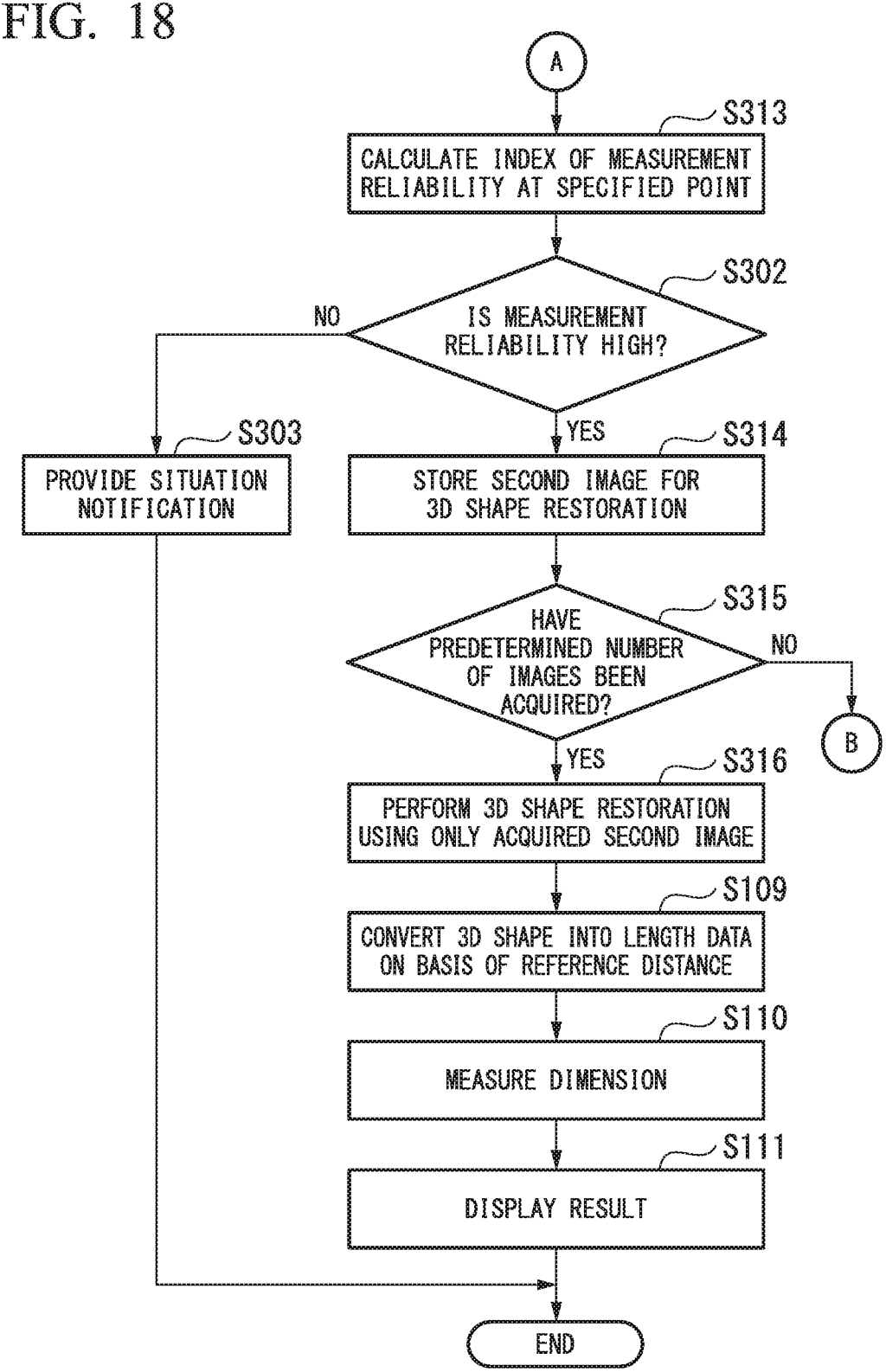
FIG. 18 is a flowchart showing a procedure of a 3D measurement process according to the sixth embodiment of the present invention.

A 3D measurement process according to the sixth embodiment will be described with reference to FIGS. 17 and 18. FIGS. 17 and 18 show a procedure of the 3D measurement process. Differences from the process shown in FIG. 16 will be described with respect to the process shown in FIGS. 17 and 18.

After a reference distance is set in step S105, an imaging element 28 generates one second image by imaging a subject once in a second imaging state. A CCU 9 acquires one generated second image (step S311).

After one second image is acquired in step S311, an image determination unit 185 determines whether or not a point corresponding to each of four specified points set on the first image in step S104 is included in the one second image acquired in step S311 (step S312).

In this process, the image determination unit 185 reads coordinate information of each of the four specified points on the first image from the RAM 14. The image determination unit 185 searches for four correspondence points corresponding to four read pieces of coordinate information from the one second image. If the image determination unit 185 determines that at least one of the four correspondence points is not included in the second image, the processing of step S311 is executed. At this time, in step S311, imaging is performed in a second imaging state different from the second imaging state of a camera when the subject was previously imaged.

When the image determination unit 185 determines that all the four correspondence points are included in the second image, the index calculation unit 192 calculates an index of measurement reliability at the specified point set in step S104. Specifically, the index calculation unit 192 calculates the index of the measurement reliability at the point corresponding to the specified point in the second image acquired in step S106 (step S313).

Details of the processing of step S313 will be described. The index calculation unit 192 calculates an index of measurement reliability at each specified point on the basis of the second image acquired in step S311 and the four specified points set on the first image in step S104. The measurement reliability in the sixth embodiment indicates whether or not the second image for the 3D shape restoration is suitable for measurement (or reference). The index calculation unit 192 calculates an index for each of the four specified points. For example, the index of the measurement reliability is a degree of influence on measurement due to various factors that inhibit matching. A plurality of factors that inhibit matching may exist. For example, the factors that inhibit matching are halation and occlusion. Alternatively, the index of the measurement reliability is an amount of occurrence of a shake of the tip of the endoscope. If a plurality of second images are acquired, the index of the measurement reliability may be an amount of movement of the specified point in the second image. The index calculation unit 192 calculates an index of measurement reliability at each specified point by appropriately combining calculated values. In the sixth embodiment, four indices corresponding to four specified points are calculated.

After the index of the measurement reliability is calculated in step S313, a measurement reliability determination process of step S302 is executed. If the measurement reliability determination unit 193 determines that the measurement reliability is low, the second image is deleted and is not used for the 3D shape restoration process. If the measurement reliability determination unit 193 determines that the measurement reliability is high, the image determination unit 185 stores the second image in the RAM 14 (step S314).

After the second image is stored in the RAM 14 in step S314, the image determination unit 185 determines whether or not a predetermined number of second images are stored in the RAM 14 (step S315). The predetermined number is an integer greater than or equal to 2.

If the image determination unit 185 determines that a predetermined number of second images are not stored, the processing of step S311 is executed. At this time, in step S311, imaging is performed in a second imaging state different from the second imaging state of the camera when the subject was previously imaged.

If the image determination unit 185 determines that a predetermined number of second images are stored, the 3D shape restoration unit 186 uses only a predetermined number of second images stored in the RAM 14 to restore the 3D shape of the subject (step S316). After the processing of step S316 is executed, the processing of step S109 is executed.

Regarding points other than the above, a process shown in FIGS. 17 and 18 is similar to the process shown in FIG. 16.

As described above, the index of the measurement reliability is calculated on the basis of the second image acquired before the 3D shape is restored, and the measurement reliability is determined on the basis of the index. Thereby, it is possible to avoid a situation in which the dimension measurement process is executed despite the fact that it has been determined that the accuracy of the measurement result is likely to be low. Therefore, inspection efficiency is improved.

Seventh Embodiment

The endoscope devices 1 according to the first to sixth embodiments of the present invention have a characteristic that a 3D shape restoration process is efficiently executed on the basis of a position of a specified point. Endoscope devices 1 according to seventh to eleventh embodiments of the present invention have a characteristic that a second image is efficiently acquired on the basis of a position of a specified point. The endoscope device 1 according to the seventh embodiment of the present invention has a characteristic that a second imaging state of a camera acquiring the second image is automatically calculated on the basis of a position of a specified point.

Figure 19:
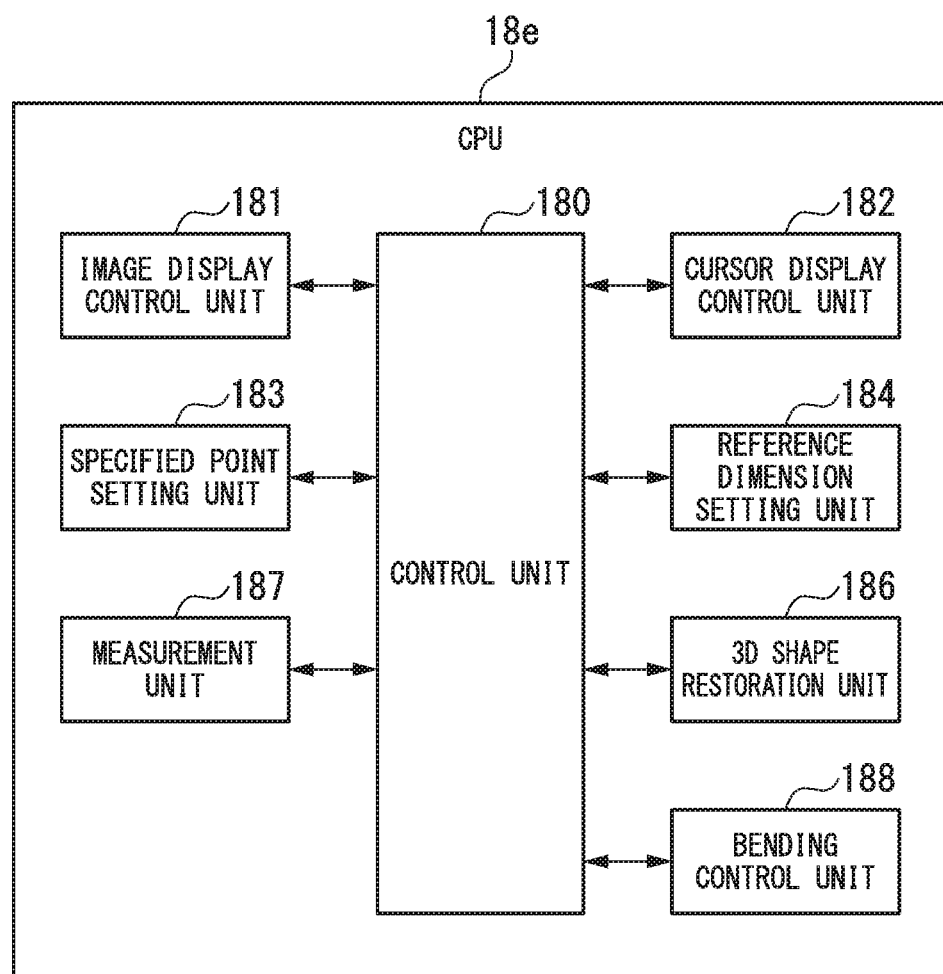
FIG. 19 is a block diagram showing a functional configuration of a CPU according to a seventh embodiment of the present invention.

In the seventh embodiment of the present invention, the CPU 18a in the first embodiment is changed to a CPU 18e shown in FIG. 19. FIG. 19 shows the functional configuration of the CPU 18e. Differences from the configuration shown in FIG. 3 will be described with respect to the configuration shown in FIG. 19.

The CPU 18e has a configuration obtained by excluding the image determination unit 185 from the configuration shown in FIG. 3. In one or more second imaging states, a position corresponding to the specified point set by a specified point setting unit 183 is included in an imaging field of view. That is, when a position corresponding to the specified point is included in the imaging field of view, the imaging element 28 images the subject in the second imaging state.

Regarding points other than the above, a configuration shown in FIG. 19 is similar to the configuration shown in FIG. 3.

Figure 20:
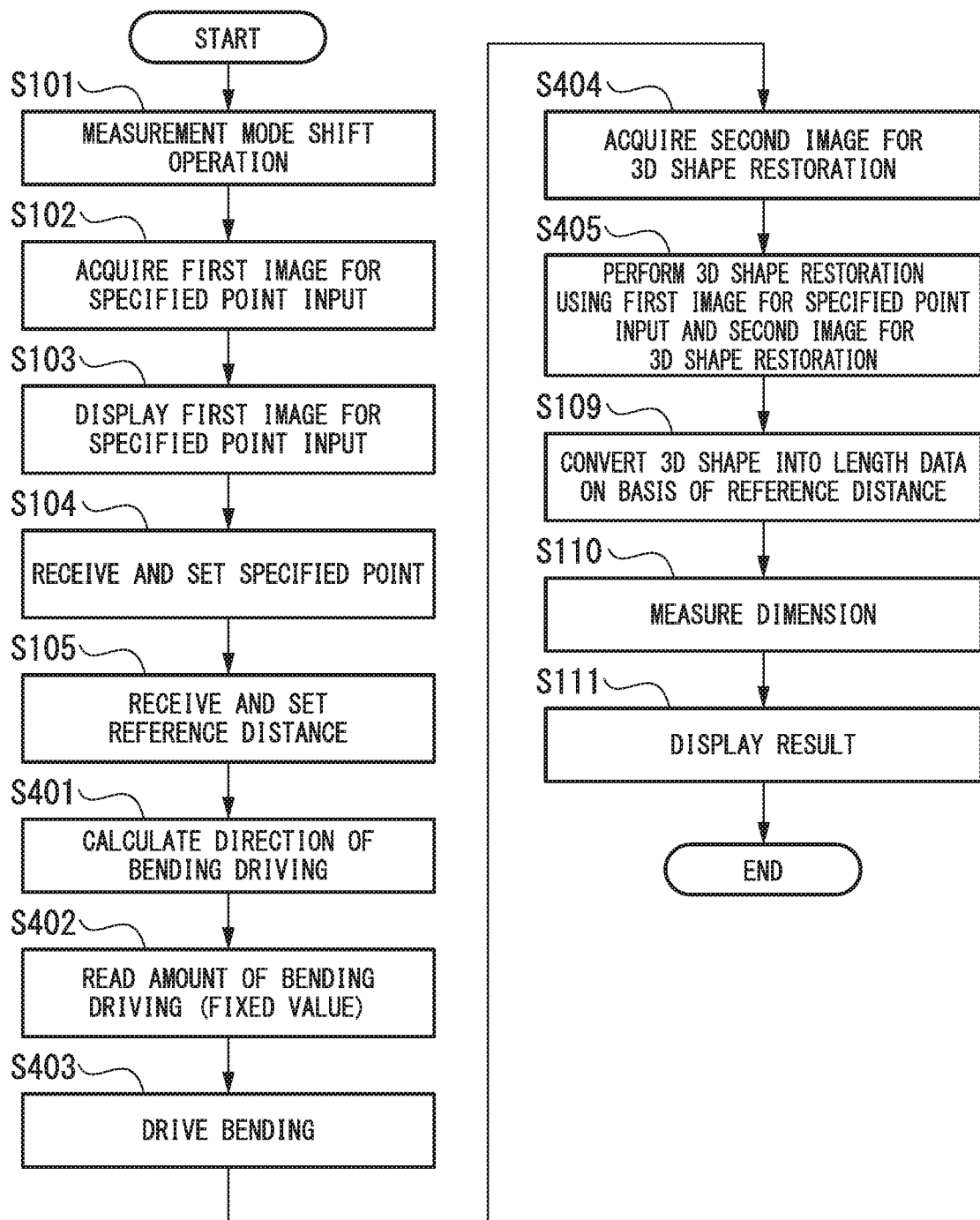
FIG. 20 is a flowchart showing a procedure of a 3D measurement process according to the seventh embodiment of the present invention.

A 3D measurement process according to the seventh embodiment will be described with reference to FIG. 20. FIG. 20 shows a procedure of the 3D measurement process. Differences from the process shown in FIG. 6 will be described with respect to the process shown in FIG. 20.

In the seventh embodiment, one first image for a specified point input is assumed to be used as an image for 3D shape restoration. A 3D shape restoration unit 186 restores a 3D shape by using one first image and one second image.

After a reference distance is set in step S105, preparation for acquiring the second image for the 3D shape restoration is performed. As the preparation, an amount of change for changing the imaging state from a first imaging state when the first image for the specified point input is acquired to a second imaging state when the second image is acquired is calculated. Specifically, a bending control unit 188 calculates a direction of bending driving of an endoscope tip on the basis of the first image and a position of the specified point in the first image acquired in step S102 (step S401).

Figure 21:
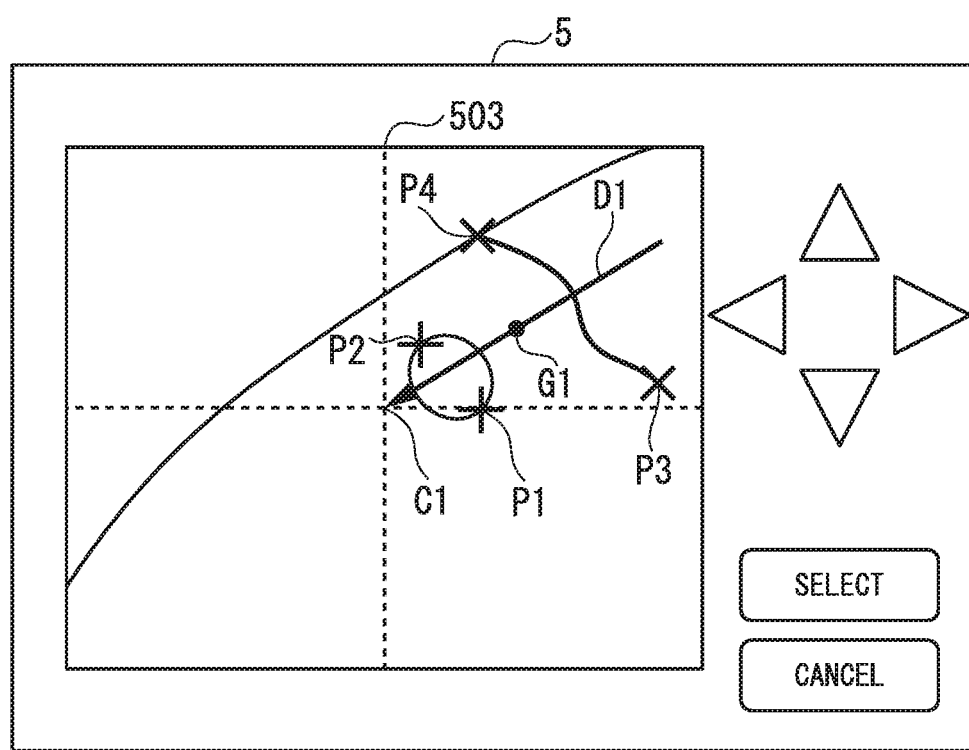
FIG. 21 is a reference diagram showing a screen of a display unit according to the seventh embodiment of the present invention.

Details of the processing of step S401 will be described. FIG. 21 shows a screen of a display unit 5. As shown in FIG. 21, a first image 503 is displayed. In this example, two specified reference points P1 and P2 and two specified measurement points P3 and P4 are set on the first image 503 displayed on the display unit 5. The bending control unit 188 calculates a center position C1 of an imaging field of view (the first image 503) and a centroid position G1 of four specified points. The centroid position G1 is calculated on the basis of positions of the four specified points. The bending control unit 188 calculates a direction D1 from the centroid position G1 of the four specified points to the center position C1 of the imaging field of view. Then, the bending control unit 188 obtains the direction of bending driving of a tip 20 of an insertion unit 2 such that the centroid position G1 of the four specified points moves along the direction D1 toward the center position C1 of the imaging field of view. The direction of bending driving is opposite to the direction D1. The direction of bending driving is calculated on the basis of the calculated direction D1.

After the direction of bending driving is calculated in step S401, the bending control unit 188 reads an amount of bending driving stored in advance in the memory (step S402). For example, the amount of bending driving is stored in a ROM 13. The amount of bending driving is a constant value (a fixed value) regardless of the specified point position, the centroid position G1, and the direction of bending driving.

After the amount of bending driving is read in step S402, the bending control unit 188 generates a command for bending the tip 20 of the insertion unit 2 on the basis of the direction of bending driving and the amount of bending driving. The command generated by the bending control unit 188 is output to the endoscope unit 8 via a control interface 17. The endoscope unit 8 causes the tip 20 of the insertion unit 2 to be bent on the basis of the command (step S403). Thereby, the tip 20 of the insertion unit 2 is bent such that the position corresponding to the specified point is included in the imaging field of view and the position corresponding to the specified point approaches the center of the imaging field of view. As a result, when the second image is acquired, a possibility that the point corresponding to the specified point will move out of the imaging field of view is reduced.

After the bending driving is executed in step S403, the imaging element 28 generates one second image by imaging the subject once in the second imaging state. A CCU 9 acquires one generated second image (step S404).

After one second image is acquired in step S404, the 3D shape restoration unit 186 restores a 3D shape of a subject by using the acquired first image and second image (step S405). After the 3D shape of the subject is restored in step S405, the processing of step S109 is executed.

Regarding points other than the above, a process shown in FIG. 20 is similar to the process shown in FIG. 6.

In the above example, a centroid position of the four specified points is calculated to calculate the direction of bending driving. A method of calculating the direction of bending driving is not limited to the above method. For example, a centroid position of only two specified measurement points or only two specified reference points may be calculated. Alternatively, a direction from one specified point which is initially specified to the center position C1 of the imaging field of view may be calculated as the direction of bending driving. Also, a lateral direction of the screen may be calculated as the direction of bending driving.

In the seventh embodiment, after setting of a reference distance (step S105) is executed, restoration of a 3D shape (step S405) is executed. That is, before the 3D shape restoration unit 186 restores the 3D shape, the reference dimension setting unit 184 sets a reference dimension on a first image acquired by the CCU 9. However, a timing at which the reference distance is set may be any timing as long as it is before a timing at which the processing of step S109 is executed. For example, after the restoration of the 3D shape is executed, the reference distance setting may be executed. That is, after the 3D shape restoration unit 186 restores the 3D shape, the reference dimension setting unit 184 may set the reference dimension on the 3D shape restored by the 3D shape restoration unit 186.

As in the modified example of the first embodiment, a process of setting a specified point may be divided into a process of setting a specified measurement point and a process of setting a specified reference point. For example, before the 3D shape restoration process is executed, the process of setting the specified measurement point is executed. That is, before the 3D shape restoration unit 186 restores a 3D shape, the specified point setting unit 183 sets the specified measurement point on a first image acquired by the CCU 9. Also, after the 3D shape restoration process is executed, the process of setting the specified reference point is executed. That is, the specified point setting unit 183 sets the specified reference point on the 3D shape restored by the 3D shape restoration unit 186.

The specified reference point setting process may be executed before the 3D shape restoration process is executed and the specified measurement point setting process may be executed after the 3D shape restoration process is executed. That is, before the 3D shape restoration unit 186 restores the 3D shape, the specified point setting unit 183 may set the specified reference point on the first image acquired by the CCU 9. The specified point setting unit 183 may set the specified measurement point on the 3D shape restored by the 3D shape restoration unit 186.

As described above, the second image is acquired on the basis of the specified point set on the first image. Thus, it is possible to omit a process of extracting (selecting) the second image to be used for the 3D shape restoration process. Thereby, the endoscope device 1 can significantly shorten a measurement process time until the user obtains a measurement result by displaying the measurement result on the display unit 5. Thus, inspection efficiency is improved.

Eighth Embodiment

Figure 22:
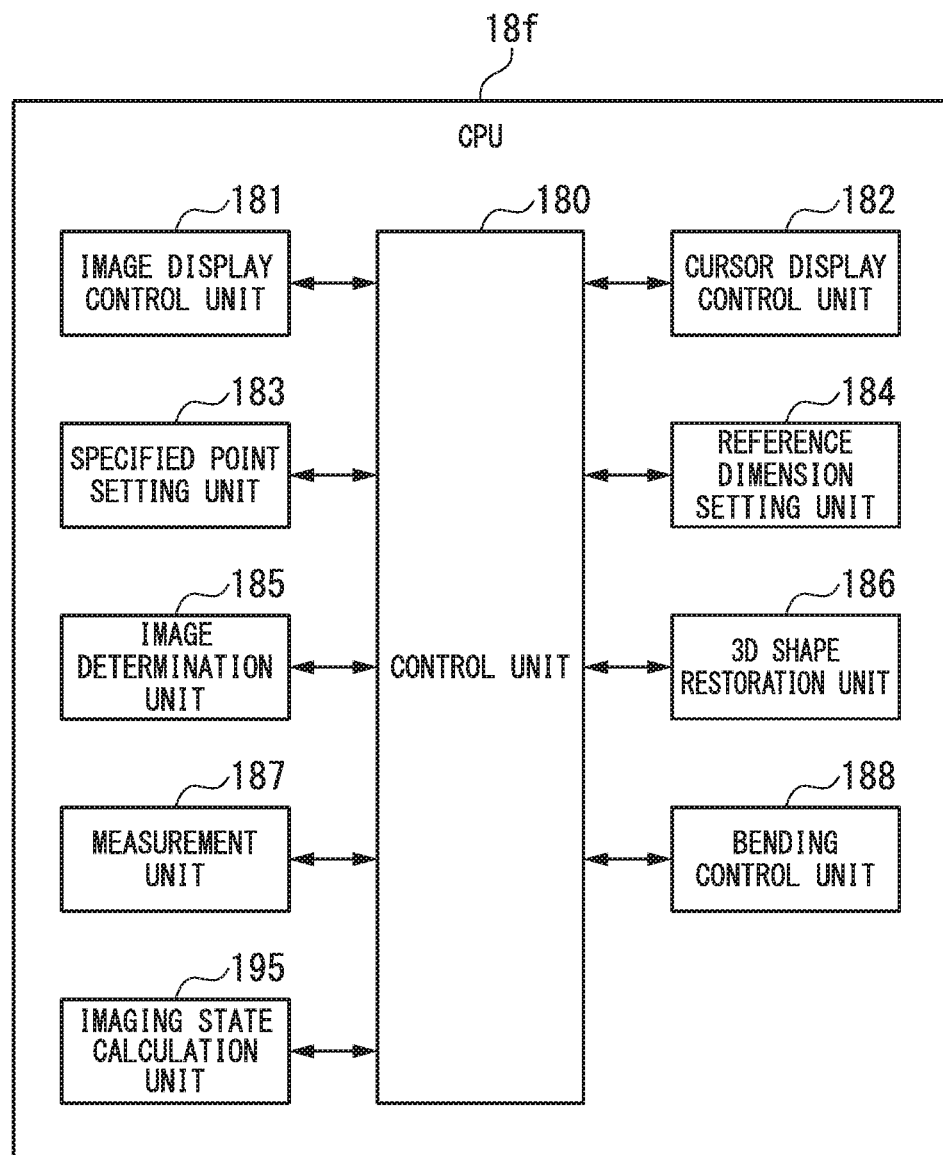
FIG. 22 is a block diagram showing a functional configuration of a CPU according to an eighth embodiment of the present invention.

In an eighth embodiment of the present invention, the CPU 18a in the first embodiment is changed to a CPU 18f shown in FIG. 22. FIG. 22 shows a functional configuration of the CPU 18f. Differences from the configuration shown in FIG. 3 will be described with respect to the configuration shown in FIG. 22.

In addition to the configuration shown in FIG. 3, the CPU 18f includes an imaging state calculation unit 195. Before a 3D shape restoration unit 186 restores a 3D shape, an image determination unit 185 determines whether or not a second image is suitable as an image to be used for restoring the 3D shape. If the image determination unit 185 determines that the second image is suitable as an image to be used for restoring the 3D shape, the 3D shape restoration unit 186 restores the 3D shape.

If the image determination unit 185 determines that the second image is not suitable as the image to be used for restoring the 3D shape, the imaging state calculation unit 195 executes an imaging state calculation process. The imaging state calculation unit 195 calculates at least one of an imaging position and an imaging posture in the imaging state calculation process. The imaging element 28 generates a second image by imaging an object to be measured again in at least one of the imaging position and the imaging posture calculated by the imaging state calculation unit 195. A CCU 9 acquires the second image generated by imaging the object to be measured in at least one of the imaging position and the imaging posture calculated by the imaging state calculation unit 195.

Regarding points other than the above, a configuration shown in FIG. 22 is similar to the configuration shown in FIG. 3.

Figure 23:
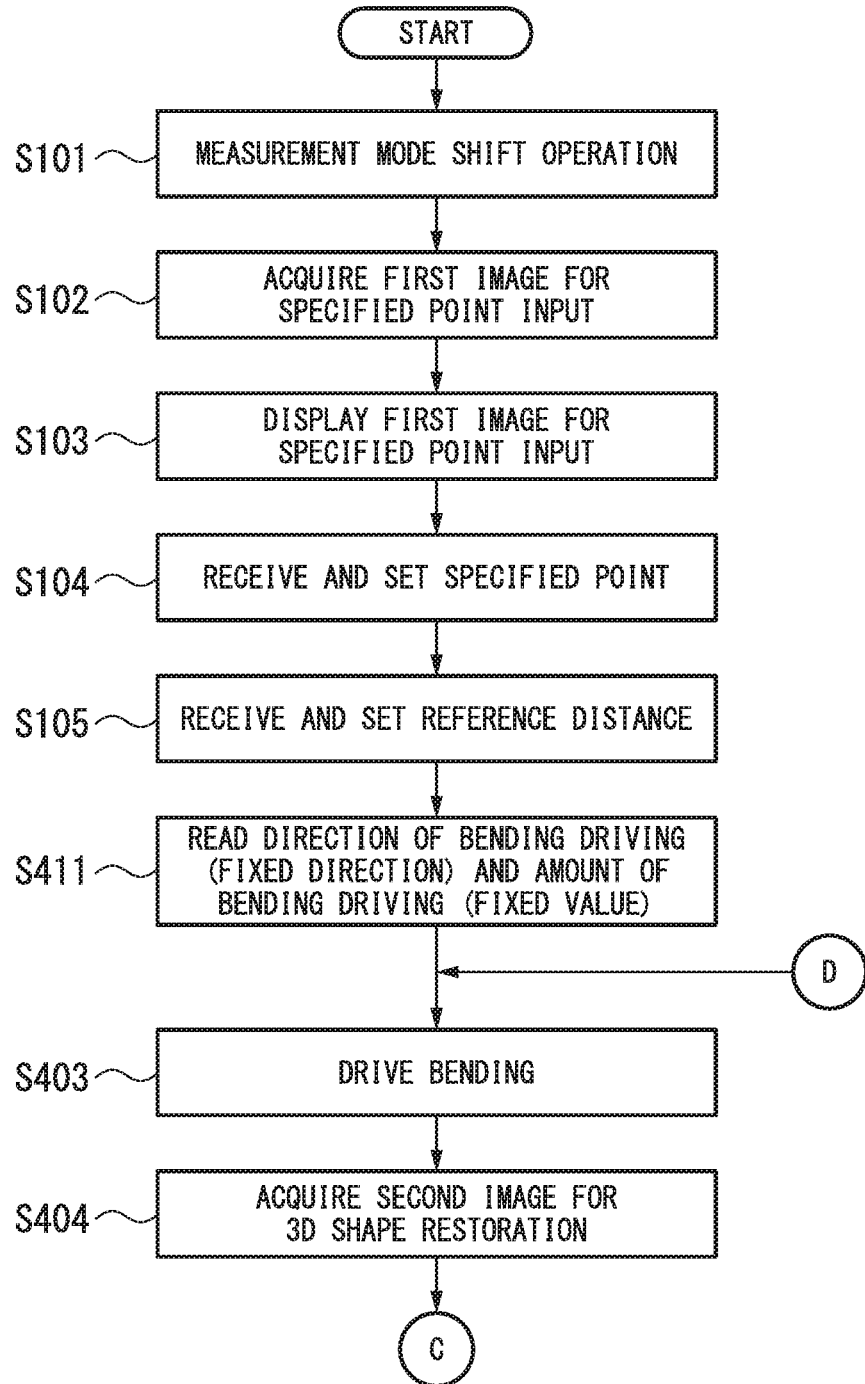
FIG. 23 is a flowchart showing a procedure of a 3D measurement process according to the eighth embodiment of the present invention.
Figure 24:
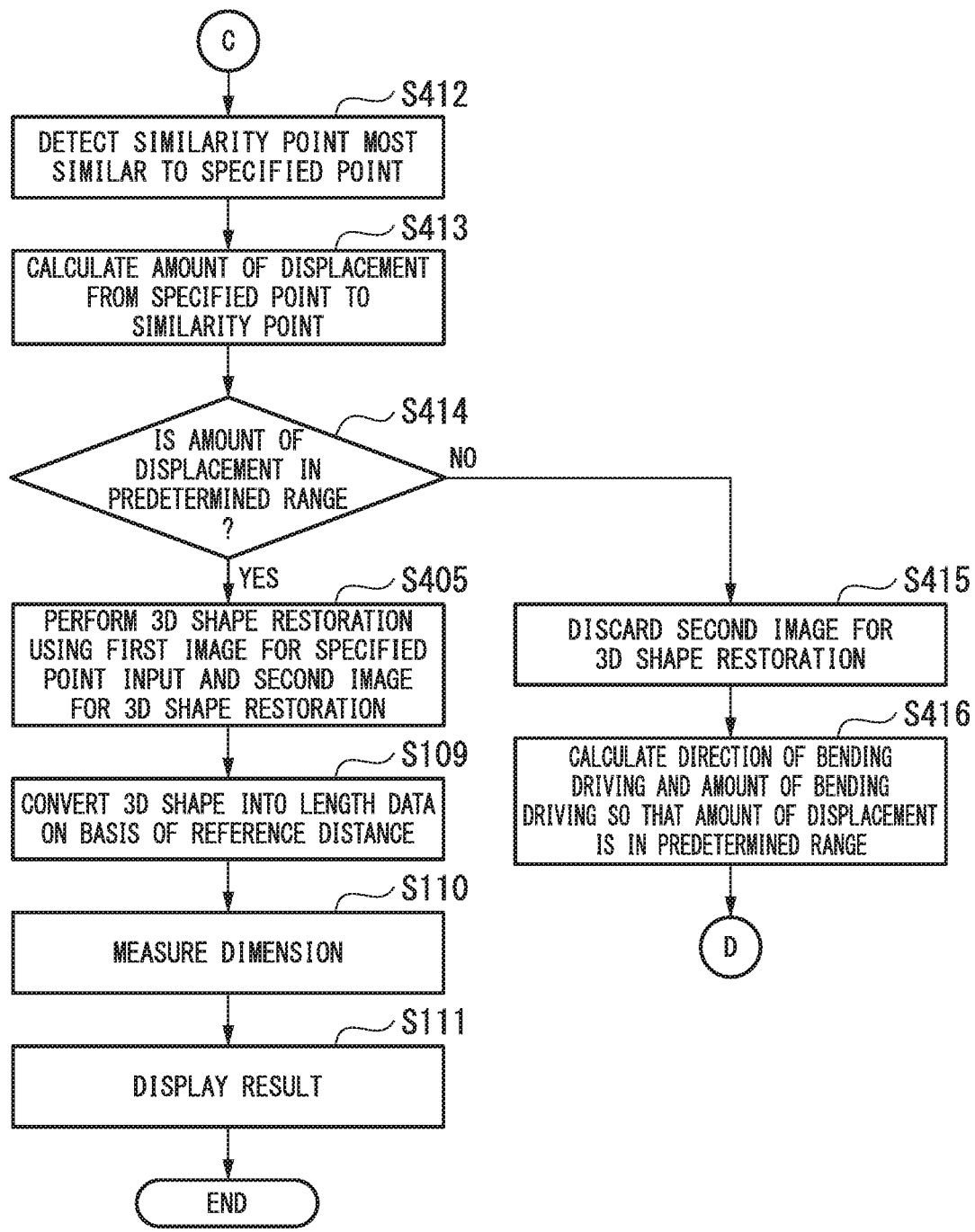
FIG. 24 is a flowchart showing a procedure of a 3D measurement process according to the eighth embodiment of the present invention.

A 3D measurement process according to the eighth embodiment will be described with reference to FIGS. 23 and 24. FIGS. 23 and 24 show a procedure of the 3D measurement process. Differences from the process shown in FIG. 20 will be described with respect to the process shown in FIGS. 23 and 24.

After a reference distance is set in step S105, a bending control unit 188 reads a direction of bending driving and an amount of bending driving stored in advance in a memory (step S411). For example, the direction of bending driving and the amount of bending driving are stored in a ROM 13. The direction of bending driving is a constant direction (fixed direction). The amount of bending driving is a constant value (a fixed value). After the direction of bending driving and the amount of bending driving are read in step S411, the processing of step S403 is executed. In step S403, a tip 20 of an insertion unit 2 is bent in a predetermined direction.

After one second image is acquired in step S404, the image determination unit 185 reads coordinate information of a specified point stored in a RAM 14 in step S104 from the RAM 14. The image determination unit 185 detects a similarity point most similar to the specified point in the second image acquired in step S404 (step S412). In this example, because four specified points are set on the first image, the image determination unit 185 detects four similarity points corresponding to the four specified points in the second image.

After the similarity point is detected in step S412, the image determination unit 185 calculates a distance between the specified point in the first image and the similarity point in the second image, i.e., an amount of displacement (step S413). In this example, because there are four specified points and four correspondence points corresponding thereto, four amounts of displacement are calculated.

After the amount of displacement is calculated in step S413, the image determination unit 185 determines whether or not each of the four amounts of displacement calculated in step S413 is in a predetermined range. Thereby, the image determination unit 185 determines whether or not the second image is suitable as an image to be used for restoring the 3D shape (step S414).

If the image determination unit 185 determines that all the four amounts of displacement are in the predetermined range, the processing of step S405 is executed. That is, when it is determined that the second image is suitable as an image to be used for restoring the 3D shape, the 3D shape restoration unit 186 restores the 3D shape in step S405.

If the image determination unit 185 determines that at least one of the four amounts of displacement is not in the predetermined range, in other words, that the second image is not suitable as an image to be used for restoring the 3D shape, the second image is deleted and is not used for 3D shape restoration process (step S415).

If the amount of displacement is too small, there is a possibility that the amount of parallax will be small and the restoration of the 3D shape will fail (an accurate 3D shape is not restored). If the amount of displacement is too large, an overlapping region of a field of view between two or more acquired images becomes small. Because these problems occur, it is important that an amount of change falls in an appropriate range.

After the second image is deleted in step S415, preparation for acquiring a new second image, i.e., another second image, for 3D shape restoration is performed. Specifically, the imaging state calculation unit 195 calculates a second imaging state in which a similarity point in the second image acquired subsequently falls within an imaging field of view of the second image. The imaging state calculation unit 195 may calculate a second imaging state such that the similarity point falls in a predetermined range within the imaging field of view of the second image. The predetermined range includes the center of the imaging field of view in the eighth embodiment. More specifically, the imaging state calculation unit 195 calculates the direction of bending driving of the tip of the endoscope and the amount of bending driving of the tip of the endoscope necessary for the similarity point to be displaced by a constant amount in a parallax direction (step S416). At this time, the imaging state calculation unit 195 uses the amount of bending driving read in step S411 and the amount of displacement calculated in step S413.

That is, if it is determined that the second image is not suitable as the image to be used for restoring the 3D shape in step S414, the imaging state calculation unit 195 calculates at least one of the imaging position and the imaging posture for acquiring the second image in step S416. After the direction of bending driving and the amount of bending driving are calculated in step S416, the processing of step S403 is executed. After the bending driving is executed in step S403, the processing of step S404 is executed. At this time, the imaging element 28 generates the second image by imaging the subject in at least one of the imaging position and the imaging posture calculated by the imaging state calculation unit 195. The CCU 9 acquires the second image generated by the imaging element 28.

If the imaging element 28 cannot perform imaging for a new second image or if it is determined that the amount of displacement is not in the predetermined range in step S414, a mode of the endoscope device 1 may be returned to an inspection mode.

Regarding points other than the above, a process shown in FIGS. 23 and 24 is similar to the process shown in FIG. 20.

The CPU 18f may include the notification control unit 194 in the CPU 18d shown in FIG. 15. The notification control unit 194 may execute an instruction notification process. In the instruction notification process, the notification control unit 194 notifies a user of an instruction of an operation of moving the tip of the endoscope. For example, the notification control unit 194 notifies the user of an instruction of a bending operation in the direction of bending driving calculated in step S416. The notification control unit 194 may notify the user of an instruction of at least one of a first operation, a second operation, and a third operation. The first operation is an operation in which the user pushes the insertion unit 2 toward the inside of the subject. The second operation is an operation in which the user pulls the insertion unit 2 toward the user. The third operation is an operation in which the user twists the insertion unit 2.

In the determination in step S302 shown in FIG. 16 in the fifth embodiment, various types of information generated in the 3D shape restoration process are used. On the other hand, in the determination in step S414 shown in FIG. 24, the information obtained from a two-dimensional image is used. Thus, it is possible to make a determination before the 3D shape restoration process with a high calculation load is executed. As a result, the endoscope device 1 can notify the user of a result at an early stage.

Ninth Embodiment

A ninth embodiment of the present invention will be described using the CPU 18f shown in FIG. 22.

Although one second image is used for 3D shape restoration in the eighth embodiment, a plurality of second images are used for 3D shape restoration in the ninth embodiment.

Figure 25:
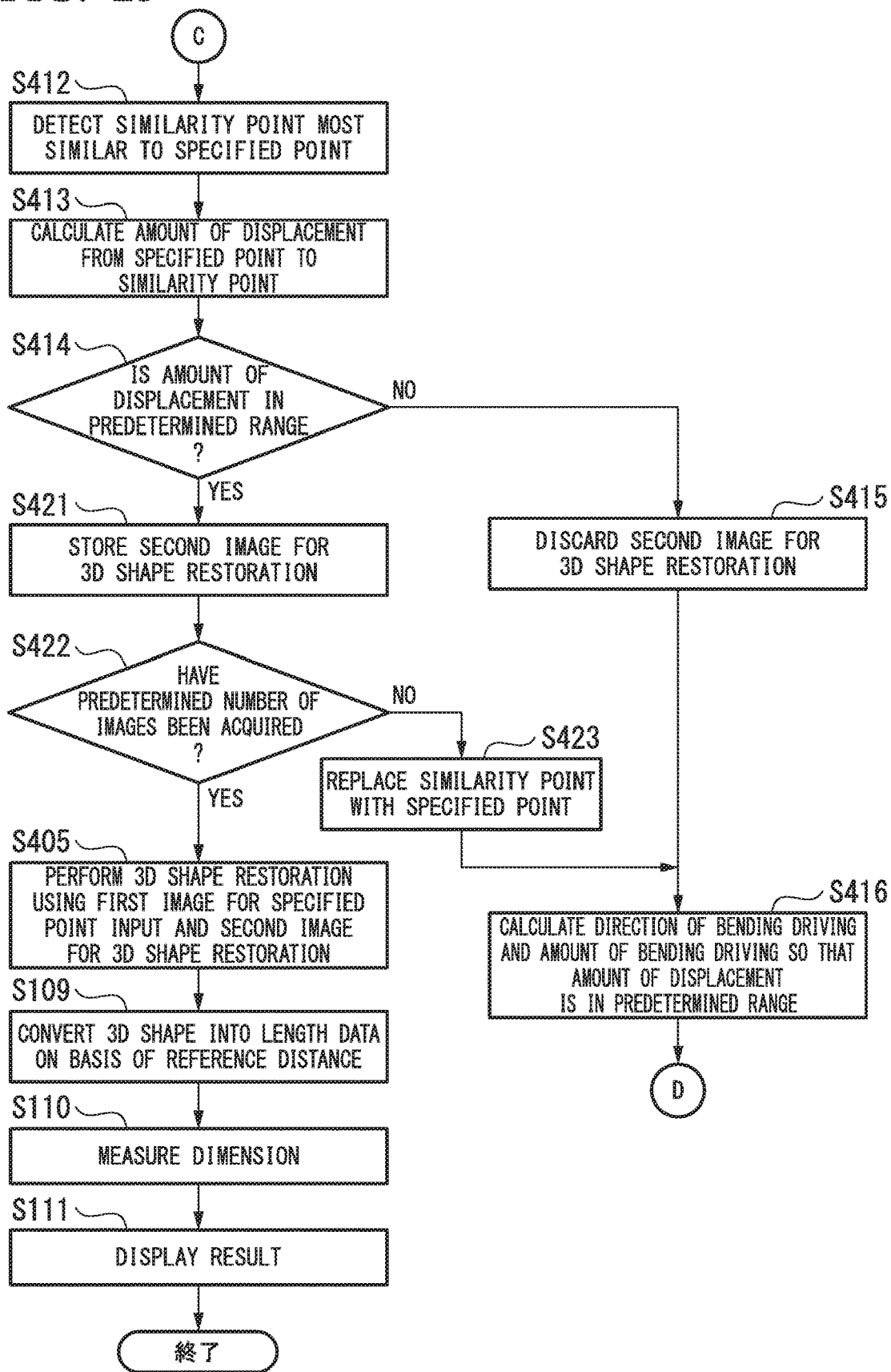
FIG. 25 is a flowchart showing a procedure of a 3D measurement process according to a ninth embodiment of the present invention.

A 3D measurement process according to the ninth embodiment will be described with reference to FIG. 25. FIG. 25 shows a procedure of the 3D measurement process. The process shown in FIG. 24 (the process after the similarity point detection process of step S412) according to the eighth embodiment is changed to the process shown in FIG. 25. Differences from the process shown in FIG. 24 will be described with respect to the process shown in FIG. 25.

If the image determination unit 185 determines that all four amounts of displacement are in a predetermined range in step S414, the image determination unit 185 stores a second image to be used for a determination in a RAM 14

(step S421). After the second image is stored in the RAM 14 in step S421, the image determination unit 185 determines whether or not the number of second images stored in the RAM 14 has reached the predetermined number of images (step S422). The predetermined number is an integer greater than or equal to 1.

If the image determination unit 185 determines that a predetermined number of second images have been acquired in step S422, the processing of step S405 is executed. If the image determination unit 185 determines that a predetermined number of second images have not been acquired in step S422, the similarity point detected in step S412 is replaced with a specified point (step S423). After the similarity point is replaced with the specified point in step S423, the processing of step S416 is executed.

Regarding points other than the above, a process shown in FIG. 25 is similar to the process shown in FIG. 24.

In the ninth embodiment, the endoscope device 1 can improve measurement accuracy as compared with the eighth embodiment.

Tenth Embodiment

A tenth embodiment of the present invention will be described using a CPU 18f shown in FIG. 22.

In the tenth embodiment, a second image acquisition process and a specified point setting process are executed in parallel. In other words, second image acquisition by a CCU 9 and specified point setting by a specified point setting unit 183 are executed in parallel. Also, the second image acquisition process and the reference dimension setting process are executed in parallel. In other words, the second image acquisition by the CCU 9 and the reference dimension setting by a reference dimension setting unit 184 are executed in parallel.

In the tenth embodiment, the imaging state calculation process and the specified point setting process are executed in parallel. In other words, imaging state calculation by an imaging state calculation unit 195 and specified point setting by the specified point setting unit 183 are executed in parallel. Also, the imaging state calculation process and the reference dimension setting process are executed in parallel. In other words, the imaging state calculation by the imaging state calculation unit 195 and the reference dimension setting by a reference dimension setting unit 184 are executed in parallel.

In the tenth embodiment, a bending control process and a specified point setting process are executed in parallel. In other words, bending mechanism control by a bending control unit 188 and specified point setting by the specified point setting unit 183 are executed in parallel. Also, the bending control process and the reference dimension setting process are executed in parallel. In other words, the bending mechanism control by the bending control unit 188 and the reference dimension setting by the reference dimension setting unit 184 are executed in parallel.

Figure 26:
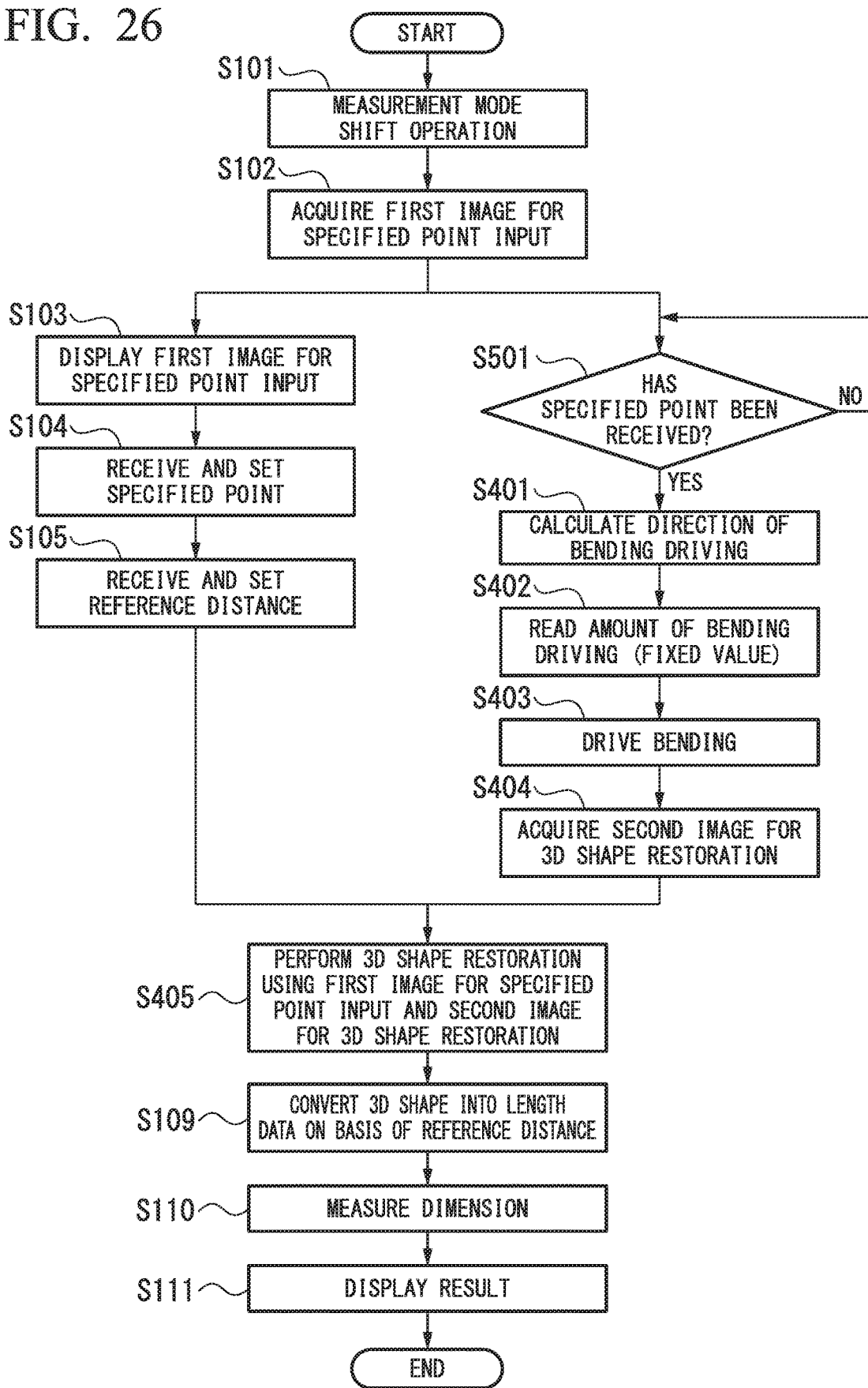
FIG. 26 is a flowchart showing a procedure of a 3D measurement process according to a tenth embodiment of the present invention.

A 3D measurement process according to the tenth embodiment will be described with reference to FIG. 26. FIG. 26 shows a procedure of the 3D measurement process. Differences from the process shown in FIG. 20 will be described with respect to the process shown in FIG. 26.

After a first image is acquired in step S102, the processing of steps S103 to S105 is executed. After the first image is acquired in step S102, a control unit 180 determines whether or not an operation unit 4 has received the specified point specified by the user (step S501). It is only necessary to perform the determination in step S501 on at least one of a plurality of specified points received in step S104.

If the control unit 180 determines that the operation unit 4 has not received the specified point in step S501, the processing of step S501 is executed again. That is, the processing of step S501 is iterated until the operation unit 4 receives the specified point.

If the control unit 180 determines that the operation unit 4 has received the specified point in step S501, the processing of steps S401 to S404 is executed. That is, the imaging state calculation (steps S401 and S402) and the specified point setting (step S104) are executed in parallel. Alternatively, the imaging state calculation (step S401 to step S402) and the reference distance setting (step S105) are executed in parallel. Alternatively, the bending control (step S403) and the specified point setting (step S104) are executed in parallel. Alternatively, the bending control (step S403) and the reference distance setting (step S105) are executed in parallel. Alternatively, the second image acquisition (step S404) and the specified point setting (step S104) are executed in parallel. Alternatively, the second image acquisition (step S404) and the reference distance setting (step S105) are executed in parallel. The processing of steps S401 to S404 is executed as background processing. After the reference distance is set in step S105 and the second image is acquired in step S404, the 3D shape restoration process of step S405 is executed.

The imaging state calculation unit 195 calculates an imaging state during a period from a specified point setting start timing to a specified point setting end timing. At the specified point setting start timing, specified point setting by the specified point setting unit 183 is started. At the specified point setting end timing, the specified point setting by the specified point setting unit 183 is ended. Alternatively, the imaging state calculation unit 195 calculates the imaging state during the period from the reference dimension setting start timing to the reference dimension setting end timing. At the reference dimension setting start timing, reference dimension setting by the reference dimension setting unit 184 is started. At the reference dimension setting end timing, the reference dimension setting by the reference dimension setting unit 184 is ended.

Alternatively, the specified point setting unit 183 sets a specified point during a period from a bending start timing to a bending end timing. At the bending start timing, the bending of the tip of the endoscope based on the bending control by the bending control unit 188 is started. At the bending end timing, the bending of the tip of the endoscope based on the bending control by the bending control unit 188 is ended. Alternatively, the reference dimension setting unit 184 sets a reference dimension during the period from the bending start timing to the bending end timing.

Alternatively, the specified point setting unit 183 sets a specified point during a period from the second image acquisition start timing to the second image acquisition end timing. At the second image acquisition start timing, imaging in the second imaging state by the imaging element 28 and second image acquisition by the CCU 9 are started. At the second image acquisition end timing, the imaging in the second imaging state by the imaging element 28 and the second image acquisition by the CCU 9 are ended. Alternatively, the reference dimension setting unit 184 sets a reference dimension during the period from the second image acquisition start timing to the second image acquisition end timing.

Regarding points other than the above, a process shown in FIG. 26 is similar to the process shown in FIG. 20.

It is assumed in advance that the processing of steps S104 and S105 in which the operation by the user is performed requires a certain amount of time. This time is used for the imaging state calculation, the bending control, and the second image acquisition. When the reference distance is set in step S105, there is a possibility that the second image acquisition will already have been completed. As a result, there is a possibility that the 3D shape restoration process of step S405 will be able to be quickly started. At least, compared with the seventh embodiment in which the second image acquisition is started after the reference distance setting is completed, the user can have a clear feeling that the image acquisition time is short.

As described above, a process requiring an operation by the user and a process related to the second image acquisition for the 3D shape restoration are executed in parallel. Thereby, a period until the user receives the measurement result is significantly shortened and inspection efficiency is improved.

Eleventh Embodiment

Figure 27:
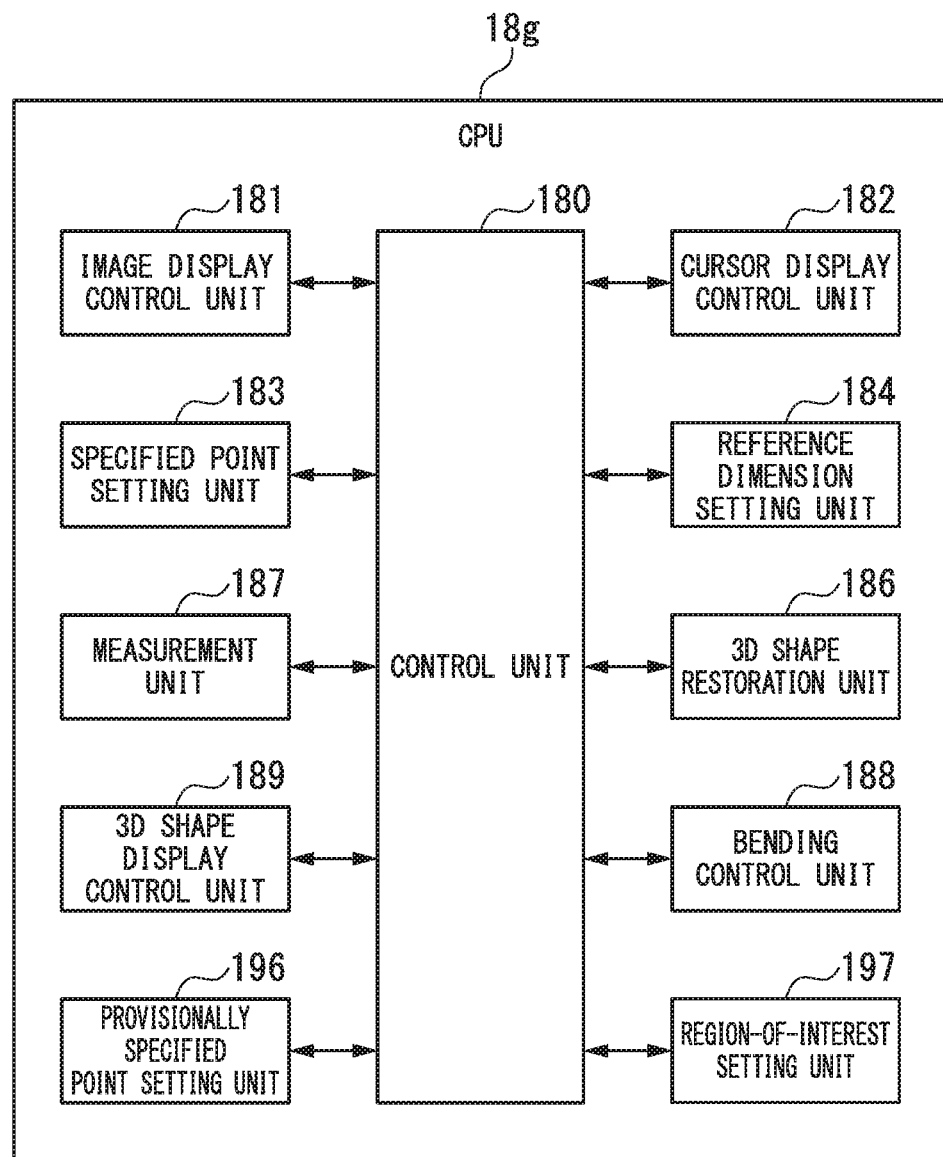
FIG. 27 is a block diagram showing a functional configuration of a CPU according to an eleventh embodiment of the present invention.

In an eleventh embodiment of the present invention, the CPU 18a in the first embodiment is changed to a CPU 18g shown in FIG. 27. FIG. 27 shows a functional configuration of the CPU 18g. Differences from the configuration shown in FIG. 3 will be described with respect to the configuration shown in FIG. 27.

In addition to the configuration shown in FIG. 3, the CPU 18g includes a 3D shape display control unit 189, a provisionally specified point setting unit 196, and a region-of-interest setting unit 197. The 3D shape display control unit 189 executes a 3D shape display process. In the 3D shape display process, the 3D shape display control unit 189 causes a display unit 5 to display a 3D shape for the user to specify the specified point.

The provisionally specified point setting unit 196 executes a provisionally specified point setting process. The provisionally specified point setting unit 196 sets a provisionally specified point on a first image acquired by the CCU 9 in the provisionally specified point setting process. The provisionally specified point indicates a reference position for acquiring the second image. For example, the provisionally specified point is input by a user. The provisionally specified point setting unit 196 sets one or more provisionally specified points. In one or more second imaging states, a position corresponding to the provisionally specified point set by the provisionally specified point setting unit 196 is included in an imaging field of view. The specified point setting unit 183 sets a specified point on the 3D shape restored by the 3D shape restoration unit 186 or the first image. The reference dimension setting unit 184 sets a reference dimension on the 3D shape restored by the 3D shape restoration unit 186.

The region-of-interest setting unit 197 executes a region-of-interest setting process. In the region-of-interest setting process, the region-of-interest setting unit 197 sets a region of interest on the first image acquired by the CCU 9 on the basis of a position of the provisionally specified point set by the provisionally specified point setting unit 196.

Regarding points other than the above, a configuration shown in FIG. 27 is similar to the configuration shown in FIG. 3.

Figure 28:
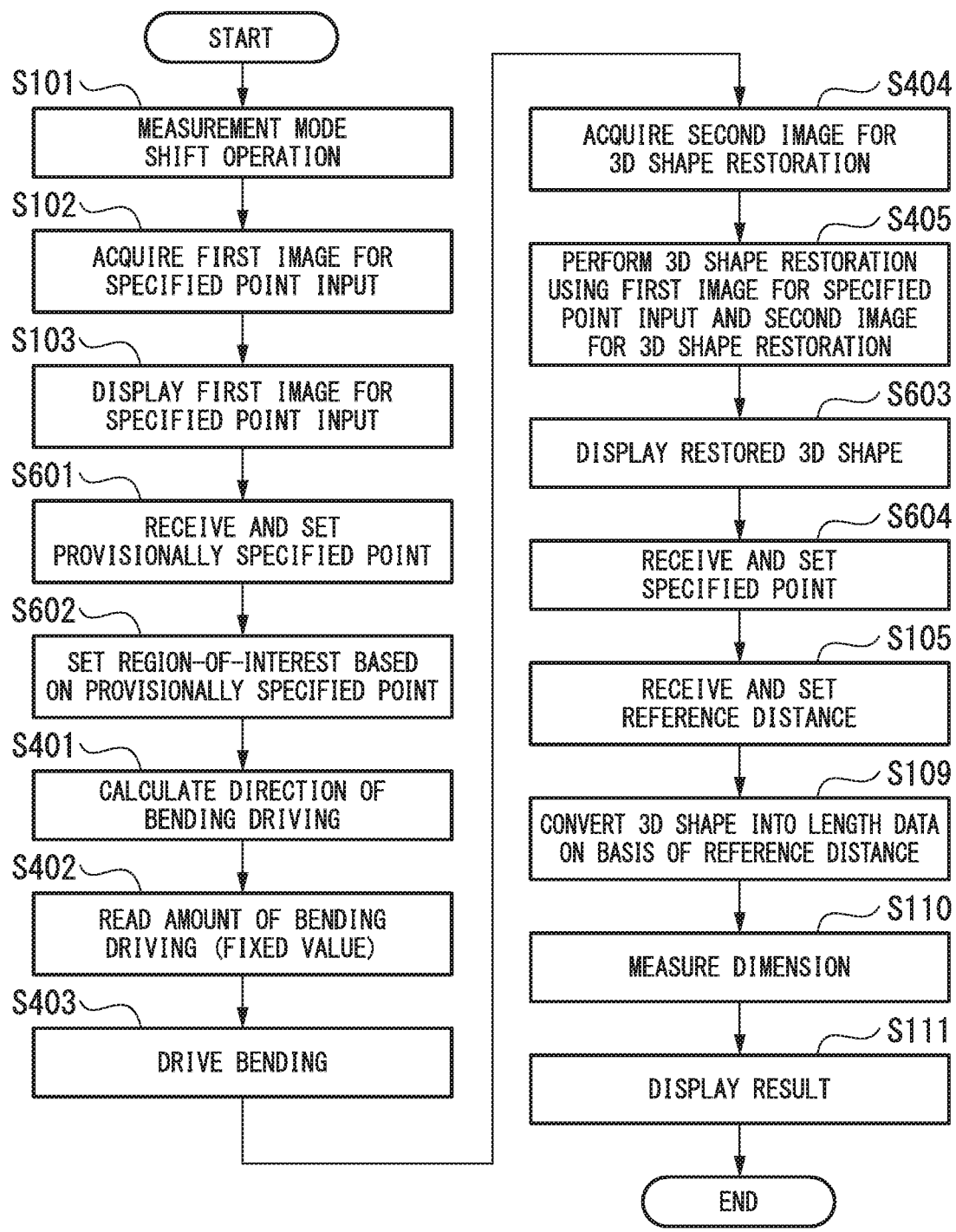
FIG. 28 is a flowchart showing a procedure of a 3D measurement process according to the eleventh embodiment of the present invention.

A 3D measurement process according to the eleventh embodiment will be described with reference to FIG. 28. FIG. 28 shows a procedure of the 3D measurement process. Differences from the process shown in FIG. 20 will be described with respect to the process shown in FIG. 28.

After a first image is displayed on the display unit 5 in step S103, the user operates an operation unit 4 to specify the provisionally specified point on the displayed first image. The operation unit 4 receives the provisionally specified point specified by the user. The provisionally specified point setting unit 196 sets a provisionally specified point on the first image acquired in step S102 (step S601).

Figure 29:
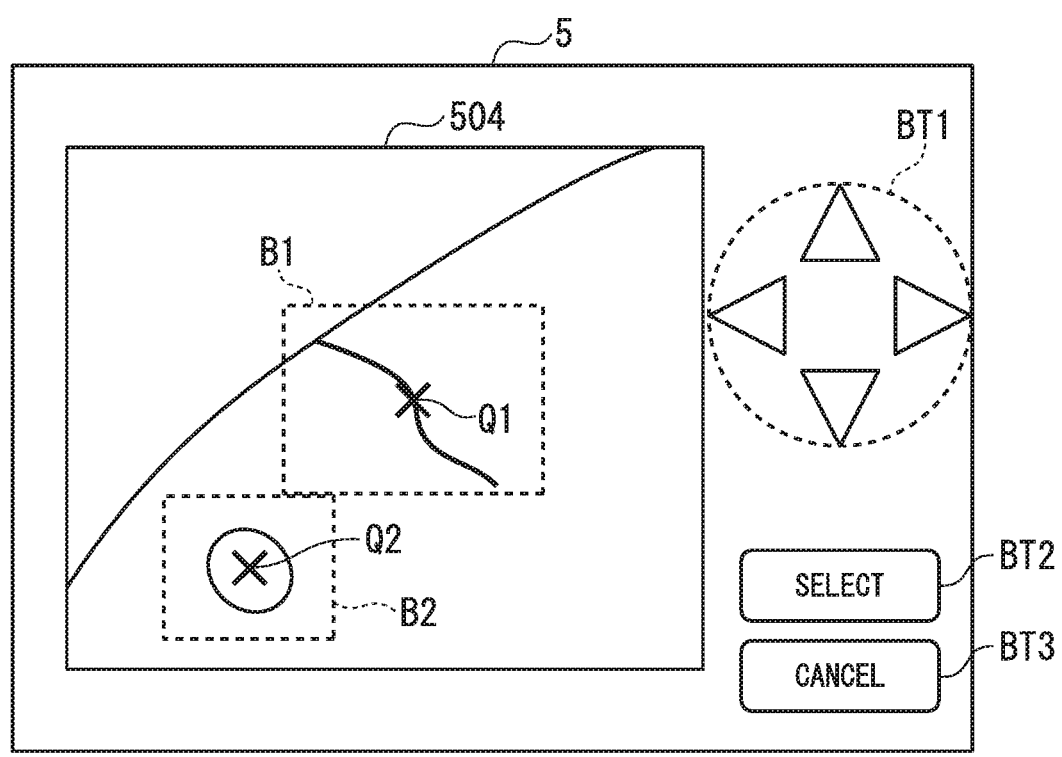
FIG. 29 is a reference diagram showing a screen of a display unit according to the eleventh embodiment of the present invention.

FIG. 29 shows a screen of the display unit 5. As shown in FIG. 29, a first image 504 is displayed. In this example, two provisionally specified points Q1 and Q2 are set on the first image 504 displayed on the display unit 5. The provisionally specified point Q1 is a provisionally specified measurement point and the provisionally specified point Q2 is a provisionally specified reference point.

In the example shown in FIG. 29, a provisionally specified point specification method by the user is similar to a specified point specification method. The user operates a button BT1 to move a cursor (not shown). When the user presses a button BT2, the provisionally specified point is specified at a position of the cursor. When the user presses a button BT3, the provisionally specified point which has been specified is canceled. When each provisionally specified point is specified by the user's operation, the provisionally specified point setting unit 196 calculates positions (coordinates) of provisionally specified points which have been specified. Position information (coordinate information) of the two provisionally specified points is stored in a RAM 14. The position of the provisionally specified point need not be an exact coordinate position determined for a long time.

For example, the user specifies a provisionally specified point in a region in which a specified measurement point is assumed to be set, and specifies another provisionally specified point in a region in which a specified reference point is assumed to be set. It is important that the user can simply (quickly) set a provisionally specified point.

The two provisionally specified points Q1 and Q2 which are specified are displayed on the display unit 5. An image display control unit 181 causes the display unit 5 to display the provisionally specified points. Specifically, the image display control unit 181 generates a graphic image signal of each provisionally specified point. The image display control unit 181 outputs the generated graphic image signal to a video signal processing circuit 12. The video signal processing circuit 12 combines a video signal output from the CCU 9 and the graphic image signal output from the CPU 18g. Thereby, each provisionally specified point is superimposed on a first image. The video signal processing circuit 12 outputs a combined video signal to the display unit 5. The display unit 5 displays a first image on which each provisionally specified point is superimposed. Thus, the user can recognize a position of the provisionally specified point.

After the provisionally specified point is set in step S601, the region-of-interest setting unit 197 sets a region of interest on the first image acquired by the CCU 9 on the basis of a position of the provisionally specified point set in step S601 (step S602).

Details of the processing of step S602 will be described. The region-of-interest setting unit 197 sets a region of interest including each provisionally specified point with respect to each of the two provisionally specified points specified by the user. In the example shown in FIG. 29, a region of interest B1 is set for the provisionally specified point Q1 and a region of interest B2 is set for the provisionally specified point Q2. The regions of interest B1 and B2 are rectangular regions having the provisionally specified points at centers of the regions. The region-of-interest setting unit 197 calculates positions (coordinates) of the regions of interest B1 and B2. Position information (coordinate information) of the region of interest B1 and the region of interest B2 is stored in the RAM 14. For example, position information of the region of interest includes position information (coordinate information) of a representative point of the region of interest and size information of the region of interest. The region of interest is set by associating the region of interest with a specific first image.

The two regions of interest B1 and B2 are displayed on the display unit 5. The image display control unit 181 displays the regions of interest B1 and B2 on the display unit 5. Specifically, the image display control unit 181 generates a graphic image signal of each region of interest. The image display control unit 181 outputs the generated graphic image signal to the video signal processing circuit 12. The video signal processing circuit 12 combines the video signal output from the CCU 9 and the graphic image signal output from the CPU 18g. Thereby, each region of interest is superimposed on the first image. The video signal processing circuit 12 outputs a combined video signal to the display unit 5. The display unit 5 displays a first image on which each region of interest is superimposed. For example, each region of interest is indicated by a line. Thus, the user can recognize positions of the regions of interest.

A means for determining the provisionally specified point is not limited to an input by the user. For example, the provisionally specified point setting unit 196 may automatically determine the provisionally specified point on the basis of information registered in advance in an endoscope device 1. For example, a reference image in which a provisionally specified point is preset is input from a personal computer 41 or a memory card 42 to the endoscope device 1. The provisionally specified point setting unit 196 may detect a point similar to a provisionally specified point set on a reference image in the first image through pattern matching and set the detected point as the provisionally specified point.

Coordinate information registered in advance in the memory as the provisionally specified point may be displayed on the display unit 5. When the user specifies the provisionally specified point, the user can refer to the coordinate information displayed on the display unit 5.

In the above example, a rectangular region of interest is set. The shape of the region of interest is not limited to a rectangle. The shape of the region of interest may be a shape such as a circle, an ellipse, and a polygon. Also, the size of the region of interest is not limited.

In the above example, the region of interest is set so that the provisionally specified point specified by the user is located at the center of the region of interest. The position of the region of interest is not limited thereto. The region of interest may be set at a position away from the provisionally specified point by a specific distance and in a specific direction.

A size of the region of interest may be automatically set by the endoscope device 1. Alternatively, the user may determine the size of the region of interest. Also, the number of provisionally specified points is not limited. For example, as in the above example, one provisionally specified point serving as a representative of a plurality of specified measurement points and one provisionally specified point serving as a representative of a plurality of specified reference points are set. One provisionally specified point may be set for each of a plurality of specified measurement points and a plurality of specified reference points. If candidate points for the specified measurement point and the specified reference point overlap in a narrow region in a range of a field of view of the first image, only one provisionally specified point may be set.

After the region of interest is set in step S602, the processing of step S401 is executed. In step S401, the bending control unit 188 calculates a direction of bending driving of the tip of the endoscope on the basis of a position of the region of interest in the first image acquired in step S102.

After the 3D shape is restored in step S405, the 3D shape display control unit 189 causes the display unit 5 to display the 3D shape restored by the 3D shape restoration unit 186 (step S603). After the 3D shape is displayed in step S603, the user specifies a specified point on the displayed 3D shape by operating the operation unit 4. The operation unit 4 receives a specified measurement point and a specified reference point specified by the user. The specified point setting unit 183 sets a specified measurement point and a specified reference point on the restored 3D shape (step S604).

Also, the 3D shape display control unit 189 may cause the display unit 5 to display the first image as well as the 3D shape restored by the 3D shape restoration unit 186. In this case, the specified point setting unit 183 sets the specified measurement point and the specified reference point on the first image or the 3D shape. The specified point setting unit 183 may set the specified measurement point on the first image and set the specified reference point on the 3D shape. Alternatively, the specified point setting unit 183 may set the specified reference point on the first image and set the specified measurement point on the 3D shape.

The 3D shape display control unit 189 may cause the display unit 5 to display the first image without displaying the 3D shape restored by the 3D shape restoration unit 186. In this case, the specified point setting unit 183 sets the specified measurement point and the specified reference point on the first image. As described above, the specified point setting unit 183 may set a specified point on at least one of the first image and the 3D shape.

After the specified point is set in step S604, the processing of step S105 is executed. In step S105, the reference dimension setting unit 184 sets a reference distance on the restored 3D shape. After the reference distance is set in step S105, the processing of step S109 is executed.

In the process shown in FIG. 28, the processing corresponding to step S107 shown in FIG. 6 is not included. That is, a process of extracting only a second image including a point corresponding to a provisionally specified point from among the second images acquired by the CCU 9 is not included in the process shown in FIG. 28. However, by using coordinates of the provisionally specified point, it is possible to exclude a second image in which a region of interest is not included from being an object of the 3D shape restoration process. As a result, a processing time of the 3D shape restoration process can be shortened.

Regarding points other than the above, a process shown in FIG. 28 is similar to the process shown in FIG. 20.

The region of interest need not be set in step S602. In step S401, the bending control unit 188 may calculate a direction of bending driving of the tip of the endoscope on the basis of a set position of the provisionally specified point. Therefore, the CPU 18g need not have the region-of-interest setting unit 197.

In the first embodiment, after four specified points including two specified measurement points and two specified reference points are set, a second image for 3D shape restoration is acquired. A period until the user determines the four specified points to determine an exact position of the specified point may be long. Thus, when the second image is acquired, there is a possibility that the subject may have moved out of the composition determined by the user when a shift to the measurement mode was made. When the subject has moved out of the composition, a region of interest may be out of frame. In that case, the user needs to determine the composition again. The user needs to return the mode of the endoscope device 1 from the measurement mode to an inspection mode so that the user determines the composition again. Therefore, usability may become poor.

On the other hand, in the eleventh embodiment, the provisionally specified point is simply set immediately after the first image for the specified point input is acquired. On the basis of the provisionally specified point, a second image for 3D shape restoration is acquired. After the second image is acquired, the specified point is set. Second image acquisition is completed before the user specifies the specified point. Thereby, a period until the second image for the 3D shape restoration is acquired after the acquisition of the first image for the specified point input or the display of the first image is shortened. Thus, even though time for the user to input the specified point by the user is required, it is possible to prevent the composition in the second image from moving out of the composition desired by the user. The composition desired by the user is a composition when the first image for the specified point input is acquired. Therefore, it is possible to achieve both improvement of inspection efficiency and improvement of usability.

Twelfth Embodiment

Figure 30:
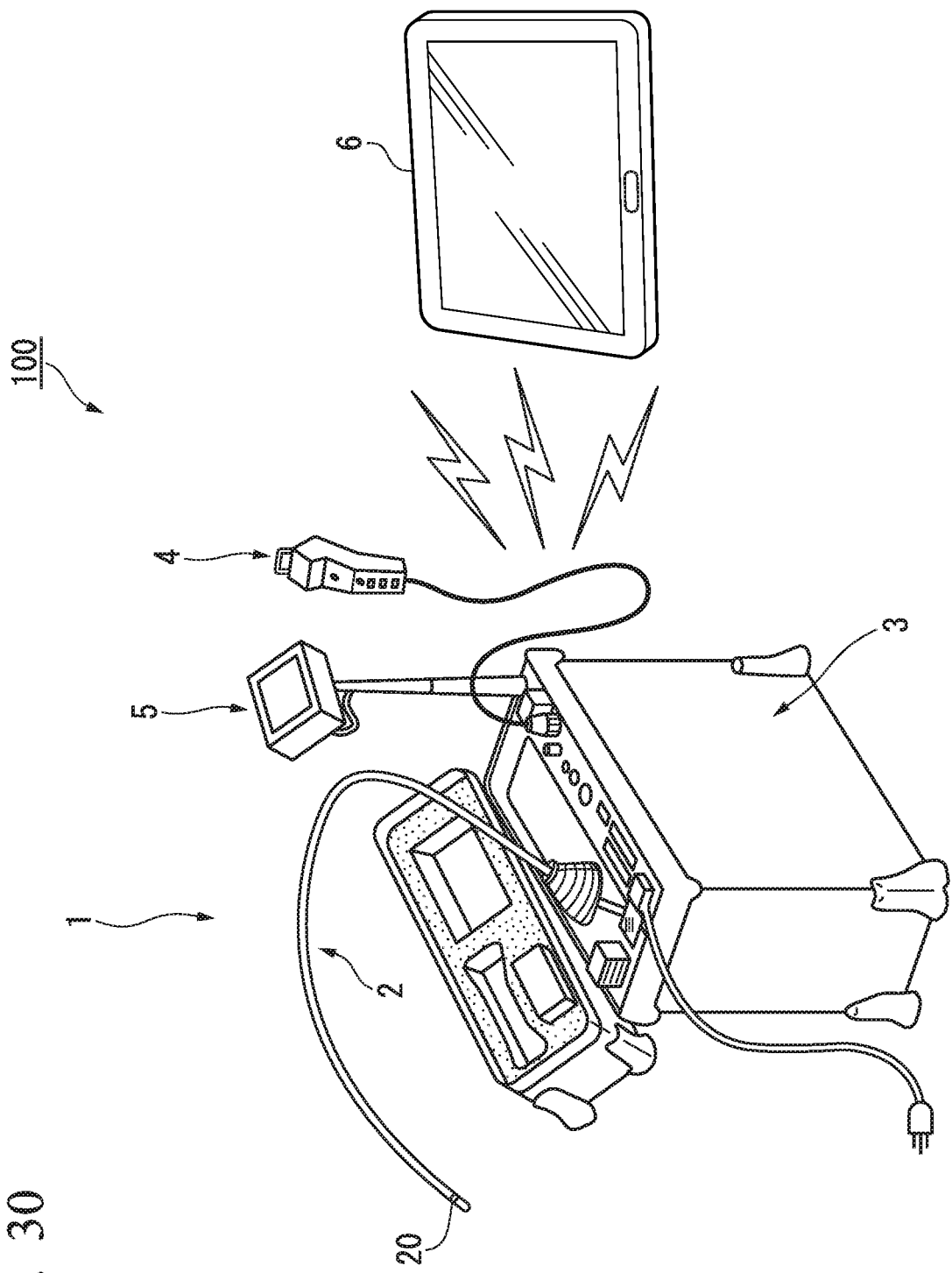
FIG. 30 is a perspective view showing the overall configuration of an endoscope system according to a twelfth embodiment of the present invention.

In a twelfth embodiment of the present invention, a device for acquiring a second image for 3D shape restoration is different from a device in which a 3D shape restoration function is installed. FIG. 30 shows a configuration of an endoscope system 100 (a measurement system) of the twelfth embodiment. As shown in FIG. 30, the endoscope system 100 includes an endoscope device 1 (an image acquisition device) and an external terminal device 6 (a 3D shape restoration device). The endoscope device 1 constitutes the image acquisition device. The external terminal device 6 constitutes the 3D shape restoration device.

Figure 31:
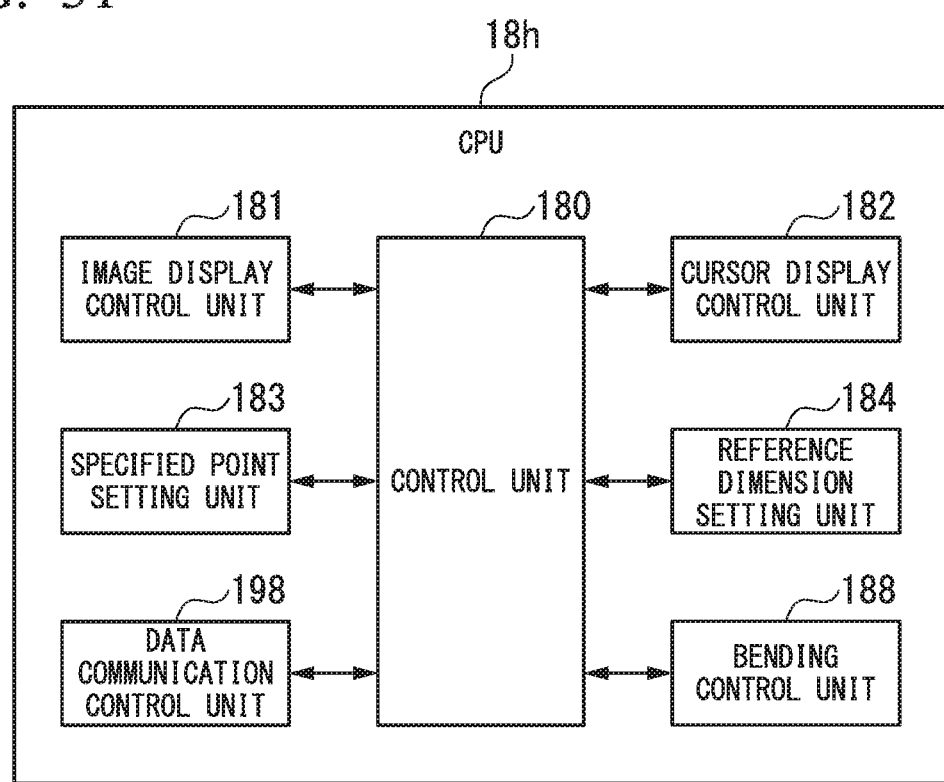
FIG. 31 is a block diagram showing a functional configuration of a CPU according to the twelfth embodiment of the present invention.

Except that the CPU 18a is changed to a CPU 18h shown in FIG. 31, the configuration of the endoscope device 1 is similar to the configuration shown in FIG. 2. In the endoscope device 1, an external device interface 16 (a data communication unit) communicates with the external terminal device 6. Specifically, the external device interface 16 transmits an acquired second image to the external terminal device 6.

Also, the external device interface 16 transmits specified point information and reference dimension information to the external terminal device 6. The specified point information indicates a position (coordinates) of a specified point set by a specified point setting unit 183. The reference dimension information indicates a reference dimension (a reference distance) set by a reference dimension setting unit 184. Accordingly, the external device interface 16 transmits measurement process information to the external terminal device 6. The measurement process information includes a plurality of images including at least a second image, information of the specified point set by the specified point setting unit 183, and information of the reference dimension set by the reference dimension setting unit 184. For example, the plurality of images include a plurality of second images.

Alternatively, the plurality of images include one first image and one or more second images. Also, the external device interface 16 transmits parameters of an objective optical system of the endoscope, i.e., internal parameters, to the external terminal device 6.

For example, the external device interface 16 is a wireless module and performs wireless communication with the external terminal device 6. The endoscope device 1 and the external terminal device 6 may be connected by a cable such as a local area network (LAN) cable and the external device interface 16 may communicate with the external terminal device 6 via the cable.

The external terminal device 6 receives the measurement process information and the internal parameters from the endoscope device 1. That is, the external terminal device 6 receives a plurality of images including the second image, the specified point information, the reference dimension information, and the internal parameters from the endoscope device 1. The external terminal device 6 extracts a second image including a specified point on the basis of the specified point information from among the received second images, and executes the 3D shape restoration process on the basis of the extracted second image, the specified point information, the reference dimensional information, and the internal parameters.

For example, the external terminal device 6 is a mobile terminal. The external terminal device 6 may be a fixed terminal. The form of the external terminal device 6 is not limited thereto.

In the twelfth embodiment, the CPU 18a in the first embodiment is changed to the CPU 18h shown in FIG. 31. FIG. 31 shows a functional configuration of the CPU 18h. Differences from the configuration shown in FIG. 3 will be described with respect to the configuration shown in FIG. 31.

The CPU 18h has a configuration obtained by excluding the image determination unit 185, the 3D shape restoration unit 186, and the measurement unit 187 from the configuration shown in FIG. 3. Also, the CPU 18h has a data communication control unit 198. The data communication control unit 198 controls communication with the external terminal device 6 to be performed by the external device interface 16. That is, the data communication control unit 198 causes the external device interface 16 to transmit the acquired second image, the specified point information, the reference dimension information, and the internal parameters to the external terminal device 6.

Regarding points other than the above, a configuration shown in FIG. 31 is similar to the configuration shown in FIG. 3.

Figure 32:
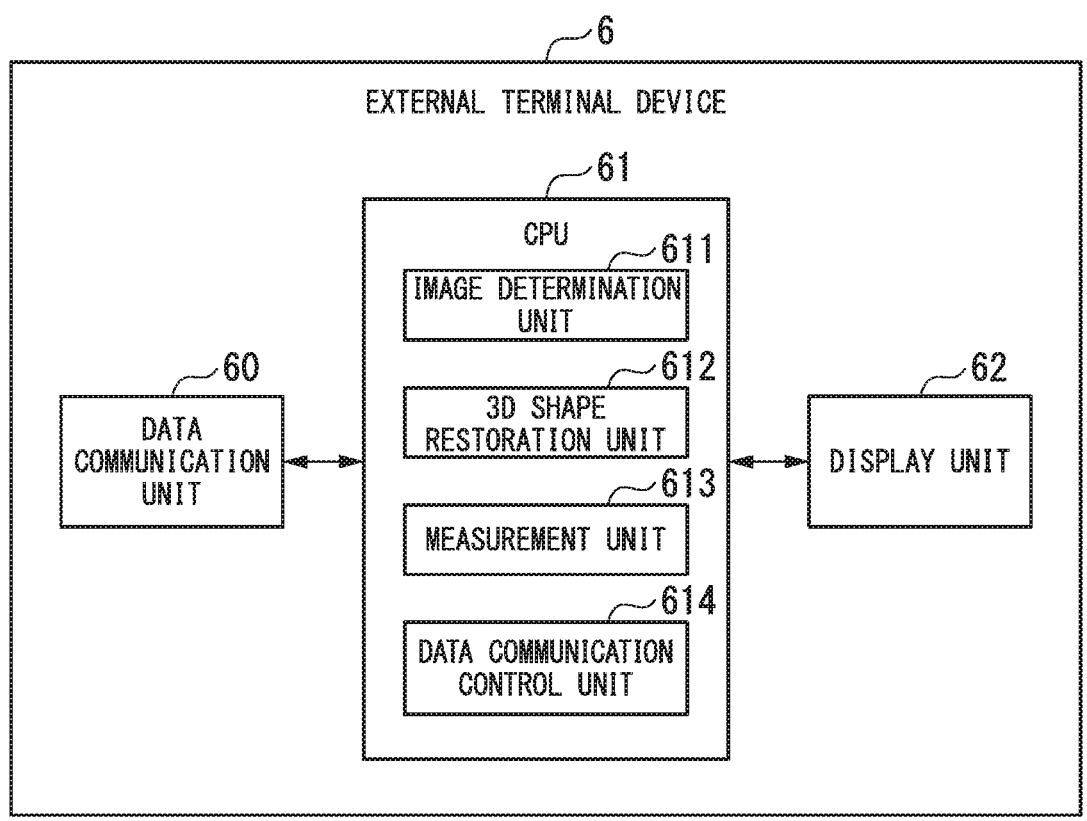
FIG. 32 is a block diagram showing a functional configuration of an external terminal device according to the twelfth embodiment of the present invention.

FIG. 32 shows a functional configuration of the external terminal device 6. As shown in FIG. 32, the external terminal device 6 includes a data communication unit 60, a CPU 61, and a display unit 62.

The data communication unit 60 receives an acquired second image, specified point information, reference dimension information, and internal parameters from the endoscope device 1. For example, the data communication unit 60 is a wireless module, and performs wireless communication with the endoscope device 1. The data communication unit 60 may communicate with the endoscope device 1 via a cable.

An image determination unit 611, a 3D shape restoration unit 612, a measurement unit 613, and a data communication control unit 614 constitute functions of the CPU 61. At least one of blocks constituting the CPU 61 may include a circuit separate from the CPU 61.

The image determination unit 611, the 3D shape restoration unit 612, the measurement unit 613, and the data communication control unit 614 may include at least one of a processor and a logic circuit. For example, the processor is at least one of a CPU, a DSP, and a GPU. For example, the logic circuit is at least one of an ASIC and an FPGA. The image determination unit 611, the 3D shape restoration unit 612, the measurement unit 613, and the data communication control unit 614 may include one or more processors. The image determination unit 611, the 3D shape restoration unit 612, the measurement unit 613, and the data communication control unit 614 can include one or more logic circuits.

The image determination unit 611 is configured similar to the image determination unit 185 shown in FIG. 3. On the basis of the received information of the specified point, the image determination unit 611 determines whether or not a point corresponding to the specified point is included in the received second image. The image determination unit 611 (an image extraction unit) extracts the second image determined to include the point corresponding to the specified point. The 3D shape restoration unit 612 is configured similar to the 3D shape restoration unit 186 shown in FIG. 3. The 3D shape restoration unit 612 restores a 3D shape of an object using a plurality of images including the extracted second image. The measurement unit 613 is configured similar to the measurement unit 187 shown in FIG. 3. The measurement unit 613 measures the object on the basis of the restored 3D shape, the received information of the specified point, and the received information of the reference dimension. The data communication control unit 614 controls communication with the endoscope device 1 to be performed by the data communication unit 60. That is, the data communication control unit 614 causes the data communication unit 60 to receive a second image, specified point information, reference dimension information, and internal parameters from the endoscope device 1.

The CPU 61 may read a program including a command for defining an operation of the CPU 61 and execute a read program. That is, the function of the CPU 61 may be implemented by software. An implementation form of this program is similar to an implementation form of a program for implementing the function of the endoscope device 1.

The display unit 62 has a display screen and displays an operation menu and the like on the display screen. The display unit 62 is a monitor (a display) such as an LCD.

Figure 33:
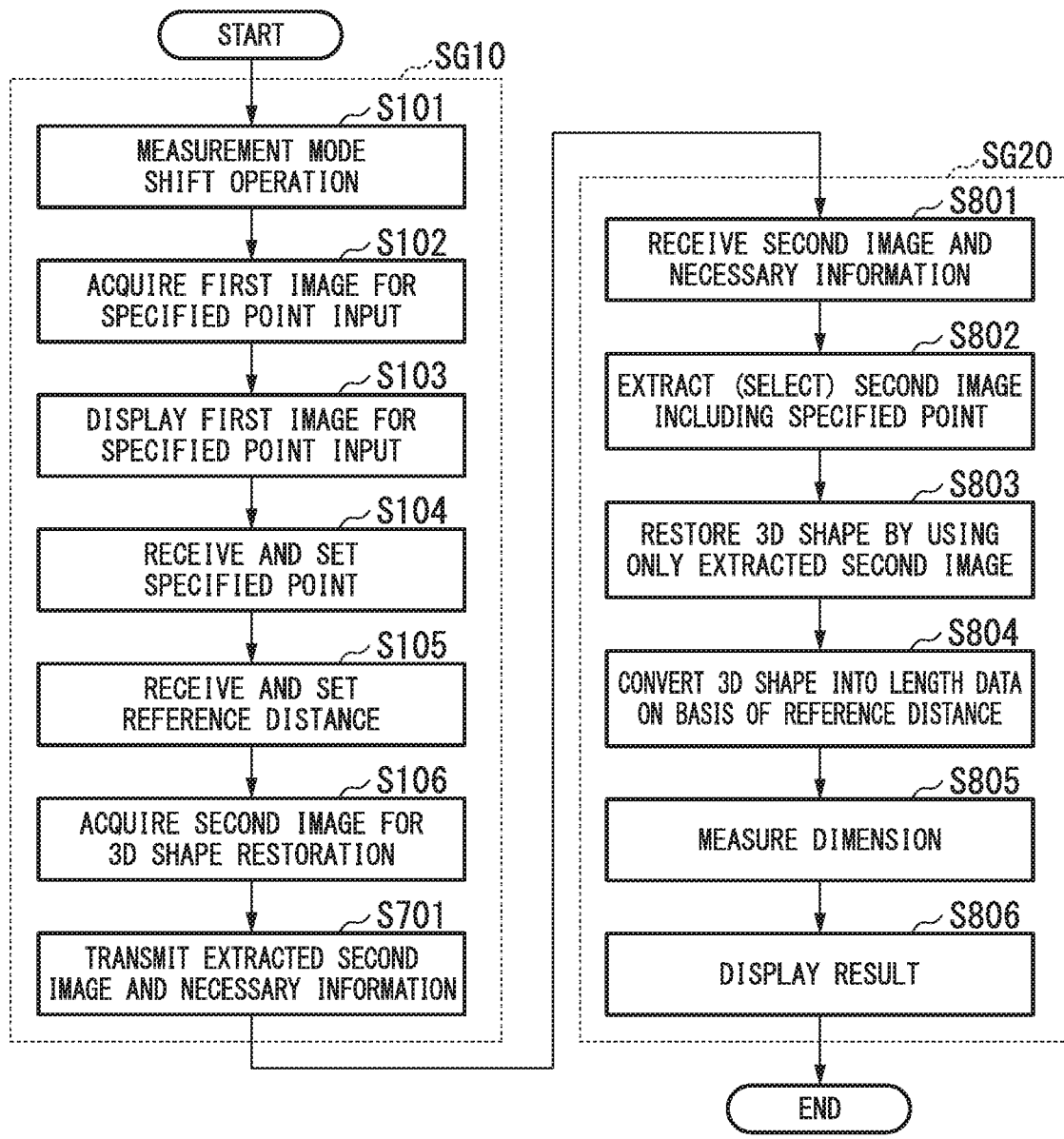
FIG. 33 is a flowchart showing a procedure of a process executed by an endoscope device and the external terminal device according to the twelfth embodiment of the present invention.

A 3D measurement process according to the twelfth embodiment will be described with reference to FIG. 33. FIG. 33 shows a procedure of a process executed by the endoscope device 1 and the external terminal device 6. The 3D measurement process is divided into a process SG10 in the endoscope device 1 and a process SG20 in the external terminal device 6. Differences from the process shown in FIG. 6 will be described with respect to the process to be executed by the endoscope device 1.

After a plurality of second images are acquired in step S106, the data communication control unit 198 issues a command, to the external device interface 16, for transmitting a plurality of second images, specified point information, reference dimension information, and internal parameters to the external terminal device 6. Thereby, the external device interface 16 transmits the second image, the specified point information, the reference dimension information, and the internal parameters to the external terminal device 6 (step S701). By executing the processing of step S701, the process in the endoscope device 1 is completed.

A process to be executed by the external terminal device 6 will be described. The data communication control unit 614 causes the data communication unit 60 to receive the second image, the specified point information, the reference dimension information, and the internal parameters from the endoscope device 1. Thereby, the data communication unit 60 receives the second image, the specified point information, the reference dimension information, and the internal parameters from the endoscope device 1 (step S801).

After the second image, the specified point information, the reference dimension information, and the internal parameters are received in step S801, the image determination unit 611 extracts a second image including a correspondence point corresponding to the specified point from among a plurality of received second images (step S802). The processing of step S802 is similar to the processing of step S107 shown in FIG. 6. After the second image including the correspondence point is extracted in step S802, the 3D shape restoration unit 612 restores a 3D shape of a subject by using only the extracted second image (step S803). The processing of step S803 is similar to the processing of step S108 shown in FIG. 6.

After the 3D shape of the subject is restored in step S803, the measurement unit 613 converts 3D shape data of the subject into 3D coordinate data having a length dimension (step S804). The processing of step S804 is similar to the processing of step S109 shown in FIG. 6.

After step S804, the measurement unit 613 measures a length of a distance between two points defined by two specified measurement points in a well-known measurement method on the basis of the obtained 3D coordinate data (step S805). The processing of step S805 is similar to the processing of step S110 shown in FIG. 6.

After the length of the distance between the two points is measured in step S805, a measurement result is displayed on the display unit 62 (step S806). By executing the processing of step S806, the process in the external terminal device 6 is completed.

Although the endoscope device 1 performs specified point reception, a specified point setting process, reference dimension reception, and a reference dimension setting process in the twelfth embodiment, these processes may be performed by the external terminal device 6. In this case, a first image, a second image, and internal parameters are transmitted from the endoscope device 1 and are received by the external terminal device 6. Then, in the external terminal device 6, the received first image is displayed, and the reception of the specified point on the first image and the specified point setting process are performed. Further, the reception of the reference dimension and the reference dimension setting process are performed. Then, a second image including a correspondence point corresponding to the specified point is extracted from a plurality of second images, and the 3D shape restoration process is performed using the extracted second image. Thereafter, the processing of steps S804 to S806 is performed.

Also, although the 3D shape restoration process is performed using only the second image in the twelfth embodiment, the 3D shape restoration process may be performed using the first image and the second image. In this case, the first image, the second image, and the internal parameters are transmitted from the endoscope device 1 and received by the external terminal device 6. Then, a second image including a correspondence point corresponding to the specified point is extracted from a plurality of second images and the extracted second image and the received first image are used to perform the 3D shape restoration process.

As described above, the 3D shape restoration process with a high calculation load is executed by the external terminal device 6 different from the endoscope device 1 configured to acquire the second image for the 3D shape restoration. If the processing performance of the external terminal device 6 is better than the processing performance of the endoscope device 1, a processing time can be shortened. Also, the user can check a measurement result in a location other than a site where the endoscope device 1 is used. If the external terminal device 6 is a mobile terminal, the user can check the measurement result anywhere. Thus, a working location of the user is not fixed. As a result, inspection efficiency is improved.

Thirteenth Embodiment

A thirteenth embodiment of the present invention relates to an endoscope system 100 including an endoscope device 1 and an external terminal device 6 as in the twelfth embodiment.

The external terminal device 6 in the endoscope system 100 according to the thirteenth embodiment specifies a specified point and sets a reference dimension on the basis of a first image received from the endoscope device 1. Further, the external terminal device 6 calculates a direction of bending driving and an amount of bending driving of the tip of the endoscope for reaching an imaging position and an imaging posture when the second image is acquired, and transmits the calculated direction of bending driving and the calculated amount of bending driving to the endoscope device 1. The endoscope device 1 in the endoscope system 100 according to the thirteenth embodiment bends the tip of the endoscope on the basis of the received direction of bending driving and the received amount of bending driving. Thereafter, the endoscope device 1 acquires a second image.

Figure 34:
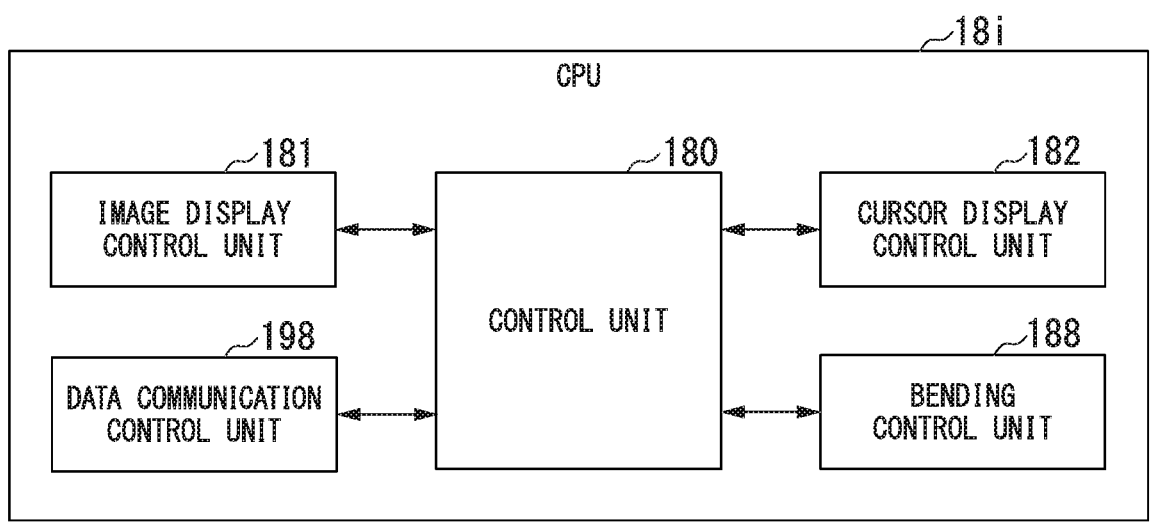
FIG. 34 is a block diagram showing a functional configuration of a CPU according to a thirteenth embodiment of the present invention.

In the thirteenth embodiment, the CPU 18*h* in the twelfth embodiment is changed to a CPU 18*i* shown in FIG. 34. FIG. 34 shows a functional configuration of the CPU 18*i*. Differences from the configuration shown in FIG. 31 will be described with respect to the configuration shown in FIG. 34.

The CPU 18*i* has a configuration obtained by excluding the specified point setting unit 183 and the reference dimension setting unit 184 from the configuration shown in FIG. 31. A data communication control unit 198 causes the external device interface 16 to transmit the acquired first image, the acquired second image, and the acquired internal parameters to the external terminal device 6. Also, the data communication control unit 198 causes the external device interface 16 to receive bending information (a direction of bending driving and an amount of bending driving) related to bending driving of the tip of the endoscope transmitted from the external terminal device 6. The bending information indicates an imaging state of the endoscope device 1 (an imaging element 28) for capturing a second image including a point corresponding to the specified point.

Regarding points other than the above, a configuration shown in FIG. 34 is similar to the configuration shown in FIG. 31.

Figure 35:
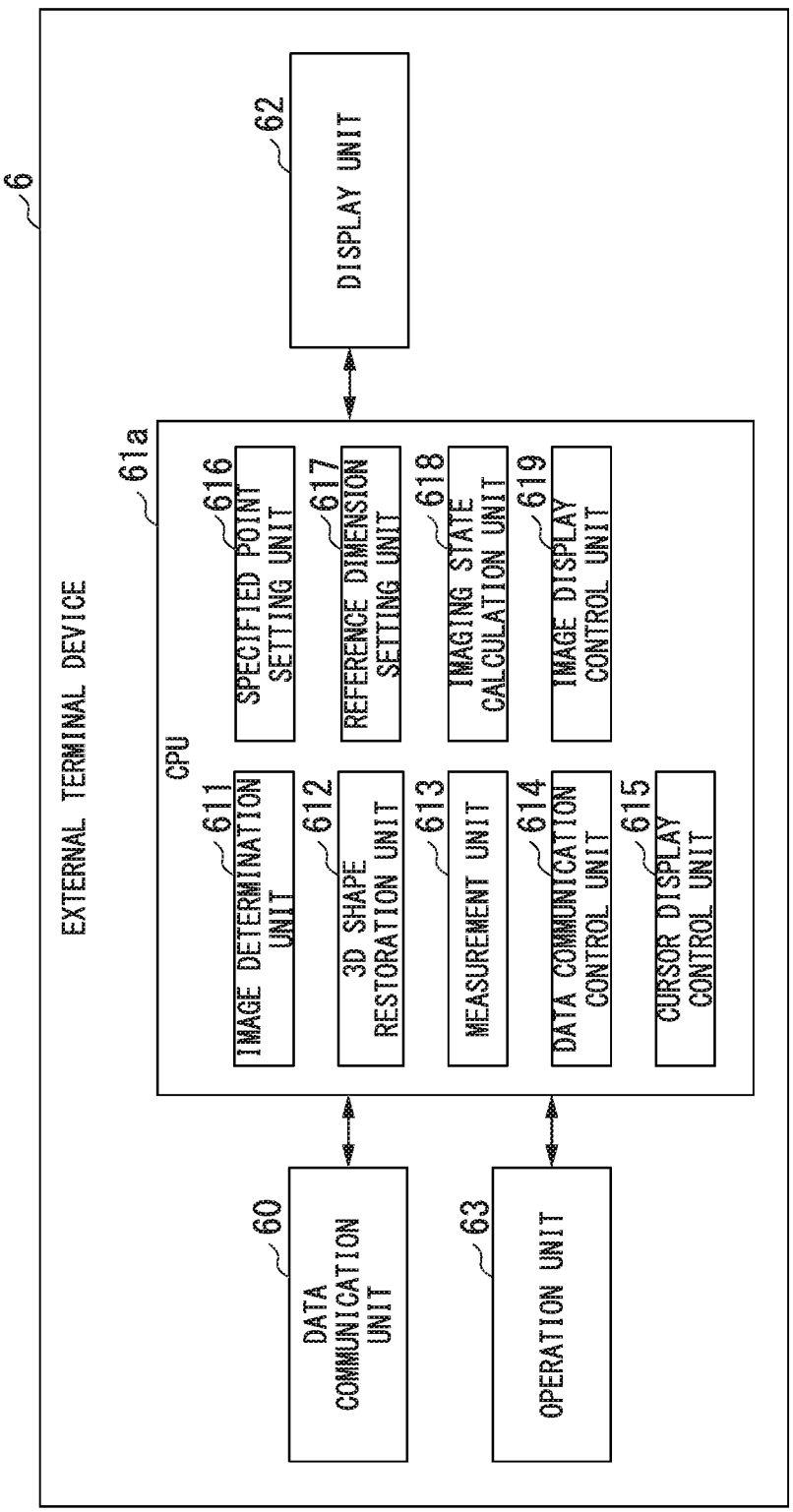
FIG. 35 is a block diagram showing a functional configuration of an external terminal device according to the thirteenth embodiment of the present invention.

FIG. 35 shows a configuration of the external terminal device 6. Differences from the configuration shown in FIG. 32 will be described with respect to the configuration shown in FIG. 35.

In the external terminal device 6, an operation unit 63 is added. The operation unit 63 is a user interface. The operation unit 63 receives a specified measurement point and a specified reference point input by the user operating the operation unit 63. The operation unit 63 outputs information indicating positions of the specified measurement point and the specified reference point to a CPU 61*a*. Also, the operation unit 63 receives a reference dimension input by the user operating the operation unit 63. The operation unit 63 outputs information indicating the reference dimension to the CPU 61*a*.

In the thirteenth embodiment, the CPU 61 in the twelfth embodiment is changed to the CPU 61*a* shown in FIG. 35. The CPU 61*a* includes an image determination unit 611, a 3D shape restoration unit 612, a measurement unit 613, and a data communication control unit 614 shown in FIG. 32. Also, the CPU 61*a* includes a cursor display control unit 615, a specified point setting unit 616, a reference dimension setting unit 617, an imaging state calculation unit 618 (a second image imaging state calculation unit), and an image display control unit 619. The cursor display control unit 615, the specified point setting unit 616, and the reference dimension setting unit 617 have the same functions as the cursor display control unit 182, the specified point setting unit 183, and the reference dimension setting unit 184 of FIG. 31, respectively. Also, the imaging state calculation unit 618 and the image display control unit 619 have the same functions as the imaging state calculation unit 195 and the image display control unit 181 of FIG. 22, respectively.

The data communication control unit 614 causes the data communication unit 60 to receive the first image, the second image, and the internal parameters from the endoscope device 1. Thereby, the data communication unit 60 (a reception unit) receives the first image, the second image, and the internal parameters from the endoscope device 1. Also, the data communication control unit 614 causes the data communication unit 60 to transmit bending information related to bending driving of the tip of the endoscope to the endoscope device 1. Thereby, the data communication unit 60 (a transmission unit) transmits the bending information to the endoscope device 1. That is, the data communication unit 60 transmits an imaging state of the endoscope device 1 for capturing the second image including the point corresponding to the specified point to the endoscope device 1. On the basis of the first image and the specified point, the imaging state calculation unit 618 calculates the imaging state of the endoscope device 1 for capturing the second image including the point corresponding to the specified point. The 3D shape restoration unit 612 restores a 3D shape of an object on the basis of a plurality of images including the received second image. The measurement unit 613 measures the object on the basis of the 3D shape, the specified point, and the reference dimension.

Figure 36:
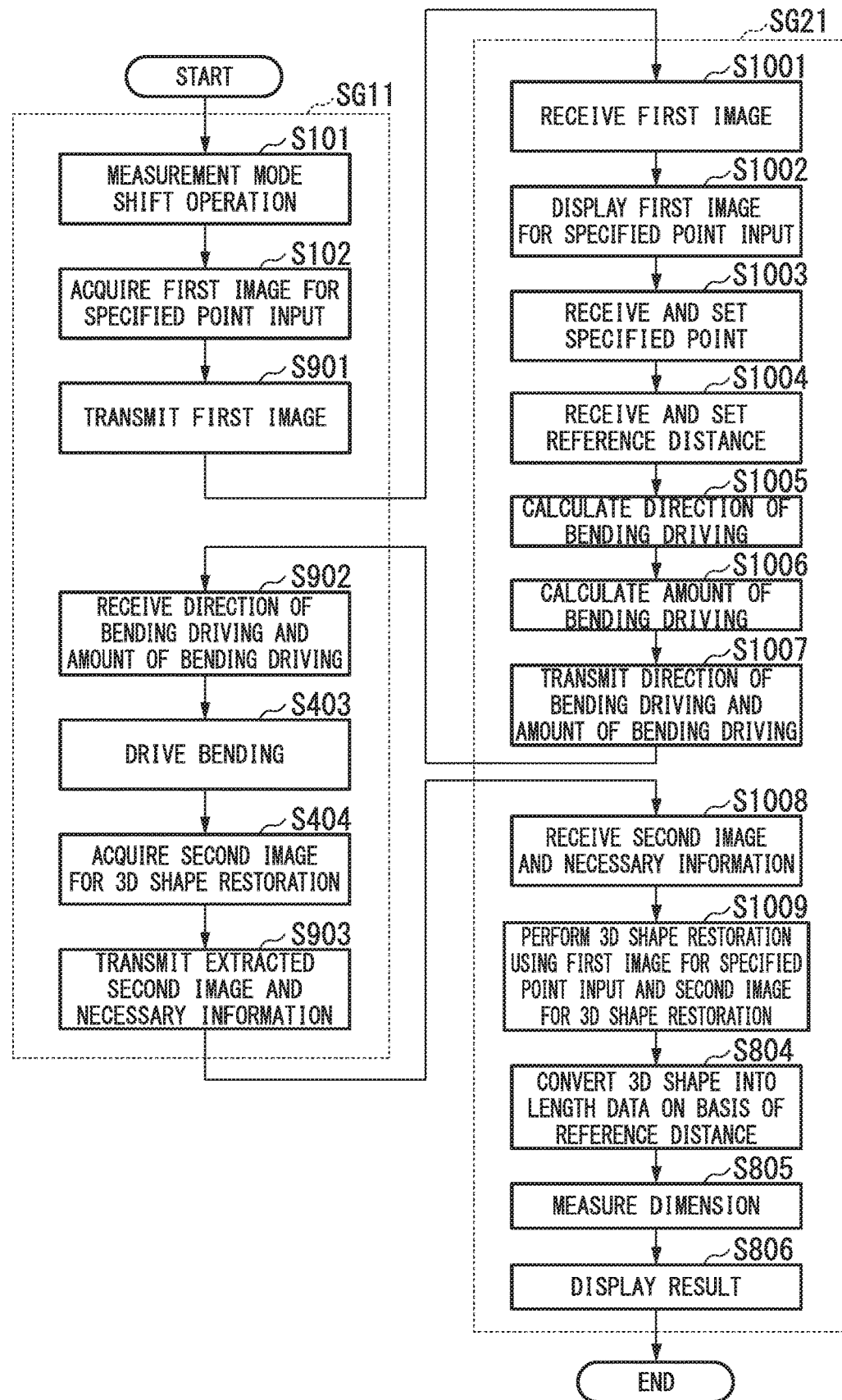
FIG. 36 is a flowchart showing a procedure of a process executed by an endoscope device and the external terminal device according to the thirteenth embodiment of the present invention.

A 3D measurement process according to the thirteenth embodiment will be described with reference to FIG. 36. The 3D measurement process is divided into a process SG11 in the endoscope device 1 and a process SG21 in the external terminal device 6. Differences from the processing shown in FIG. 33 will be described with respect to a process to be executed by the endoscope device 1 and the external terminal device 6

After a first image is acquired in step S102, the data communication control unit 198 issues a command, to the external device interface 16, for causing the acquired first image to be transmitted to the external terminal device 6. Thereby, the external device interface 16 transmits the first image to the external terminal device 6 (step S901). By executing the processing of step S901, the process in the endoscope device 1 is temporarily terminated.

The data communication control unit 614 of the external terminal device 6 causes the data communication unit 60 (a reception unit) to receive the first image transmitted from the endoscope device 1. Thereby, the data communication unit 60 receives the first image from the endoscope device 1 (step S1001).

After the first image is received in step S1001, the image display control unit 619 causes the display unit 5 to display the received first image (step S1002).

After the first image is displayed on the display unit 5 in step S1002, the user specifies the specified point on the displayed first image by operating the operation unit 63. The operation unit 63 receives a specified measurement point and a specified reference point specified by the user. The specified point setting unit 616 sets the specified reference point and the specified measurement point specified by the user on the displayed first image (step S1003).

After the specified point is set in step S1003, the user specifies a reference distance by operating the operation unit 63. The operation unit 63 receives the reference distance specified by the user. The reference dimension setting unit 617 sets the reference distance on the acquired first image (step S1004).

After the specified point setting process (step S1003) and the reference dimension setting process (step S1004) are completed, the imaging state calculation unit 618 calculates an amount of change of the tip of the endoscope for changing the imaging state from a first imaging state when the first image is acquired to a second imaging state when the second image is acquired. First, the imaging state calculation unit 618 calculates a direction of bending driving as a requirement for imaging in the tip of the endoscope for changing the tip of the endoscope from the first imaging state to the second imaging state on the basis of the first image and specified point position information (step S1005). In relation to a process of calculating the direction of bending driving, the seventh embodiment is referred to. Thereafter, the imaging state calculation unit 618 calculates the amount of bending driving as the requirement for imaging in the tip of the endoscope to change the tip of the endoscope from the first imaging state to the second imaging state on the basis of the first image and the specified point position information (step S1006).

After the amount of bending driving is calculated in step S1006, the data communication control unit 614 issues a command, to the data communication unit 60 (a transmission unit), for causing information related to bending driving serving as the requirement for imaging, i.e., a direction of bending driving and an amount of bending driving, to be transmitted to the endoscope device 1. Thereby, the data communication unit 60 transmits the direction of bending driving and the amount of bending driving to the endoscope device 1 (step S1007). By executing the processing of step S1007, the process in the external terminal device 6 is temporarily terminated.

The data communication control unit 198 of the endoscope device 1 issues a command, to the external device interface 16, for receiving the direction of bending driving and the amount of bending driving transmitted from the external terminal device 6. Thereby, the external device interface 16 receives the direction of bending driving and the amount of bending driving (step S902).

After the direction of bending driving and the amount of bending driving are received in step S902, a bending control unit 188 generates a command for causing the tip 20 of the insertion unit 2 to be bent on the basis of the received direction of bending driving and the received amount of bending driving. The command generated by the bending control unit 188 is output to an endoscope unit 8 via a control interface 17. The endoscope unit 8 bends the tip 20 of the insertion unit 2 on the basis of the command (step S403).

After the bending driving is executed in step S403, the imaging element 28 generates one second image by imaging the subject once in the second imaging state. The CCU 9 acquires one generated second image (step S404).

After one second image is acquired in step S404, the data communication control unit 198 issues a command, to the external device interface 16, for causing the acquired second image and information necessary for 3D shape restoration, for example, internal parameters, to be transmitted to the external terminal device 6. Thereby, the external device interface 16 transmits the second image and the internal parameters to the external terminal device 6 (step S903). By executing the processing of step S903, the processing in the endoscope device 1 is completed.

The data communication control unit 614 of the external terminal device 6 causes the data communication unit 60 to receive the second image and the internal parameters transmitted from the endoscope device 1. Thereby, the data communication unit 60 receives the second image and the internal parameters from the endoscope device 1 (step S1008).

After the second image and the internal parameters are received in step S1008, the 3D shape restoration unit 612 uses the first image received in step S1001 and the second image received in step S1008 to restore the 3D shape of the subject (step S1009). After step S1009, the processing of steps S804 to S806 is executed.

As described above, the 3D shape restoration process with a high calculation load is executed by the external terminal device 6 different from the endoscope device 1 configured to acquire the second image for the 3D shape restoration. If the processing performance of the external terminal device 6 is better than the processing performance of the endoscope device 1, a processing time can be shortened. Also, the user can check a measurement result in a location other than a site where the endoscope device 1 is used. If the external terminal device 6 is a mobile terminal, the user can check the measurement result anywhere. Thus, a working location of the user is not fixed. As a result, inspection efficiency is improved.

(Additional Statement)

A measurement device according to an embodiment of the present invention may acquire the first images and the second images from a video file obtained by video filming.

According to a twelfth aspect of the present invention, a measurement device includes an image acquisition unit, a specified point setting unit, an image determination unit, a three-dimensional (3D) shape restoration unit, a reference dimension setting unit, and a measurement unit. The image acquisition unit acquires a first image generated by imaging an object to be measured in a first imaging state and acquires one or more second images generated by imaging the object in one or more second imaging states. The specified point setting unit sets a specified point on the first image. The image determination unit determines whether or not a point corresponding to the specified point is included in the one or more second images. The 3D shape restoration unit restores a 3D shape of the object by using a plurality of images including the second image determined to include the point corresponding to the specified point by the image determination unit. The reference dimension setting unit sets a reference dimension on the first image or the 3D shape. The measurement unit measures the object on the basis of the 3D shape, the specified point, and the reference dimension. At least one of an imaging position and an imaging posture is different between the first imaging state and the second imaging state, and at least one of the imaging position and the imaging posture is different between two or more second imaging states.

According to a thirteenth aspect of the present invention, in the twelfth aspect, the specified point setting unit may set the specified point before the image acquisition unit acquires the second image.

According to a fourteenth aspect of the present invention, in the twelfth aspect, the specified point setting unit may set the specified point after the image acquisition unit acquires the second image.

According to a fifteenth aspect of the present invention, in the twelfth aspect, second image acquisition by the image acquisition unit and specified point setting by the specified point setting unit may be executed in parallel.

According to a sixteenth aspect of the present invention, in the twelfth aspect, the measurement device may further include a partial region setting unit. The partial region setting unit sets a partial region on the first image on the basis of a position of the specified point. The image determination unit may determine whether or not a region corresponding to the partial region is included in the one or more second images.

According to a seventeenth aspect of the present invention, in the sixteenth aspect, the measurement device may further include a smoothing unit. The smoothing unit smooths a part corresponding to the partial region within the 3D shape. The measurement unit may measure the object on the basis of the 3D shape smoothed by the smoothing unit, the specified point, and the reference dimension.

According to an eighteenth aspect of the present invention, in the twelfth aspect, the measurement device may further include a reliability calculation unit and a measurement reliability determination unit. The reliability calculation unit calculates an index of measurement reliability at the specified point. The measurement reliability determination unit determines the measurement reliability by comparing the index with a predetermined threshold value. The measurement unit may measure the object if it is determined that the measurement reliability is high by the measurement reliability determination unit.

According to a nineteenth aspect of the present invention, in the eighteenth aspect, the reliability calculation unit may calculate the index of the measurement reliability at the point corresponding to the specified point in the 3D shape.

According to a twentieth aspect of the present invention, in the eighteenth aspect, the reliability calculation unit may calculate the index of the measurement reliability at the point corresponding to the specified point in the second image.

According to a twenty-first aspect of the present invention, in the twelfth aspect, the specified point may be a specified measurement point indicating a measurement position. A specified reference point indicating a position of the reference dimension may be input from a device which has measured the reference dimension. The measurement unit may measure the object on the basis of the 3D shape, the specified measurement point, the specified reference point, and the reference dimension.

According to a twenty-second aspect of the present invention, in the twelfth aspect, the specified point may be input by a user.

According to a twenty-third aspect of the present invention, a method of operating a measurement device includes a first image acquisition process, a specified point setting process, a second image acquisition process, a three-dimensional (3D) shape restoration process, a reference dimension setting process, and a measurement process. In the first image acquisition process, a first image generated by imaging an object to be measured in a first imaging state is acquired. In the specified point setting process, a specified point is set on the first image. In the second image acquisition process, one or more second images generated by imaging the object are acquired in one or more second imaging states. At least one of an imaging position and an imaging posture is different between the first imaging state and the second imaging state. At least one of the imaging position and the imaging posture is different between two or more second imaging states. A position corresponding to the specified point is included in an imaging field of view in the one or more second imaging states. In the 3D shape restoration process, a 3D shape of the object is restored by using a plurality of images including the second image. In the reference dimension setting process, a reference dimension is set on the first image or the 3D shape. In the measurement process, the object is measured on the basis of the 3D shape, the specified point, and the reference dimension.

According to a twenty-fourth aspect of the present invention, in the twenty-third aspect, the method of operating the measurement device may further include an image determination process. In the image determination process, it is determined whether or not the second image is suitable as an image to be used in the 3D shape restoration process before the 3D shape restoration process is executed. The 3D shape restoration process may be executed if it is determined that the second image is suitable as the image to be used in the 3D shape restoration process in the image determination process.

According to a twenty-fifth aspect of the present invention, in the twenty-fourth aspect, the method of operating the measurement device may further include an imaging state calculation process. In the imaging state calculation process, at least one of an imaging position and an imaging posture is calculated if it is determined that the second image is not suitable as the image to be used in the 3D shape restoration process in the image determination process. The second image acquisition process is executed again by imaging the object in at least one of the imaging position and the imaging posture calculated in the imaging state calculation process.

According to a twenty-sixth aspect of the present invention, in the twenty-third aspect, the second image acquisition process and the reference dimension setting process may be executed in parallel.

According to a twenty-seventh aspect of the present invention, in the twenty-third aspect, the specified point may be a specified measurement point indicating a measurement position. A specified reference point indicating a position of the reference dimension may be input from a device which has measured the reference dimension. In the measurement process, the object is measured on the basis of the 3D shape, the specified measurement point, the specified reference point, and the reference dimension.

According to a twenty-eighth aspect of the present invention, in the twenty-third aspect, the specified point may be input by a user.

According to a twenty-ninth aspect of the present invention, in the twenty-third aspect, a user may change an imaging state between imaging in the first imaging state and imaging in the second imaging state or between a plurality of times of imaging in the second imaging state.

According to a thirtieth aspect of the present invention, in the twenty-third aspect, the measurement device may further include an insertion unit and an imaging unit. The insertion unit is inserted into the object and is bendable. An imaging unit is arranged in the insertion unit and generates the first image and the second image. The imaging state may be changed by bending the insertion unit between imaging in the first imaging state and imaging in the second imaging state or between a plurality of times of imaging in the second imaging state.

According to a thirty-first aspect of the present invention, a method of operating a measurement device includes a first image acquisition process, a provisionally specified point setting process, a second image acquisition process, a three-dimensional (3D) shape restoration process, a specified point setting process, a reference dimension setting process, and a measurement process. In the first image acquisition process, a first image generated by imaging an object to be measured in a first imaging state is acquired. In the provisionally specified point setting process, a provisionally specified point is set on the first image. In the second image acquisition process, one or more second images generated by imaging the object in one or more second imaging states are acquired. At least one of an imaging position and an imaging posture is different between the first imaging state and the second imaging state. At least one of the imaging position and the imaging posture is different between two or more second imaging states. A position corresponding to the provisionally specified point is included in an imaging field of view in the one or more second imaging states. In the 3D shape restoration process, a 3D shape of the object is restored by using a plurality of images including the second image. In the specified point setting process, a specified point is set on the 3D shape or the first image. In the reference dimension setting process, a reference dimension is set on the 3D shape or the first image. In the measurement process, the object is measured on the basis of the 3D shape, the specified point, and the reference dimension.

According to a thirty-second aspect of the present invention, in the thirty-first aspect, the specified point may be a specified measurement point indicating a measurement position. A specified reference point indicating a position of the reference dimension may be input from a device which has measured the reference dimension. In the measurement process, the object is measured on the basis of the 3D shape, the specified measurement point, the specified reference point, and the reference dimension.

According to a thirty-third aspect of the present invention, in the thirty-first aspect, the provisionally specified point may be input by a user.

According to a thirty-fourth aspect of the present invention, a measurement device includes an image acquisition unit, a specified point setting unit, a three-dimensional (3D) shape restoration unit, a reference dimension setting unit, and a measurement unit. The image acquisition unit acquires a first image generated by imaging an object to be measured in a first imaging state and acquires one or more second images generated by imaging the object in one or more second imaging states. The specified point setting unit sets a specified point on the first image. The 3D shape restoration unit restores a 3D shape of the object by using a plurality of images including the second image. The reference dimension setting unit sets a reference dimension on the first image or the 3D shape. The measurement unit measures the object on the basis of the 3D shape, the specified point, and the reference dimension. At least one of an imaging position and an imaging posture is different between the first imaging state and the second imaging state. At least one of the imaging position and the imaging posture is different between two or more second imaging states. A position corresponding to the specified point is included in an imaging field of view in the one or more second imaging states.

According to a thirty-fifth aspect of the present invention, in the thirty-fourth aspect, the measurement device may further include an image determination unit. The image determination unit determines whether or not the second image is suitable as an image to be used in restoration of the 3D shape before the 3D shape restoration unit restores the 3D shape. The 3D shape restoration unit may restore the 3D shape if it is determined that the second image is suitable as the image to be used in the restoration of the 3D shape by the image determination unit.

According to a thirty-sixth aspect of the present invention, in the thirty-fifth aspect, the measurement device may further include an imaging state calculation unit. The imaging state calculation unit calculates at least one of an imaging position and an imaging posture if it is determined that the second image is not suitable as the image to be used in the restoration of the 3D shape by the image determination unit. The image acquisition unit may acquire the second image generated by imaging the object again in at least one of the imaging position and the imaging posture calculated by the imaging state calculation unit.

According to a thirty-seventh aspect of the present invention, in the thirty-fourth aspect, second image acquisition by the image acquisition unit and reference dimension setting by the reference dimension setting unit may be executed in parallel.

According to a thirty-eighth aspect of the present invention, in the thirty-fourth aspect, the specified point may be a specified measurement point indicating a measurement position. A specified reference point indicating a position of the reference dimension may be input from a device which has measured the reference dimension. The measurement unit may measure the object on the basis of the 3D shape, the specified measurement point, the specified reference point, and the reference dimension.

According to a thirty-ninth aspect of the present invention, in the thirty-fourth aspect, the specified point may be input by a user.

According to a fortieth aspect of the present invention, in the thirty-fourth aspect, a user may change an imaging state between imaging in the first imaging state and imaging in the second imaging state or between a plurality of times of imaging in the second imaging state.

According to a forty-first aspect of the present invention, in the thirty-fourth aspect, the measurement device may further include an insertion unit. The insertion unit is inserted into the object and is bendable. An imaging unit configured to generate the first image and the second image may be arranged in the insertion unit. The imaging state may be changed by bending the insertion unit between imaging in the first imaging state and imaging in the second imaging state or between a plurality of times of imaging in the second imaging state.

According to a forty-second aspect of the present invention, a measurement device includes an image acquisition unit, a provisionally specified point setting unit, a three-dimensional (3D) shape restoration unit, a specified point setting unit, a reference dimension setting unit, and a measurement unit. The image acquisition unit acquires a first image generated by imaging an object to be measured in a first imaging state and acquires one or more second images generated by imaging the object in one or more second imaging states. The provisionally specified point setting unit sets a provisionally specified point on the first image. The 3D shape restoration unit restores a 3D shape of the object by using a plurality of images including the second image. The specified point setting unit sets a specified point on the 3D shape or the first image. The reference dimension setting unit sets a reference dimension on the 3D shape or the first image. The measurement unit measures the object on the basis of the 3D shape, the specified point, and the reference dimension. At least one of an imaging position and an imaging posture is different between the first imaging state and the second imaging state. At least one of the imaging position and the imaging posture is different between two or more second imaging states. A position corresponding to the provisionally specified point is included in an imaging field of view in the one or more second imaging states.

According to a forty-third aspect of the present invention, in the forty-second aspect, the specified point may be a specified measurement point indicating a measurement position. A specified reference point indicating a position of the reference dimension may be input from a device which has measured the reference dimension. The measurement unit may measure the object on the basis of the 3D shape, the specified measurement point, the specified reference point, and the reference dimension.

According to a forty-fourth aspect of the present invention, in the forty-second aspect, the provisionally specified point may be input by a user.

According to a forty-seventh aspect of the present invention, a three-dimensional (3D) shape restoration device includes a reception unit, a specified point setting unit, a reference dimension setting unit, an imaging state calculation unit, a transmission unit, a 3D shape restoration unit, and a measurement unit. The reception unit receives a first image by imaging an object to be measured in a first imaging state and a second image generated by imaging the object in a second imaging state from an image acquisition device. At least one of an imaging position and an imaging posture is different between the first imaging state and the second imaging state. The specified point setting unit sets a specified point on the received first image. The reference dimension setting unit sets a reference dimension on the received first image. The imaging state calculation unit calculates an imaging state of the image acquisition device for capturing the second image including a point corresponding to the specified point on the basis of the first image and the specified point. The transmission unit transmits the calculated imaging state to the image acquisition device. The 3D shape restoration unit restores a 3D shape of the object on the basis of a plurality of images including the received second image. The measurement unit measures the object on the basis of the 3D shape, the specified point, and the reference dimension.

According to a fiftieth aspect of the present invention, there is provided a non-transitory computer-readable recording medium recording a program for causing a computer to execute a first reception step, a specified point setting step, a reference dimension setting step, an imaging state calculation step, a transmission step, a second reception step, a three-dimensional (3D) shape restoration step, and a measurement step. The computer receives a first image generated by imaging an object to be measured from an image acquisition device in the first reception step. The computer sets a specified point on the received first image in the specified point setting step. The computer sets a reference dimension on the received first image in the reference dimension setting step. The computer calculates an imaging state of the image acquisition device for capturing a second image including a point corresponding to the specified point on the basis of the first image and the specified point in the imaging state calculation step. The computer transmits the calculated imaging state to the image acquisition device in the transmission step. The computer receives the second image from the image acquisition device in the second reception step. The computer restores a 3D shape of the object on the basis of a plurality of images including the received second image in the 3D shape restoration step. The computer measures the object on the basis of the 3D shape, the specified point, and the reference dimension in the measurement step.

According to a fifty-first aspect of the present invention, there is provided a non-transitory computer-readable recording medium recording a program for causing a computer to execute a first image acquisition step, a specified point setting step, a second image acquisition step, a three-dimensional (3D) shape restoration step, a reference dimension setting step, and a measurement step. The computer acquires a first image generated by imaging an object to be measured in a first imaging state in the first image acquisition step. The computer sets a specified point on the acquired first image in the specified point setting step. The computer acquires one or more second images generated by imaging the object in one or more second imaging states in the second image acquisition step. At least one of an imaging position and an imaging posture is different between the first imaging state and the second imaging state. At least one of the imaging position and the imaging posture is different between two or more second imaging states. A position corresponding to the specified point set in the specified point setting step is included in an imaging field of view in the one or more second imaging states. The computer restores a 3D shape of the object by using a plurality of images including the second image in the 3D shape restoration step. The computer sets a reference dimension on the first image or the 3D shape in the reference dimension setting step. The computer measures the object on the basis of the 3D shape, the specified point, and the reference dimension in the measurement step.

While preferred embodiments of the invention have been described and shown above, it should be understood that these are exemplars of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of operating a measurement device, the method comprising:
   a first image acquisition process of acquiring a first image generated by imaging an object to be measured in a first imaging state;
   a specified point setting process of setting a specified measurement point and a specified reference point on the first image;
   a second image acquisition process of acquiring one or more second images generated by imaging the object in one or more second imaging states, at least one of an imaging position and an imaging posture being different between the first imaging state and the one second imaging state, and at least one of the imaging position and the imaging posture being different between two or more of the second imaging states;
   an image determination process of determining whether or not a point corresponding to the specified measurement point on the first image and a point corresponding to the specified reference point on the first image are included in the one or more second images;

after the image determination process, a three-dimensional (3D) shape restoration process of restoring a 3D shape of the object by using a plurality of images including the second image determined to include the point corresponding to the specified measurement point on the first image and the point corresponding to the specified reference point on the first image in the image determination process;

a reference dimension setting process of setting a distance between two reference points, where one of the two reference points is the specified reference point on the first image as a reference dimension; and a measurement process of measuring a distance of the object on the basis of the 3D shape, the specified measurement point, and the reference dimension.

2. The method of operating the measurement device according to claim 1,
wherein the specified point setting process is executed before the second image acquisition process is executed.

3. The method of operating the measurement device according to claim 1,
wherein the specified point setting process is executed after the second image acquisition process is executed.

4. The method of operating the measurement device according to claim 1,
wherein the second image acquisition process and the specified point setting process are executed in parallel.

5. The method of operating the measurement device according to claim 1, further comprising:
a partial region setting process of setting a partial region on the first image on the basis of a position of the specified measurement point,
wherein, in the image determination process, it is determined whether or not a region corresponding to the partial region is included in the one or more second images.

6. The method of operating the measurement device according to claim 5, further comprising:
a smoothing process of smoothing a part corresponding to the partial region within the 3D shape,
wherein, in the measurement process, the object is measured on the basis of the 3D shape smoothed in the smoothing process, the specified measurement point, and the reference dimension.

7. The method of operating the measurement device according to claim 1, further comprising:
an index calculation process of calculating an index of measurement reliability at the specified measurement point; and
a measurement reliability determination process of determining the measurement reliability by comparing the index with a predetermined threshold value,
wherein, in the measurement process, the object is measured if it is determined that the measurement reliability is high in the measurement reliability determination process.

8. The method of operating the measurement device according to claim 7,
wherein, in the index calculation process, the index of the measurement reliability at the point in the one or more second images corresponding to the specified measurement point set on the first image is calculated in the 3D shape.

9. The method of operating the measurement device according to claim 7,
wherein, in the index calculation process, the index of the measurement reliability at the point in the one or more second images corresponding to the specified measurement point set on the first image is calculated in the one or more second images.

10. The method of operating the measurement device according to claim 1,
wherein the specified measurement point indicates a measurement position,
wherein the specified reference point indicates a position of the reference dimension and is input from a device which has measured the reference dimension, and
wherein in the measurement process, the object is measured on the basis of the 3D shape, the specified measurement point, the specified reference point, and the reference dimension.

11. The method of operating the measurement device according to claim 1,
wherein the specified measurement point is input by a user.

12. The method of operating the measurement device according to claim 1, further comprising an imaging-position-and-posture calculation process of calculating an imaging position and an imaging posture of each image used for restoring the 3D shape among the plurality of images.

13. A measurement device, comprising:
a processing unit,
wherein measurement process information is input to the processing unit,
the measurement process information includes information of a specified measurement point and a specified reference point set on a first image generated by imaging an object to be measured in a first imaging state, a plurality of second images generated by imaging the object in a plurality of second imaging states, and information of a reference dimension indicated by a distance between two reference points, where one of the two reference points is on the specified reference point set on the first image,
the plurality of second imaging states are different from the first imaging state,
the second images included in the plurality of second images are different from each other,
at least one of an imaging position and an imaging posture is different between the plurality of second imaging states,
the processing unit is configured to determine whether or not a point corresponding to the specified measurement point on the first image and a point corresponding to the specified reference point on the first image are included in each of the plurality of second images on the basis of the input information of the specified measurement point and the specified reference point on the first image,
the processing unit is configured to extract the two or more second images determined to include the point corresponding to the specified measurement point on the first image and the point corresponding to the specified reference point on the first image from among the plurality of second images,
the processing unit is configured to, after extracting the two or more second images determined to include the point corresponding to the specified measurement point on the first image and the point corresponding to the specified reference point on the first image, restore a three-dimensional (3D) shape of the object by using the extracted two or more second images, and the processing unit is configured to measure a distance of the object on the basis of the restored 3D shape, the information of the specified measurement point, and the information of the reference dimension.

14. The measurement device according to claim 13, further comprising:

a communication unit configured to externally receive the measurement process information.

15. The measurement device according to claim 13, wherein the processing unit is configured to calculate an imaging position and an imaging posture of each image used for restoring the 3D shape among the extracted second images.

16. A measurement system including an image acquisition device and a three-dimensional (3D) shape restoration device, wherein the image acquisition device includes:
an image acquisition unit configured to acquire a first image generated by imaging an object to be measured in a first imaging state and acquire one or more second images generated by imaging the object in one or more second imaging states, at least one of an imaging position and an imaging posture being different between the first imaging state and the one second imaging state, at least one of the imaging position and the imaging posture being different between the two or more second imaging states;

a specified point setting unit configured to set a specified measurement point and a specified reference point on the first image;

a reference dimension setting unit configured to set a distance between two reference points, where one of the two reference points is the specified reference point on the first image as a reference dimension; and a communication control unit configured to transmit measurement process information to the 3D shape restoration device, the measurement process information including a plurality of images including the second image, information of the specified measurement point and the specified reference point on the first image, and information of the reference dimension, and the 3D shape restoration device includes:
a communication unit configured to receive the measurement process information;

an image determination unit configured to determine whether or not a point corresponding to the specified measurement point on the first image and a point corresponding to the specified reference point on the first image are included in the received second image on the basis of the received information of the specified measurement point and the specified reference point on the first image;

an image extraction unit configured to extract the second image determined to include a point corresponding to the specified measurement point on the first image and a point corresponding to the specified reference point on the first image by the image determination unit;

a 3D shape restoration unit configured to, after extracting the second image determined to include the point corresponding to the specified measurement point on the first image and the point corresponding to the specified reference point on the first image, restore a 3D shape of the object by using a plurality of images including the extracted second image; and a measurement unit configured to measure a distance of the object on the basis of the restored 3D shape, the received information of the specified measurement point, and the received information of the reference dimension.

17. A non-transitory computer-readable recording medium recording a program for causing a computer to execute a first image acquisition step, a specified point setting step, a second image acquisition step, an image determination step, a three-dimensional (3D) shape restoration step, a reference dimension setting step, and a measurement step, wherein the computer acquires a first image generated by imaging an object to be measured in a first imaging state in the first image acquisition step, the computer sets a specified measurement point and a specified reference point on the acquired first image in the specified point setting step, the computer sets a distance between two reference points, where one of the two reference points is the specified point on the first image as a reference dimension in the reference dimension setting step; and the computer acquires one or more second images generated by imaging the object in one or more second imaging states in the second image acquisition step, at least one of an imaging position and an imaging posture being different between the first imaging state and the second imaging state, at least one of the imaging position and the imaging posture being different between two or more second imaging states;

the computer determines whether or not a point corresponding to the specified measurement point on the first image and a point corresponding to the specified reference point on the first image are included in the one or more second images in the image determination step;

the computer, after determining whether or not the point corresponding to the specified measurement point on the first image and the point corresponding to the specified reference point on the first image are included in the one or more second images, restores a 3D shape of the object by using a plurality of images including the second image determined to include the point corresponding to the specified measurement point on the first image and the point corresponding to the specified reference point on the first image in the 3D shape restoration step; and the computer measures a distance of the object on the basis of the 3D shape, the specified measurement point, and the reference dimension in the measurement step.

18. A method of operating a measurement device, the method comprising:

a first image acquisition process of acquiring a first image generated by imaging an object to be measured in a first imaging state;

a specified point setting process of setting a specified measurement point on the first image;

a second image acquisition process of acquiring one or more second images generated by imaging the object in one or more second imaging states, at least one of an imaging position and an imaging posture being different between the first imaging state and the one second imaging state, and at least one of the imaging position and the imaging posture being different between two or more of the second imaging states;

an image determination process of determining whether or not a point corresponding to the specified measurement point on the first image is included in the one or more second images;

a three-dimensional (3D) shape restoration process of, after determining whether or not the point corresponding to the specified measurement point on the first image is included in the one or more second images, restoring a 3D shape of the object by using a plurality of images including the second image determined to include the point corresponding to the specified measurement point on the first image in the image determination process;

a reference dimension setting process of setting a specified reference point on the 3D shape and setting a distance between two reference points, where one of the two reference points is the specified reference point on the 3D shape as a reference dimension; and a measurement process of measuring a distance of the object on the basis of the 3D shape, the specified measurement point, and the reference dimension.

19. A method of operating a measurement device, the method comprising:

a first image acquisition process of acquiring a first image generated by imaging an object to be measured in a first imaging state;

a specified point setting process of setting a specified reference point on the first image;

a second image acquisition process of acquiring one or more second images generated by imaging the object in one or more second imaging states, at least one of an imaging position and an imaging posture being different between the first imaging state and the one second imaging state, and at least one of the imaging position and the imaging posture being different between two or more of the second imaging states;

an image determination process of determining whether or not a point corresponding to the specified reference point on the first image is included in the one or more second images;

a three-dimensional (3D) shape restoration process of, after determining whether or not the point corresponding to the specified reference point on the first image is included in the one or more second images, restoring a 3D shape of the object by using a plurality of images including the second image determined to include the point corresponding to the specified reference point on the first image in the image determination process;

a measurement position setting process of setting a specified measurement point on the 3D shape;

a reference dimension setting process of setting a distance between two reference points, where one of the two reference points is a the specified reference point on the first image as a reference dimension; and a measurement process of measuring a distance of the object on the basis of the 3D shape, the specified measurement point, and the reference dimension.

20. A measurement device, comprising:

a processing unit, wherein measurement process information is input to the processing unit, the measurement process information includes information of a specified measurement point set on a first image generated by imaging an object to be measured in a first imaging state and a plurality of second images generated by imaging the object in a plurality of second imaging states, the plurality of second imaging states are different from the first imaging state, the second images included in the plurality of second images are different from each other, at least one of an imaging position and an imaging posture is different between the plurality of second imaging states, the processing unit is configured to determine whether or not a point corresponding to the specified measurement point on the first image is included in each of the plurality of second images on the basis of the input information of the specified measurement point on the first image, the processing unit is configured to extract the two or more second images determined to include the point corresponding to the specified measurement point on the first image from among the plurality of second images, the processing unit is configured to, after extracting the two or more second images determined to include the point corresponding to the specified measurement point on the first image from among the plurality of second images, restore a three-dimensional (3D) shape of the object by using the extracted second images, the processing unit is configured to set a specified reference point on the 3D shape and set a distance between two reference points, where one of the two reference points is the specified reference point on the 3D shape as a reference dimension; and the processing unit is configured to measure a distance of the object on the basis of the restored 3D shape, the information of the specified measurement point, and the reference dimension.

21. A measurement system including an image acquisition device and a three-dimensional (3D) shape restoration device, wherein the image acquisition device includes:

a first image acquisition unit configured to acquire a first image generated by imaging an object to be measured in a first imaging state;

a specified point setting unit configured to set a specified reference point on the first image; and a second image acquisition unit configured to acquire one or more second images generated by imaging the object in one or more second imaging states, at least one of an imaging position and an imaging posture being different between the first imaging state and the one second imaging state, and at least one of the imaging position and the imaging posture being different between two or more of the second imaging states, and the 3D shape restoration device includes:

an image determination unit configured to determine whether or not a point corresponding to the specified reference point on the first image is included in the one or more second images;

a three-dimensional (3D) shape restoration unit configured to, after determining whether or not the point corresponding to the specified reference point on the first image is included in the one or more second images, restore a 3D shape of the object by using a plurality of images including the second image determined to include the point corresponding to the specified reference point on the first image in the image determination unit;

a measurement position setting unit configured to set a specified measurement point on the 3D shape;

a reference dimension setting unit configured to set a distance between two reference points, where one of the two reference points is a specified reference point on the first image as a reference dimension; and a measurement unit configured to measure a distance of the object on the basis of the 3D shape, the specified measurement point, and the reference dimension.

* * * * *